(12) United States Patent
Toyotaka et al.

(10) Patent No.: US 11,645,992 B2
(45) Date of Patent: May 9, 2023

(54) METHOD FOR OPERATING DISPLAY DEVICE WITH POTENTIALS HIGHER AND LOWER THAN MAXIMUM AND MINIMUM POTENTIALS GENERATED BY SOURCE DRIVER CIRCUIT

(71) Applicant: SEMICONDUCTOR ENERGY LABORATORY CO., LTD., Atsugi (JP)

(72) Inventors: Kouhei Toyotaka, Kanagawa (JP); Shigeru Onoya, Kanagawa (JP); Marina Hiyama, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 16/981,185

(22) PCT Filed: Mar. 21, 2019

(86) PCT No.: PCT/IB2019/052292
§ 371 (c)(1),
(2) Date: Sep. 15, 2020

(87) PCT Pub. No.: WO2019/186332
PCT Pub. Date: Oct. 3, 2019

(65) Prior Publication Data
US 2021/0005155 A1 Jan. 7, 2021

(30) Foreign Application Priority Data
Mar. 29, 2018 (JP) .............................. JP2018-065067

(51) Int. Cl.
*G09G 3/36* (2006.01)
(52) U.S. Cl.
CPC ..... *G09G 3/3688* (2013.01); *G09G 2330/021* (2013.01)

(58) Field of Classification Search
CPC ...... G09G 3/36; G09G 3/3611; G09G 3/3614; G09G 3/3622; G09G 3/3625; G09G 3/364;
(Continued)

(56) References Cited

U.S. PATENT DOCUMENTS 6,600,472 B1 7/2003 Nakai et al.
7,154,569 B2 12/2006 Lee et al.
(Continued)

FOREIGN PATENT DOCUMENTS

CN 101089712 A 12/2007
CN 101601081 A 12/2009
(Continued)

OTHER PUBLICATIONS

International Search Report (Application No. PCT/IB2019/052292) dated Jul. 2, 2019.
(Continued)

*Primary Examiner* — Alexander Eisen
*Assistant Examiner* — Nelson Lam
(74) *Attorney, Agent, or Firm* — Fish & Richardson P.C.

(57) ABSTRACT

A display device in which high voltage can be applied to a display element is provided. A display element includes a pixel provided with a display element including a pixel electrode and a common electrode, and the pixel is electrically connected to a first data line and a second data line. Supply of a first potential to the pixel through the first data line and supply of a second potential to the pixel through the second data line are performed concurrently, and then a third potential is supplied to the pixel through the second data line, whereby the first potential held in the pixel is changed to a fourth potential, and the fourth potential is applied to the pixel electrode. Here, the second potential is a potential calculated based on the first potential. When the value of the (Continued)

second potential is less than or equal to a potential applied to the common electrode, the third potential is higher than the potential applied to the common electrode. In contrast, when the value of the second potential is greater than or equal to the potential applied to the common electrode, the third potential is lower than the potential applied to the common electrode.

8 Claims, 21 Drawing Sheets

(58) Field of Classification Search
CPC .. G09G 3/3644; G09G 3/3655; G09G 3/3659; G09G 3/3674; G09G 3/3677; G09G 3/3681; G09G 3/3685; G09G 3/3688; G09G 3/3692; G09G 3/3696
USPC .................................................. 345/87–104
See application file for complete search history.

(56) References Cited

U.S. PATENT DOCUMENTS

| | | | |
|---|---|---|---|
| 7,821,285 B2 | 10/2010 | Kawaura et al. | |
| 7,965,345 B2 | 6/2011 | Kim et al. | |
| 7,995,155 B2 | 8/2011 | Yang et al. | |
| 8,194,018 B2 | 6/2012 | Nagata | |
| 8,519,990 B2 | 8/2013 | Yamazaki et al. | |
| 8,576,153 B2* | 11/2013 | Park | G09G 3/3659 345/96 |
| 8,884,852 B2 | 11/2014 | Yamamoto et al. | |
| 8,976,090 B2 | 3/2015 | Yamamoto et al. | |
| 9,110,344 B2 | 8/2015 | Kim et al. | |
| 9,134,581 B2 | 9/2015 | Yang et al. | |
| 9,245,935 B2 | 1/2016 | Miyake | |
| 9,985,139 B2 | 5/2018 | Nomura | |
| 2002/0033440 A1* | 3/2002 | Morita | G09G 3/3688 250/208.1 |
| 2003/0063109 A1* | 4/2003 | Motai | G09G 3/3659 345/690 |
| 2007/0109238 A1* | 5/2007 | Lee | G02F 1/1362 345/87 |
| 2007/0132695 A1* | 6/2007 | Kim | G09G 3/3611 345/98 |
| 2007/0152921 A1 | 7/2007 | Osame | |
| 2007/0195041 A1* | 8/2007 | Lee | G09G 3/2074 345/89 |
| 2007/0285369 A1* | 12/2007 | Park | G09G 3/3659 345/90 |
| 2008/0001901 A1* | 1/2008 | Lee | G09G 3/3688 345/100 |
| 2008/0117348 A1* | 5/2008 | Chen | G09G 3/3648 349/46 |
| 2010/0289830 A1 | 11/2010 | Yamamoto et al. | |
| 2011/0122055 A1* | 5/2011 | Lee | G02F 1/136286 345/92 |
| 2012/0086700 A1 | 4/2012 | Numao | |
| 2012/0223978 A1 | 9/2012 | Yamamoto et al. | |
| 2014/0291640 A1 | 10/2014 | Miyake | |
| 2015/0170600 A1* | 6/2015 | Jinda | G09G 3/3696 345/206 |
| 2016/0104404 A1* | 4/2016 | Peng | G09G 3/3406 345/205 |
| 2016/0133751 A1* | 5/2016 | Nomura | H01L 29/04 345/520 |
| 2016/0275863 A1 | 9/2016 | Kimura et al. | |

FOREIGN PATENT DOCUMENTS

| | | |
|---|---|---|
| CN | 101887689 A | 11/2010 |
| CN | 102654979 A | 9/2012 |
| CN | 107078166 A | 8/2017 |
| EP | 2124221 A | 11/2009 |
| JP | 11-271713 A | 10/1999 |
| JP | 2004-272259 A | 9/2004 |
| JP | 2009-128900 A | 6/2009 |
| JP | 2010-266494 A | 11/2010 |
| JP | 2011-227479 A | 11/2011 |
| JP | 2012-185328 A | 9/2012 |
| JP | 2014-211631 A | 11/2014 |
| JP | 2018-189992 A | 11/2018 |
| KR | 2010-0122443 A | 11/2010 |
| KR | 2014-0120272 A | 10/2014 |
| WO | WO-2003/075077 | 9/2003 |
| WO | WO-2016/076954 | 5/2016 |

OTHER PUBLICATIONS

Written Opinion (Application No. PCT/IB2019/052292) dated Jul. 2, 2019.
Chinese Office Action (Application No. 201980021028.4) dated Dec. 28, 2021.
Taiwanese Office Action (Application No. 108110765) dated Feb. 20, 2023.

* cited by examiner

METHOD FOR OPERATING DISPLAY DEVICE WITH POTENTIALS HIGHER AND LOWER THAN MAXIMUM AND MINIMUM POTENTIALS GENERATED BY SOURCE DRIVER CIRCUIT

CROSS REFERENCE TO RELATED APPLICATIONS

This application is a U.S. National Phase Application under 35 U.S.C. § 371 of International Application PCT/IB2019/052292, filed on Mar. 21, 2019, which is incorporated by reference and claims the benefit of a foreign priority application filed in Japan on Mar. 29, 2018, as Application No. 2018-065067.

TECHNICAL FIELD

One embodiment of the present invention relates to a display device and an operating method therefor.

Note that one embodiment of the present invention is not limited to the above technical field. The technical field of one embodiment of the invention disclosed in this specification and the like relates to an object, a method, or a manufacturing method. Alternatively, one embodiment of the present invention relates to a process, a machine, manufacture, or a composition of matter. Specific examples of the technical field of one embodiment of the present invention disclosed in this specification include a semiconductor device, a display device, a liquid crystal display device, a light-emitting device, a lighting device, a power storage device, a memory device, an imaging device, a driving method thereof, and a manufacturing method thereof.

In this specification and the like, a semiconductor device generally means a device that can function by utilizing semiconductor characteristics. A display device (a liquid crystal display device, a light-emitting display device, and the like), a projection device, a lighting device, an electro-optical device, a power storage device, a memory device, a semiconductor circuit, an imaging device, an electronic device, and the like can sometimes be regarded as a semiconductor device in some cases. Alternatively, they can sometimes be regarded as including a semiconductor device.

BACKGROUND ART

Patent Document 1 discloses a display device that has high withstand voltage so that a display element can be driven with high voltage.

REFERENCE

Patent Document

[Patent Document 1] Japanese Published Patent Application No. 2011-227479

SUMMARY OF THE INVENTION

Problems to be Solved by the Invention

In order to drive a display element such as a liquid crystal element with high voltage, a source driver circuit capable of generating a high potential is needed. However, such a source driver circuit occupies a large area and entails high costs.

An object of one embodiment of the present invention is to provide a display device in which a potential higher than the maximum potential that can be generated by a source driver circuit and a potential lower than the minimum potential that can be generated by the source driver circuit can be applied to one electrode of a display element. Another object is to provide a display device in which high voltage can be applied to a display element. Another object is to provide a small display device. Another object is to provide an inexpensive display device. Another object is to provide a display device that can display a high-luminance image. Another object is to provide a display device with low power consumption. Another object is to provide a highly reliable display device. Another object is to provide a display device that operates at high speed. Another object is to provide a display device that can display a high-quality image. Another object is to provide a novel display device.

Another object is to provide a method for operating a display device in which a potential higher than the maximum potential that can be generated by a source driver circuit and a potential lower than the minimum potential that can be generated by the source driver circuit can be applied to one electrode of a display element. Another object is to provide a method for operating a display device in which high voltage can be applied to a display element. Another object is to provide a method for operating a small display device. Another object is to provide a method for operating an inexpensive display device. Another object is to provide a method for operating a display device that can display a high-luminance image. Another object is to provide a method for operating a display device having low power consumption. Another object is to provide a method for operating a highly reliable display device. Another object is to provide a method for operating a display device that operates at high speed. Another object is to provide a method for operating a display device that can display a high-quality image. Another object is to provide a method for operating a novel display device.

Note that the description of these objects does not preclude the existence of other objects. One embodiment of the present invention does not have to achieve all the objects. Other objects will be apparent from and can be derived from the description of the specification, the drawings, the claims, and the like.

Means for Solving the Problems

One embodiment of the present invention is a method for operating a display device including a pixel provided with a display element including a pixel electrode and a common electrode, wherein the pixel is electrically connected to a first data line and a second data line. Supply of a first potential to the pixel through the first data line and supply of a second potential to the pixel through the second data line are performed concurrently, and then a third potential is supplied to the pixel through the second data line, whereby the first potential held in the pixel is changed to a fourth potential, and the fourth potential is applied to the pixel electrode. The second potential is a potential calculated based on the first potential. When a value of the second potential is less than or equal to a potential applied to the common electrode, the third potential is higher than the potential applied to the common electrode. When the value of the second potential is greater than or equal to the potential applied to the common electrode, the third potential is lower than the potential applied to the common electrode.

In the above embodiment, the third potential may be a potential greater than or equal to a maximum value possible for the first potential, or a potential less than or equal to a minimum value possible for the first potential.

In the above embodiment, the display device may include a source driver circuit, the source driver circuit may be electrically connected to the first data line, the source driver circuit may be electrically connected to the second data line, and the source driver circuit may have a function of generating the first potential and the second potential.

One embodiment of the present invention is a method for operating a display device including a pixel provided with a display element including a pixel electrode and a common electrode, wherein the pixel is electrically connected to a first data line and a second data line. The display device operates according to a first operation and a second operation. In the first operation, supply of a first potential to the pixel through the first data line and supply of a second potential to the pixel through the second data line are performed concurrently, and then a third potential is supplied to the pixel through the second data line, whereby the first potential held in the pixel is changed to a fourth potential, and the fourth potential is applied to the pixel electrode. The second potential is a potential that is calculated based on the first potential and has a value less than or equal to a potential applied to the common electrode. The third potential is a potential having a value greater than the potential applied to the common electrode. The fourth potential is a potential having a value greater than or equal to the potential applied to the common electrode. In the second operation, supply of a fifth potential to the pixel through the first data line and supply of a sixth potential to the pixel through the second data line are performed concurrently, and then a seventh potential is supplied to the pixel through the second data line, whereby the fifth potential held in the pixel is changed to an eighth potential, and the eighth potential is applied to the pixel electrode. The sixth potential is a potential that is calculated based on the fifth potential and has a value greater than or equal to the potential applied to the common electrode. The seventh potential is a potential having a value less than the potential applied to the common electrode. The eighth potential is a potential having a value less than or equal to the potential applied to the common electrode.

In the above embodiment, the third potential may be a potential greater than or equal to a maximum value possible for the first potential, and the seventh potential may be a potential greater than or equal to a minimum value possible for the fifth potential.

In the above embodiment, a range of values possible for the first potential and a range of values possible for the fifth potential may be equal to each other.

In the above embodiment, an operation according to the first operation and an operation according to the second operation may be alternately performed every frame period.

Alternatively, in the above embodiment, the display device may include a source driver circuit; the source driver circuit may be electrically connected to the first data line; the source driver circuit may be electrically connected to the second data line; and the source driver circuit may have a function of generating the first potential, the second potential, the fifth potential, and the sixth potential.

In the above embodiment, the pixel may include a first transistor, a second transistor, and a capacitor; one of a source and a drain of the first transistor may be electrically connected to one electrode of the capacitor; the other of the source and the drain of the first transistor may be electrically connected to the first data line; one of a source and a drain of the second transistor may be electrically connected to the other electrode of the capacitor; and the other of the source and the drain of the second transistor may be electrically connected to the second data line.

In the above embodiment, each of the first transistor and the second transistor may include a metal oxide in its channel formation region, and the metal oxide may contain In, Zn, and M (M is Al, Ti, Ga, Sn, Y, Zr, La, Ce, Nd, or Hf).

In the above embodiment, the display element may be a liquid crystal element.

Effect of the Invention

According to one embodiment of the present invention, it is possible to provide a display device in which a potential higher than the maximum potential that can be generated by a source driver circuit and a potential lower than the minimum potential that can be generated by the source driver circuit can be applied to one electrode of a display element. Alternatively, a display device in which high voltage can be applied to a display element can be provided. Alternatively, a small display device can be provided. Alternatively, an inexpensive display device can be provided. Alternatively, a display device capable of displaying a high-luminance image can be provided. Alternatively, a display device with low power consumption can be provided. Alternatively, a highly reliable display device can be provided. Alternatively, a display device that operates at high speed can be provided. Alternatively, a display device capable of displaying a high-quality image can be provided. Alternatively, a novel display device can be provided.

Alternatively, it is possible to provide a method for operating a display device in which a potential higher than the maximum potential that can be generated by a source driver circuit and a potential lower than the minimum potential that can be generated by the source driver circuit can be applied to one electrode of a display element. Alternatively, a method for operating a display device in which high voltage can be applied to a display element can be provided. Alternatively, a method for operating a small display device can be provided. Alternatively, a method for operating an inexpensive display device can be provided. Alternatively, a method for operating a display device capable of displaying a high-luminance image can be provided. Alternatively, a method for operating a low-power-consumption display device can be provided. Alternatively, a method for operating a highly reliable display device can be provided. Alternatively, a method for operating a display device that operates at high speed can be provided. Alternatively, a method for operating a display device capable of displaying a high-quality image can be provided. Alternatively, a method for operating a novel display device can be provided.

Note that the description of these effects does not preclude the existence of other effects. One embodiment of the present invention does not need to have all the effects. Other effects can be derived from the description of the specification, the drawings, and the claims.

MODE FOR CARRYING OUT THE INVENTION

Figure 1A:
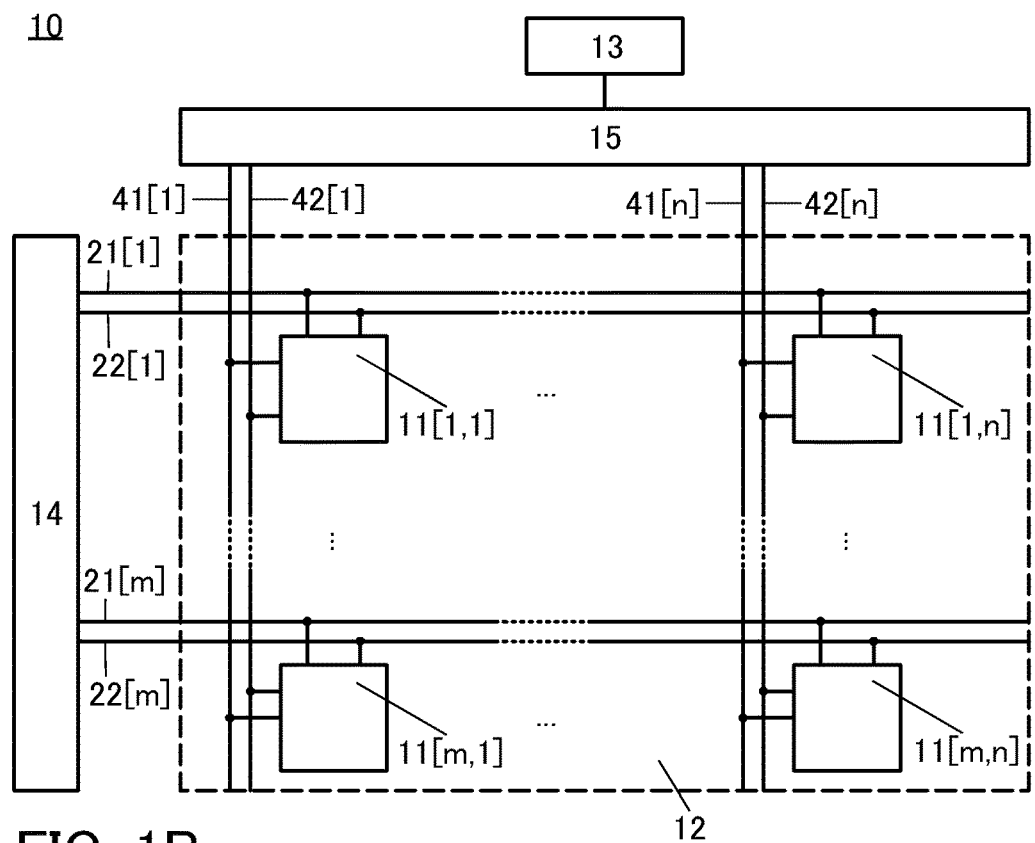
FIGS. 1A and 1B A diagram illustrating an example of a display device and a diagram illustrating an example of a pixel.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. Thus, the present invention should not be construed as being limited to the description in the following embodiments.

Note that in structures of the present invention described below, the same portions or portions having similar functions are denoted by the same reference numerals in different drawings, and the description thereof is not repeated. Furthermore, the same hatch pattern is used for the portions having similar functions, and the portions are not especially denoted by reference numerals in some cases.

The position, size, range, or the like of each component illustrated in drawings does not represent the actual position, size, range, or the like in some cases for easy understanding. Therefore, the disclosed invention is not necessarily limited to the position, size, range, or the like disclosed in the drawings.

Note that the term "film" and the term "layer" can be interchanged with each other depending on the case or circumstances. For example, the term "conductive layer" can be changed into the term "conductive film". As another example, the term "insulating film" can be changed into the term "insulating layer".

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases. That is, an OS FET can also be called a transistor including a metal oxide or an oxide semiconductor.

In this specification and the like, a metal oxide containing nitrogen is also collectively referred to as a metal oxide in some cases. A metal oxide containing nitrogen may be referred to as a metal oxynitride.

Embodiment 1

In this embodiment, a display device that is one embodiment of the present invention and an operating method therefor will be described with reference to drawings.

One embodiment of the present invention relates to a method for operating a display device including a pixel provided with a display element including a pixel electrode and a common electrode. Here, a liquid crystal element can be used as the display element. A display device of one embodiment of the present invention includes a source driver circuit. The pixel is electrically connected to the source driver circuit through a first data line and is electrically connected to the source driver circuit through a second data line.

A constant potential, for example, can be applied to the common electrode. For example, a potential that is the average of the maximum potential that can be generated by the source driver circuit and the minimum potential that can be generated by the source driver circuit can be applied to the common electrode.

In the display device of one embodiment of the present invention, first, a first potential that is a potential corresponding to image data is supplied to the pixel through the first data line. Specifically, the first potential is supplied to the pixel electrode, for example. In parallel with this, a second potential that is a potential calculated based on the first potential is supplied to the pixel through the second data line. The supplied first potential and second potential are held inside the pixel.

Next, a third potential is supplied to the pixel through the second data line in a manner similar to that of the second potential. Thus, the second potential held in the pixel is overwritten by the third potential. By overwriting the second potential by the third potential, the first potential held in the pixel is changed to a fourth potential. Accordingly, the fourth potential can be applied to the pixel electrode.

The first to third potentials are potentials generated by the source driver circuit, for example. Therefore, the first to third potentials cannot be higher than the maximum potential that can be generated by the source driver circuit, and cannot be lower than the minimum potential that can be generated by the source driver circuit. Meanwhile, the fourth potential is a potential generated inside the pixel on the basis of the first to third potentials.

Here, the amount of difference between the fourth potential and the first potential corresponds to the amount of difference between the third potential and the second potential. That is, the fourth potential becomes higher as the first potential is higher, for example, and as the difference between the third potential and the second potential is larger. In one embodiment of the present invention, the fourth potential can be a potential higher than the maximum potential that can be generated by the source driver circuit, and can be a potential lower than the minimum potential that can be generated by the source driver circuit. For example, a voltage applied to the display element can be greater than twice the output voltage amplitude of the source driver circuit. For example, in the case where the source driver circuit is capable of generating a potential higher than or equal to −5 V and lower than or equal to 5 V and a potential applied to the common electrode is a ground potential (0 V), the fourth potential can be a potential higher than or equal to 10 V and can be a potential lower than or equal to −10 V.

In this specification and the like, a voltage applied to a display element refers to the absolute value of a difference between a potential applied to one electrode of the display element and a potential applied to the other electrode of the display element, and for example, refers to the absolute value of a difference between a potential applied to a pixel electrode and a potential applied to a common electrode.

Here, in order to increase the difference between the third potential and the second potential, the third potential can be a potential whose polarity is different from that of the second potential, for example. Moreover, the third potential can be the maximum potential or the minimum potential that can be generated by the source driver circuit, for example. For instance, in the case where the source driver circuit is capable of generating a potential higher than or equal to −5 V and lower than or equal to 5 V, the third potential can be −5 V when the second potential is a positive potential and the third potential can be 5 V when the second potential is a negative potential. Note that in the case where the source driver circuit is capable of generating a potential higher than or equal to −5 V and lower than or equal to 5 V, for example, a potential applied to the common electrode can be a ground potential, which is the average of −5 V and 5 V.

In this specification and the like, the polarity of a potential can be determined using a potential applied to a common electrode as a reference, for example. It can be said, for example, that a potential higher than the potential applied to the common electrode and a potential lower than the potential applied to the common electrode have different polarities from each other.

Note that the third potential is not necessarily generated by the source driver circuit. For example, a power supply circuit provided outside the source driver circuit may generate the third potential. When a circuit other than the source driver circuit generates the third potential, the third potential can be a potential higher than or equal to the maximum potential that can be generated by the source driver circuit or a potential lower than or equal to the minimum potential that can be generated by the source driver circuit. Thus, the difference between the third potential and the second potential can be further increased.

In the display device of one embodiment of the present invention, as described above, a potential higher than the maximum potential that can be generated by the source driver circuit and a potential lower than the minimum potential that can be generated by the source driver circuit can be applied to the pixel electrode as the fourth potential. Thus, high voltage can be applied to the display element; hence, it is possible to use a display element to which high voltage is preferably applied at the time of the operation. For example, liquid crystal exhibiting a blue phase or polymer-dispersed liquid crystal (PDLC) can be used for the display element. Moreover, high voltage can be applied to the display element even when the output voltage amplitude of the source driver circuit is small, so that the power consumption of the display device of one embodiment of the present invention can be reduced. Furthermore, high voltage can be applied to the display element even when the source driver circuit does not have high withstand voltage; thus, the display device of one embodiment of the present invention can be small in size and inexpensive.

FIG. 1(A) is a diagram illustrating a structure example of a display device 10 that is the display device of one embodiment of the present invention. The display device 10 includes a display portion 12 in which pixels 11 are arranged in a matrix of m rows and n columns, an image data generator circuit 13, a gate driver circuit 14, and a source driver circuit 15.

In this specification and the like, the pixel 11 in an i-th row and a j-th column (i is an integer greater than or equal to 1 and less than or equal to m, and j is an integer greater than or equal to 1 and less than or equal to n) is denoted as a pixel 11[$i,j$].

The image data generator circuit 13 is electrically connected to the source driver circuit 15. The pixels 11 in the same row are electrically connected to the gate driver circuit 14 through one wiring 21 and are electrically connected to the gate driver circuit 14 through one wiring 22. The pixels 11 in the same column are electrically connected to the source driver circuit 15 through one wiring 41 and are electrically connected to the source driver circuit 15 through one wiring 42.

The image data generator circuit 13 has a function of generating image data corresponding to an image to be displayed on the display portion 12. The gate driver circuit 14 has a function of generating a potential for controlling the operation of the pixel 11. The source driver circuit 15 has a function of generating a potential corresponding to image data, for example.

In this specification and the like, the wiring 21 and the wiring 22 that are electrically connected to the pixel 11[$i,1$] to the pixel 11[$i,n$] are denoted as a wiring 21[$i$] and a wiring 22[$i$]. Furthermore, the wiring 41 and the wiring 42 that are electrically connected to the pixel 11[$1,j$] to the pixel 11[$m,j$] are denoted as a wiring 41[$j$] and a wiring 42[$j$].

The wiring 21 and the wiring 22 have a function of a scan line. The wiring 41 and the wiring 42 have a function of a data line.

Figure 1B:
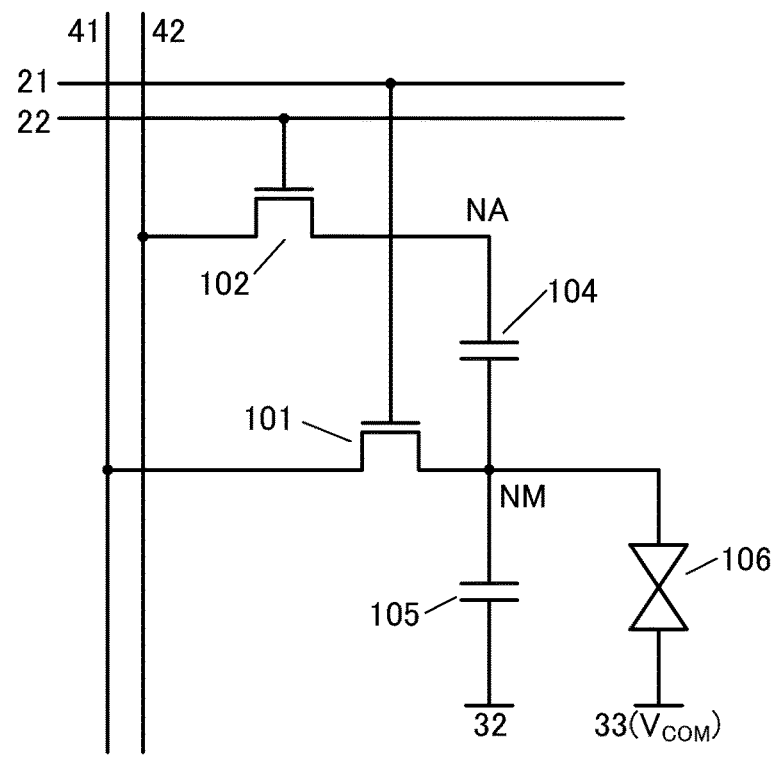

FIG. 1(B) is a diagram illustrating a configuration example of the pixel 11. The pixel 11 includes a transistor 101, a transistor 102, a capacitor 104, a capacitor 105, and a display element 106. A liquid crystal element can be used as the display element 106, for example.

One of a source and a drain of the transistor 101 is electrically connected to one electrode of the capacitor 104. One of a source and a drain of the transistor 102 is electrically connected to the other electrode of the capacitor 104. The one electrode of the capacitor 104 is electrically connected to one electrode of the capacitor 105. The one electrode of the capacitor 105 is electrically connected to one electrode of the display element 106.

Here, the one electrode of the display element 106 can serve as a pixel electrode, for example. The other electrode of the display element 106 can serve as a common electrode, for example.

A node where the one of the source and the drain of the transistor 101, the one electrode of the capacitor 104, the one electrode of the capacitor 105, and the one electrode of the display element 106 are electrically connected to each other is referred to as a node NM. A node where the one of the source and the drain of the transistor 102 and the other electrode of the capacitor 104 are electrically connected to each other is referred to as a node NA.

A gate of the transistor 101 is electrically connected to the wiring 21. A gate of the transistor 102 is electrically connected to the wiring 22. The other of the source and the drain of the transistor 101 is electrically connected to the wiring 41. The other of the source and the drain of the transistor 102 is electrically connected to the wiring 42.

The other electrode of the capacitor 105 is electrically connected to a common wiring 32. The other electrode of the display element 106 is electrically connected to a common wiring 33. A potential $V_{COM}$ can be supplied to the common wiring 33. The potential $V_{COM}$ can be, for example, a constant potential. The potential $V_{COM}$ can be, for example, a potential that is the average of the maximum potential that can be generated by the source driver circuit 15 and the minimum potential that can be generated by the source driver circuit 15. The potential $V_{COM}$ can be, for example, a ground potential. Note that a potential supplied to the common wiring 32 can have the same value as the potential $V_{COM}$.

The potential for controlling the conduction and non-conduction of the transistor 101 is supplied to the gate of the transistor 101 through the wiring 21. The potential for controlling the conduction and non-conduction of the transistor 102 is supplied to the gate of the transistor 102 through the wiring 22.

A potential is supplied to the node NM through the wiring 41. A potential is supplied to the node NA through the wiring 42.

Here, the use of a transistor with an extremely low off-state current as the transistor 101 enables long-term retention of a potential supplied to the node NM. Moreover, the use of a transistor with an extremely low off-state current as the transistor 102 enables long-term retention of a potential supplied to the node NA. Examples of the transistor with an extremely low off-state current include a transistor containing a metal oxide in its channel formation region (hereinafter referred to as an OS transistor).

As a semiconductor material used in an OS transistor, a metal oxide whose energy gap is greater than or equal to 2 eV, preferably greater than or equal to 2.5 eV, further preferably greater than or equal to 3 eV can be used. A typical example is an oxide semiconductor containing indium, and a CAAC-OS or a CAC-OS described later can be used, for example. The CAAC-OS is a crystalline oxide semiconductor. A transistor using the crystalline oxide semiconductor can have improved reliability and thus is favorably used in the display device of one embodiment of the present invention. The CAC-OS exhibits excellent mobility characteristics and thus is suitable for a transistor that operates at high speed, for example.

An OS transistor has a large energy gap and thus has an extremely low off-state current. An OS transistor has features that impact ionization, an avalanche breakdown, a short-channel effect, and the like do not occur, for example, which are different from those of a transistor containing Si in its channel formation region (hereinafter referred to as a Si transistor), leading to formation of a highly reliable circuit.

Note that as the transistor 101 and the transistor 102, a transistor other than the OS transistor may be used. Examples of Si transistors include a transistor including amorphous silicon, a transistor including crystalline silicon (typically, low-temperature polysilicon), and a transistor including single crystal silicon.

Next, an example of a method for operating the pixel 11 is described. Specifically, an example of a method for operating the pixel 11[i,j] included in the display device 10 is described. Note that the transistor 101 and the transistor 102 are described as n-channel transistors; when the magnitude relation between the potentials is inverted as appropriate, for example, the following description can also apply to the case where one or both of the transistor 101 and the transistor 102 are p-channel transistors.

Figure 2:
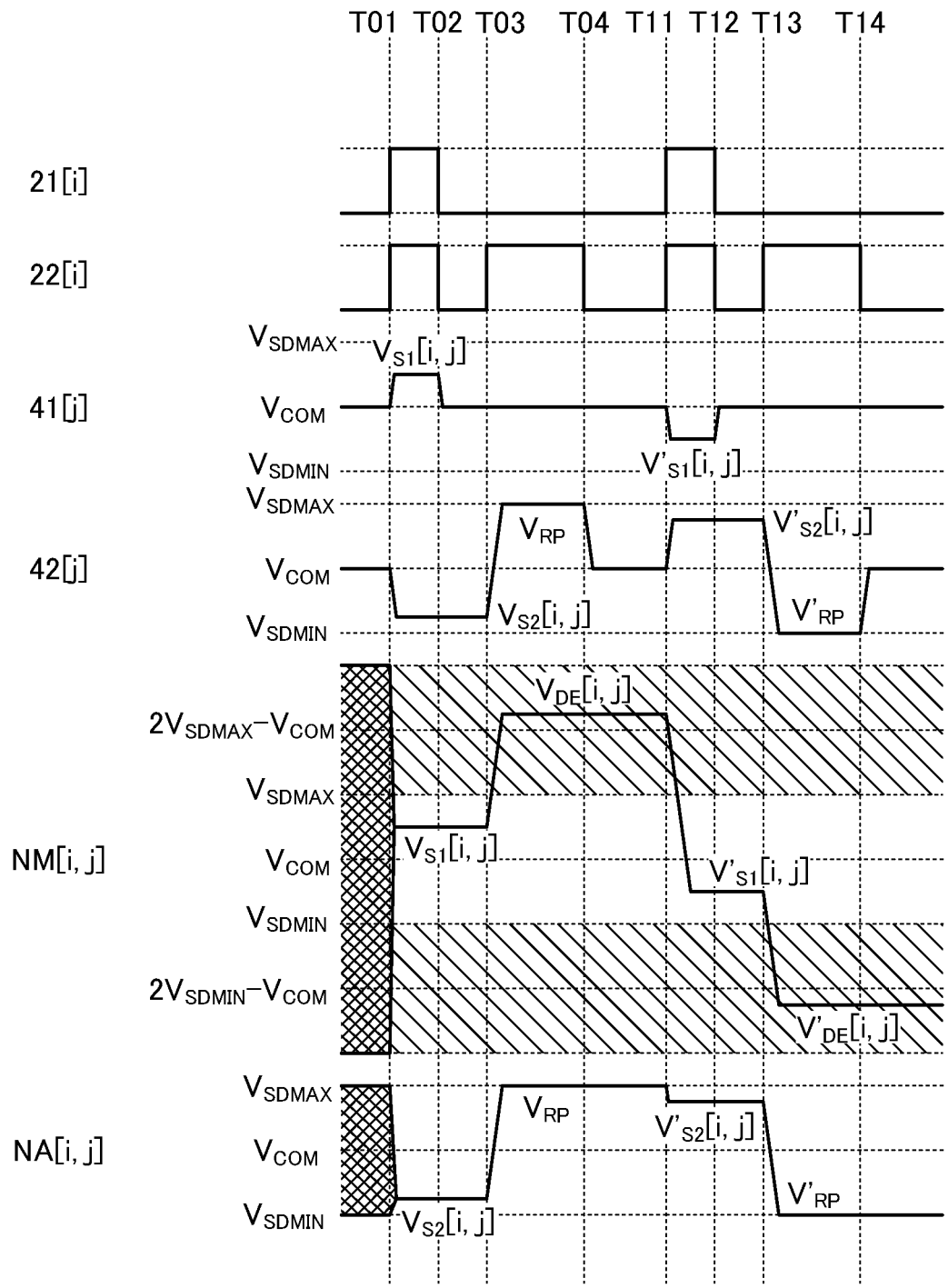
FIG. 2 A diagram illustrating an example of operation of a pixel.

FIG. 2 is a timing chart illustrating an example of a method for operating the pixel 11[i,j]. Here, the display device 10 including the pixel 11[i,j] displays an image for one frame by operation from Time T01 to Time T04, and displays an image for the next one frame by operation from Time T11 to Time T14.

In this specification and the like, for example, the operation between Time T01 and Time T04 is referred to as first operation, and the operation between Time T11 and Time T14 is referred to as second operation. Although the details will be described later, the pixel 11 can perform frame inversion driving by performing the first operation and the second operation alternately.

In FIG. 2 and the like, a potential $V_{SDMAX}$ represents the maximum potential that can be generated by the source driver circuit 15. A potential $V_{SDMIN}$ represents the minimum potential that can be generated by the source driver circuit 15.

In this embodiment, an example of a method for operating the pixel 11 is described, assuming that the potential applied to the other electrode of the display element 106, i.e., the potential $V_{COM}=(V_{SDMAX}+V_{SDMIN})/2$. The capacitive coupling coefficient of the node NM is set to 1. Furthermore, changes in potentials due to the threshold voltage of the transistors, a feedthrough, and the like are not considered.

In this specification and the like, the node NM and the node NA provided in the pixel 11[i,j] are denoted as a node NM[i,j] and a node NA[i,j].

Between Time T01 and Time T02, the potential of the wiring 21[i] and the potential of the wiring 22[i] are set to a high potential. Moreover, the potential of the wiring 41[j] is set to a potential $V_{S1}[i,j]$ that is a potential corresponding to image data, and the potential of the wiring 42[j] is set to a potential $V_{S2}[i,j]$. Accordingly, the transistor 101 and the transistor 102 included in the pixel 11[i,j] are turned on, the potential of the node NM[i,j] becomes the potential $V_{S1}[i,j]$, and the potential of the node NA[i,j] becomes the potential $V_{S2}[i,j]$. Here, the potential $V_{S1}[i,j]$ can be generated by the source driver circuit 15, so that the value of the potential $V_{S1}[i,j]$ can be greater than or equal to the potential $V_{SDMIN}$ and less than or equal to the potential $V_{SDMAX}$. The potential $V_{S2}[i,j]$ can be calculated by the following formula, for example.

[Formula 1]

$$V_{S2}[i,j] = -\frac{V_{S1}[i,j]+V_{SDMAX}}{2}+2V_{COM} \quad (1)$$

Thus, the value of the potential $V_{S2}[i,j]$ can be greater than or equal to the potential $V_{SDMIN}$ and less than or equal to the potential $V_{COM}$. The potential $V_{S2}[i,j]$ can be generated by the source driver circuit 15.

Between Time T02 and Time T03, the potential of the wiring 21[i] and the potential of the wiring 22[i] are set to a low potential. Thus, the transistor 101 and the transistor 102 included in the pixel 11[i,j] are turned off, the potential $V_{S1}[i,j]$ is held in the node NM[i,j], and the potential $V_{S2}[i,j]$ is held in the node NA[i,j].

In this specification and the like, a low potential can be a ground potential or a negative potential, for example. A high potential can be a potential higher than the low potential.

Between Time T03 and Time T04, the potential of the wiring 21[i] is set to a low potential and the potential of the wiring 22[i] is set to a high potential. The potential of the wiring 42[j] is set to a potential $V_{RP}$. Accordingly, the transistor 102 included in the pixel 11[i,j] is turned on, and the potential of the node NA[i,j] becomes the potential $V_{RP}$. On the other hand, the transistor 101 remains off, so that the node NM[i,j] is in a floating state. Thus, the potential of the node NM[i,j] becomes a potential $V_{DE}[i,j]$ expressed by the following formula.

[Formula 2]

$$V_{DE}[i,j]=V_{S1}[i,j]+(V_{RP}-V_{S2}[i,j]) \quad (2)$$

As shown in the above formula, the potential $V_{DE}[i,j]$ can be calculated from the potential $V_{S1}[i,j]$, the potential $V_{S2}[i,j]$, and the potential VP. Thus, the potential $V_{DE}[i,j]$ can be said to be a potential generated inside the pixel 11[i,j] on the basis of the potential $V_{S1}[i,j]$, the potential $V_{S2}[i,j]$, and the potential $V_{RP}$.

When the potential $V_{RP}$ is higher than the potential $V_{COM}$, the potential $V_{DE}[i,j]$ can be higher than a potential "$V_{S1}[i,j]-V_{S2}[i,j]$". As described above, the potential $V_{S2}[i,j]$ can be lower than the potential $V_{COM}$; hence, when the potential $V_{RP}$ is higher than the potential $V_{COM}$, it can be said that the polarity of the potential $V_{RP}$ is different from that of the potential $V_{S2}[i,j]$.

As the potential $V_{RP}$ is higher, the potential $V_{DE}[i,j]$ becomes higher. Although the details will be described later, the value of the potential $V_{DE}[i,j]$ becomes greater than or equal to the potential $V_{COM}$; hence, as the potential $V_{DE}[i,j]$ is higher, a potential "$V_{DE}[i,j]-V_{COM}$" becomes higher. Consequently, as the potential $V_{DE}[i,j]$ is higher, a voltage applied to the display element 106 becomes higher. Note that the potential $V_{RP}$ can be generated by the source driver circuit 15; thus, the value of the potential $V_{RP}$ can be greater than or equal to the potential $V_{SDMIN}$ and less than or equal to the potential $V_{SDMAX}$. In FIG. 2, the value of the potential $V_{RP}$ is the potential $V_{SDMAX}$.

When the potential $V_{S1}[i,j]$ and the potential $V_{RP}$ are made high and the potential $V_{S2}[i,j]$ is made low, the value of the potential $V_{DE}[i,j]$ can be made higher than the potential $V_{SDMAX}$. Moreover, the value of the voltage "$V_{DE}[i,j]-V_{COM}$" applied to the display element 106 can be twice or more a voltage "$V_{SDMAX}-V_{COM}$". That is, the value of the potential $V_{DE}[i,j]$ can be greater than or equal to a potential "$2V_{SDMAX}-V_{COM}$". FIG. 2 shows the case where the value of the potential $V_{DE}[i,j]$ is higher than the potential "$2V_{SDMAX}-V_{COM}$".

In this specification and the like, the output voltage amplitude of the source driver circuit 15 represents the voltage "$V_{SDMAX}-V_{COM}$" or a voltage "$V_{COM}-V_{SDMIN}$".

Furthermore, between Time T03 and Time T04, an image is displayed. For example, in the case where the display element 106 is a transmissive liquid crystal element and a backlight is provided in the display device including the pixels 11, an image corresponding to the potential $V_{DE}[i,j]$ can be displayed using the pixel 11[i,j] by turning on the backlight.

Between Time T04 and Time T11, the potential of the wiring 21 and the potential of the wiring 22 are set to a low potential. Thus, the transistor 101 and the transistor 102 are turned off.

Between Time T11 and Time T12, the potential of the wiring 21[i] and the potential of the wiring 22[i] are set to a high potential. Moreover, the potential of the wiring 41[j] is set to a potential $V'_{S1}[i,j]$ that is a potential corresponding to image data, and the potential of the wiring 42[j] is set to a potential $V'_{S2}[i,j]$. Accordingly, the transistor 101 and the transistor 102 included in the pixel 11[i,j] are turned on, the potential of the node NM[i,j] becomes the potential $V'_{S1}[i,j]$, and the potential of the node NA[i,j] becomes the potential $V'_{S2}[i,j]$. Here, the potential $V'_{S1}[i,j]$ can be generated by the source driver circuit 15, so that the value of the potential $V'_{S1}[i,j]$ can be greater than or equal to the potential $V_{SDMIN}$ and less than or equal to the potential $V_{SDMAX}$. The potential $V'_{S2}[i,j]$ can be calculated by the following formula, for example.

[Formula 3]

$$V'_{S2}[i,j] = -\frac{V'_{S1}[i,j] + V_{SDMIN}}{2} + 2V_{COM} \quad (3)$$

Thus, the value of the potential $V'_{S2}[i,j]$ can be greater than or equal to the potential $V_{COM}$ and less than or equal to the potential $V_{SDMAX}$. The potential $V'_{S2}[i,j]$ can be generated by the source driver circuit 15.

Between Time T12 and Time T13, the potential of the wiring 21[i] and the potential of the wiring 22[i] are set to a low potential. Thus, the transistor 101 and the transistor 102 included in the pixel 11[i,j] are turned off, the potential $V'_{S1}[i,j]$ is held in the node NM[i,j], and the potential $V'_{S2}[i,j]$ is held in the node NA[i,j].

Between Time T13 and Time T14, the potential of the wiring 21[i] is set to a low potential and the potential of the wiring 22[i] is set to a high potential. The potential of the wiring 42[j] is set to a potential $V'_{RP}$. Accordingly, the transistor 102 included in the pixel 11[i,j] is turned on, and the potential of the node NA[i,j] becomes the potential $V'_{RP}$. On the other hand, the transistor 101 remains off, so that the node NM[i,j] is in a floating state. Thus, the potential of the node NM[i,j] becomes a potential $V'_{DE}[i,j]$ expressed by the following formula.

[Formula 4]

$$V'_{DE}[i,j]V'_{S1}[i,j]+(V'_{RP}-V'_{S2}[i,j]) \quad (4)$$

As shown in the above formula, the potential $V'_{DE}[i,j]$ can be calculated from the potential $V'_{S1}[i,j]$, the potential $V'_{S2}[i,j]$, and the potential $V'_{RP}$. Thus, the potential $V'_{DE}[i,j]$ can be said to be a potential generated inside the pixel 11[i,j] on the basis of the potential $V'_{S1}[i,j]$, the potential $V'_{S2}[i,j]$, and the potential $V'_{RP}$.

When the potential $V'_{RP}$ is higher than the potential $V_{COM}$, the potential $V'_{DE}[i,j]$ can be lower than a potential "$V'_{S1}[i,j]-V'_{S2}[i,j]$". As described above, the potential $V'_{S2}[i,j]$ can be higher than the potential $V_{COM}$; hence, when the potential $V'_{RP}$ is lower than the potential $V_{COM}$, it can be said that the polarity of the potential $V'_{RP}$ is different from that of the potential $V'_{S2}[i,j]$.

As the potential $V'_{RP}$ is lower, the potential $V'_{DE}[i,j]$ becomes lower. Although the details will be described later, the value of the potential $V'_{DE}[i,j]$ becomes less than or equal to the potential $V_{COM}$; hence, as the potential $V'_{DE}[i,j]$ is lower, a potential "$V_{COM}-V'_{DE}[i,j]$" becomes higher. Consequently, as the potential $V'_{DE}[i,j]$ is lower, a voltage applied to the display element 106 becomes higher. Note that the potential $V'_{RP}$ can be generated by the source driver circuit 15; thus, the value of the potential $V'_{RP}$ can be greater than or equal to the potential $V_{SDMIN}$ and less than or equal to the potential $V_{SDMAX}$. In FIG. 2, the value of the potential $V'_{RP}$ is the potential $V_{SDMIN}$.

When the potential $V'_{S1}[i,j]$ and the potential $V'_{RP}$ are made low and the potential $V'_{S2}[i,j]$ is made high, the value of the potential $V'_{DE}[i,j]$ can be made lower than the potential $V_{SDMIN}$. Moreover, the value of the voltage "$V_{COM}-V'_{DE}[i,j]$" applied to the display element 106 can be twice or more the voltage "$V_{COM}-V_{SDMIN}$". That is, the value of the potential $V'_{DE}[i,j]$ can be less than or equal to "$2V_{SDMIN}-V_{COM}$". FIG. 2 shows the case where the value of the potential $V'_{DE}[i,j]$ is lower than the potential "$2V_{SDMIN}-V_{COM}$".

Furthermore, between Time T13 and Time T14, an image is displayed. For example, in the case where the display element 106 is a transmissive liquid crystal element and a backlight is provided in the display device including the pixels 11, an image corresponding to the potential $V'_{DE}[i,j]$ can be displayed using the pixel 11[i,j] by turning on the backlight.

As described above, the value of the potential $V_{DE}[i,j]$ becomes greater than or equal to the potential $V_{COM}$ and the value of the potential $V'_{DE}[i,j]$ becomes less than or equal to the potential $V_{COM}$. Thus, frame inversion driving is performed by the operation after Time T1. Accordingly, the pixel 11 can perform frame inversion driving by performing the first operation and the second operation alternately every frame period, for example.

In the case where frame inversion driving is performed, the use of a liquid crystal element as the display element 106 can reduce deterioration of the display element 106, compared to the case where frame inversion driving is not performed. Thus, the reliability of the display device including the pixels 11 can be increased.

After Time T14, the potential of the wiring 21[i] and the potential of the wiring 22[i] are set to a low potential. Consequently, the transistor 101 and the transistor 102 included in the pixel 11[i,j] are turned off. The above is an example of the method for operating the pixel 11[i,j]. Note that although the potential of the wiring 41 before Time T01, between Time T02 and Time T11, and after Time T12 is the potential $V_{COM}$ in FIG. 2, the potential of the wiring 41[j] in these periods is not limited to the potential $V_{COM}$ and can be set to a given potential. Moreover, although the potential of the wiring 42 before Time T01, between Time T04 and Time T11, and after Time T14 is the potential $V_{COM}$, the potential of the wiring 42[j] in these periods is not limited to the potential $V_{COM}$ and can be set to a given potential.

Note that the values of the potential $V_{S1}$, the potential $V_{S2}$, and the potential $V_{DE}$ and the values of the potential $V'_{S1}$, the potential $V'_{S2}$, and the potential $V'_{DE}$ are different between the pixels 11. Therefore, these potentials supplied to the pixel 11[i,j] are shown with the addition of a reference symbol [i,j]. On the other hand, the value of the potential $V_{RP}$ and the value of the potential $V'_{RP}$ can be equal in all the pixels 11, for example. Therefore, the potential $V_{RP}$ and the potential $V'_{RP}$ supplied to the pixels 11 are not added with the reference symbol [i,j].

In the display device 10, supply of the potential $V_{S1}$ and the potential $V_{S2}$ to the pixels 11 and supply of the potential $V'_{S1}$ and the potential $V'_{S2}$ to the pixels 11 can be performed on the pixels 11 row by row, that is, in a line sequential manner. Meanwhile, the potential $V_{RP}$ and the potential $V'_{RP}$ can be concurrently supplied to all the pixels 11, for example. That is, in the display device 10, the potential $V_{RP}$ and the potential $V'_{RP}$ can be supplied to the pixels 11 in an area sequential manner.

As described above, in the display device 10, the operation between Time T01 and Time T03 shown in FIG. 2 can be performed on all the pixels 11 in a line sequential manner, and then the operation between Time T03 and Time T11 can be performed in an area sequential manner. After that, the operation between Time T11 and Time T13 can be performed on all the pixels 11 in a line sequential manner, and then the operation after Time T13 can be performed in an area sequential manner.

Supplying the potential $V_{RP}$ and the potential $V'_{RP}$ to the pixels 11 in an area sequential manner allows the display device 10 to operate at higher speed than the case where these potentials are supplied in a line sequential manner or the like.

Figure 3A:
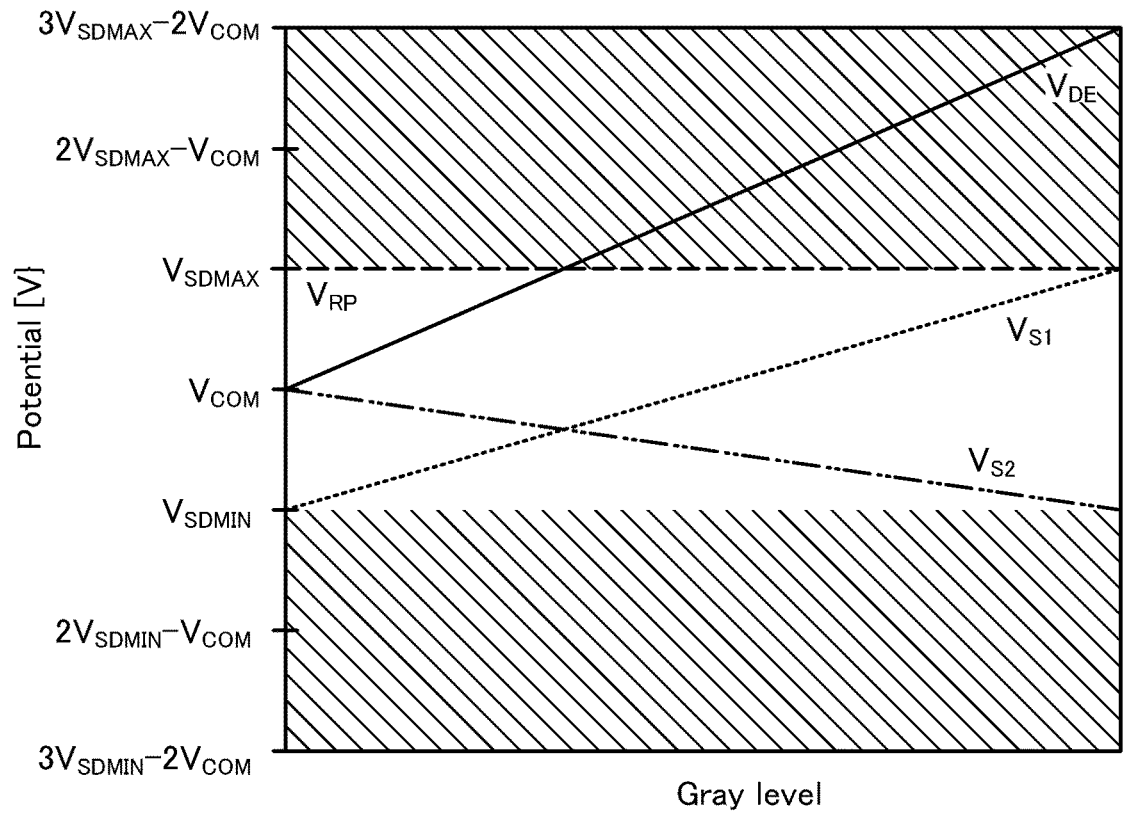
FIGS. 3A and 3B Diagrams illustrating examples of a relation between potentials supplied to a pixel and gray level of an image displayed by the pixel.

FIG. 3(A) is a graph showing a relation between the values of the potential $V_{S1}$, the potential $V_{S2}$, the potential $V_{RP}$, and the potential $V_{DE}$ and the gray level that image data expresses. Here, when the pixel 11 displays an image, the luminance of light emitted from the pixel 11 can be increased as the gray level is higher, for example. For instance, in the case where the gray level is expressed using 8-bit image data per pixel 11, there can be 256 levels of luminance of light emitted from the pixel 11.

In FIG. 3(A), a dotted line within the graph frame represents the potential $V_{S1}$, a dashed-two dotted line represents the potential $V_{S2}$, a dashed line represents the potential $V_{RP}$, and a solid line represents the potential $V_{DE}$. Within the graph frame, a portion indicating potentials higher than the potential $V_{SDMAX}$ and a portion indicating potentials lower than the potential $V_{SDMIN}$ are hatched. Note that also in FIG. 2 and the like, a portion indicating potentials higher than the potential $V_{SDMAX}$ and a portion indicating potentials lower than the potential $V_{SDMIN}$ are hatched as in FIG. 3(A).

As shown in FIG. 3(A), the value of the potential $V_{S1}$ can be the potential $V_{SDMIN}$ for the lowest gray level, and can be the potential $V_{SDMAX}$ for the highest gray level. The value of the potential $V_{S2}$ can be the potential $V_{COM}$ for the lowest gray level, and can be the potential $V_{SDMIN}$ for the highest gray level. Here, by setting the value of the potential $V_{RP}$ to the potential $V_{SDMAX}$ regardless of the gray level, the value of the potential $V_{DE}$ can be the potential $V_{COM}$ for the lowest gray level, and can be a potential "$3V_{SDMAX}-2V_{COM}$" for the highest gray level. That is, for the highest gray level, a voltage "$V_{DE}-V_{COM}$" applied to the display element 106 can be three times the output voltage amplitude "$V_{SDMAX}-V_{COM}$" of the source driver circuit 15.

Figure 3B:
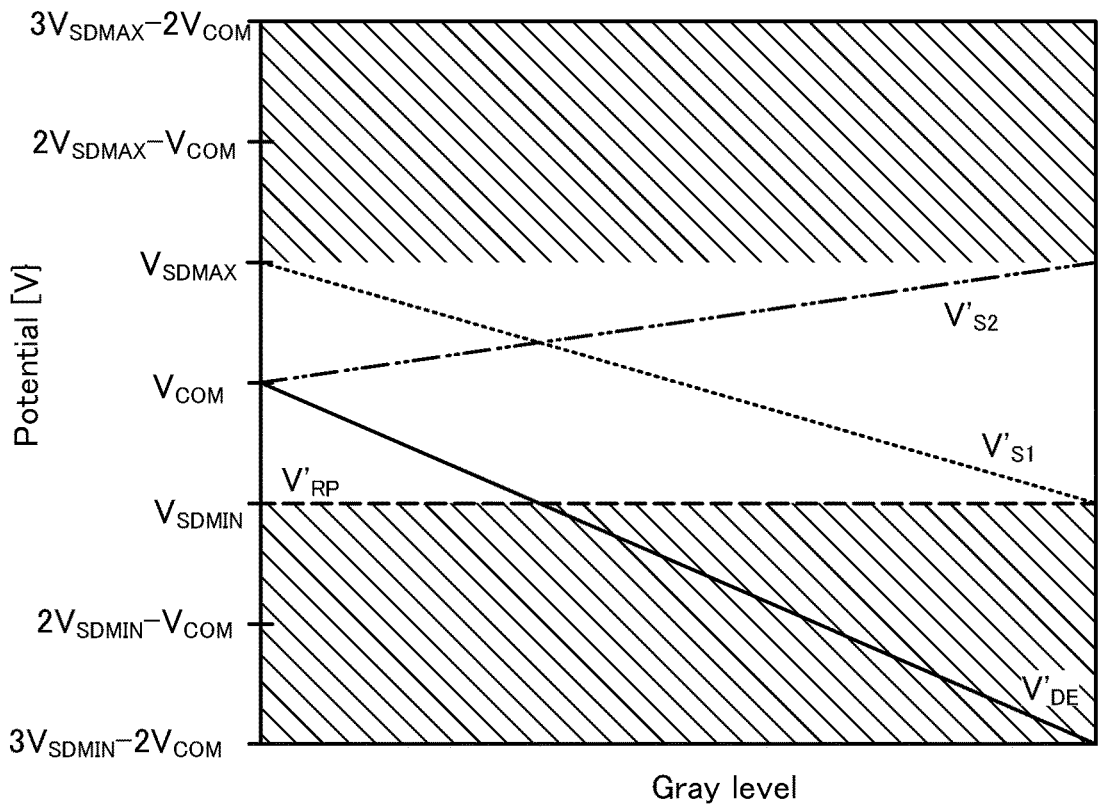

FIG. 3(B) is a graph showing a relation between the values of the potential $V'_{S1}$, the potential $V'_{S2}$, the potential $V'_{RP}$, and the potential $V'_{DE}$ and the gray level that image data expresses.

As shown in FIG. 3(B), the value of the potential $V'_{S1}$ can be the potential $V_{SDMAX}$ for the lowest gray level, and can be the potential $V_{SDMIN}$ for the highest gray level. The value of the potential $V'_{S2}$ can be the potential $V_{COM}$ for the lowest gray level, and can be the potential $V_{SDMAX}$ for the highest gray level. Here, by setting the value of the potential $V'_{RP}$ to the potential $V_{SDMIN}$ regardless of the gray level, the value of the potential V'$_{DE}$ can be the potential V$_{COM}$ for the lowest gray level, and can be a potential "3V$_{SDMIN}$–2V$_{COM}$" for the highest gray level. That is, for the highest gray level, the voltage "V$_{COM}$-V'$_{DE}$" applied to the display element 106 can be three times the output voltage amplitude "V$_{COM}$– V$_{SDMIN}$" of the source driver circuit 15.

As illustrated in FIG. 2 and FIGS. 3(A) and 3(B), in the display device 10, a potential higher than the maximum potential that can be generated by the source driver circuit 15 and a potential lower than the minimum potential that can be generated by the source driver circuit 15 can be applied to the one electrode of the display element 106. For example, when the gray level is high, the voltage applied to the display element 106 can be more than twice the output voltage amplitude of the source driver circuit 15. Accordingly, in the display device 10, high voltage can be applied to the display element 106; hence, a display element to which high voltage is preferably applied at the time of the operation can be used as the display element 106. For example, a liquid crystal element including liquid crystal exhibiting a blue phase or a liquid crystal element including polymer-dispersed liquid crystal can be used as the display element 106. Moreover, high voltage can be applied to the display element 106 even when the output voltage amplitude of the source driver circuit 15 is small, so that the power consumption of the display device 10 can be reduced. Furthermore, high voltage can be applied to the display element 106 even when the source driver circuit 15 does not have high withstand voltage; thus, the display device 10 can be small in size and inexpensive.

Figure 4:
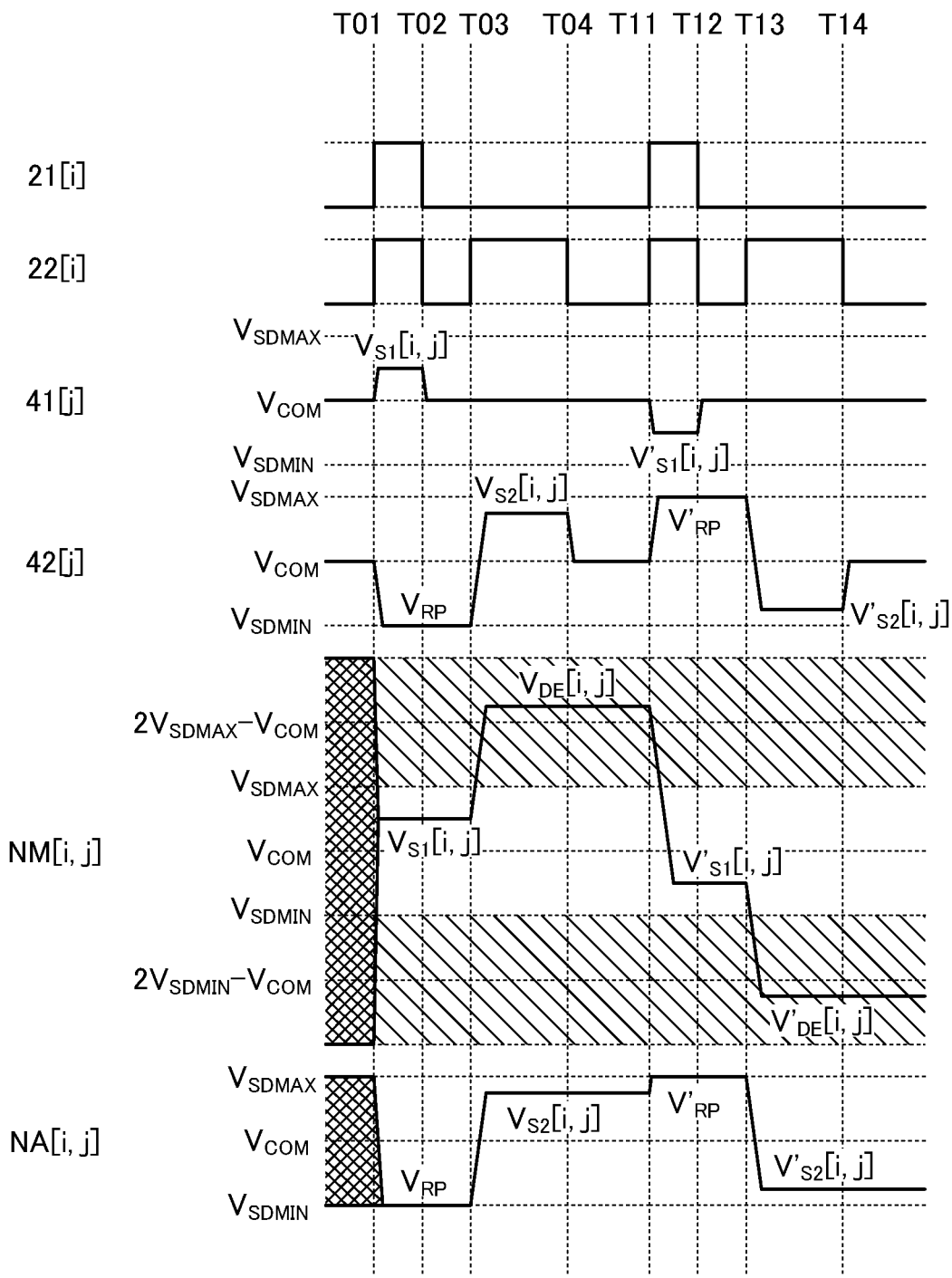
FIG. 4 A diagram illustrating an example of operation of a pixel.

In FIG. 2, the potential of the wiring 42[j] was set to the potential V$_{S2}$[i,j] between Time T01 and Time T02, and the potential of the wiring 42[j] was set to the potential V$_{RP}$ between Time T03 and Time T04. Moreover, the potential of the wiring 42[j] was set to the potential V'$_{S2}$[i,j] between Time T11 and Time T12, and the potential of the wiring 42[j] was set to the potential V'$_{RP}$ between Time T13 and Time T14. However, one embodiment of the present invention is not limited thereto. For example, the potential of the wiring 42[j] may be set to the potential V$_{RP}$ between Time T01 and Time T02, and the potential of the wiring 42[j] may be set to the potential V$_{S2}$[i,j] between Time T03 and Time T04. Moreover, the potential of the wiring 42[j] may beset to the potential V'$_{RP}$ between Time T11 and Time T12, and the potential of the wiring 42[j] may beset to the potential V'$_{S2}$[i,j] between Time T13 and Time T14. FIG. 4 illustrates an example of a method for operating the pixel 11[i,j] included in the display device 10 in the above case.

Figure 5A:
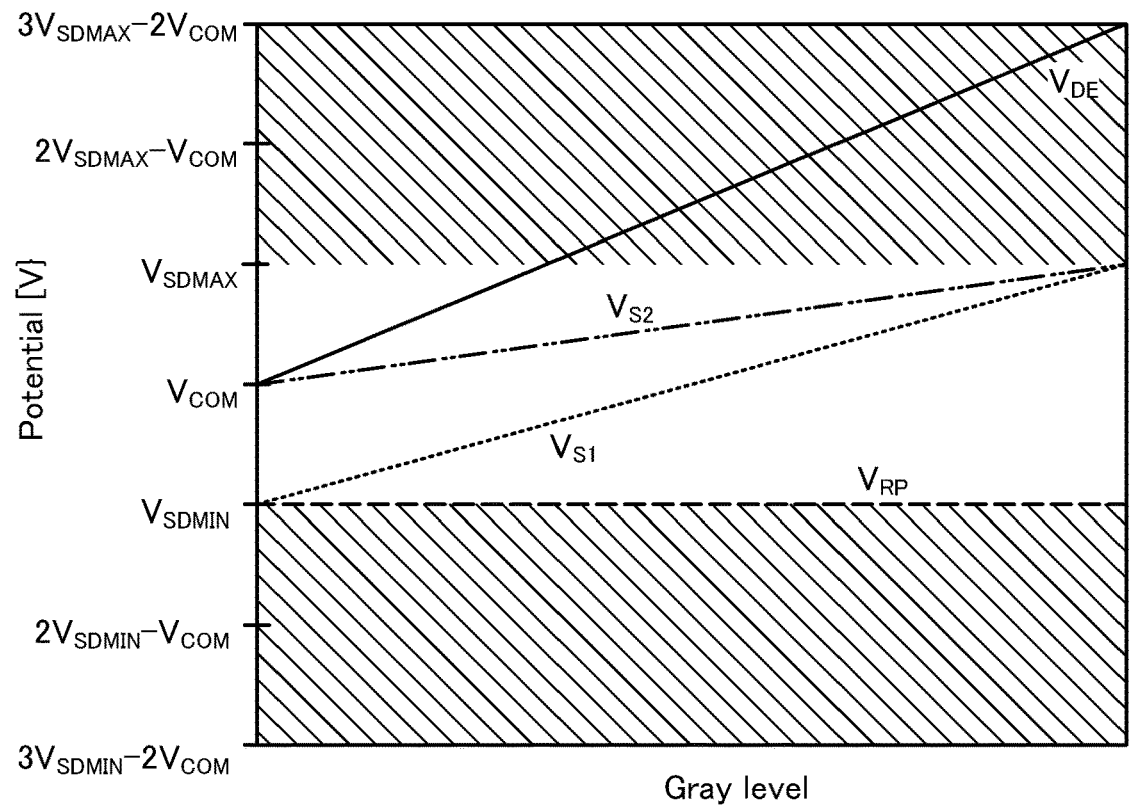
FIGS. 5A and 5B Diagrams illustrating examples of a relation between potentials supplied to a pixel and gray level of an image displayed by the pixel.

FIG. 5(A) is a graph showing a relation between the values of the potential V$_{S1}$, the potential V$_{S2}$, the potential V$_{RP}$, and the potential V$_{DE}$ and the gray level that image data expresses, in the case where the pixel 11 operates according to the method illustrated in FIG. 4.

As in the case shown in FIG. 3(A), the value of the potential V$_{S1}$ can be the potential V$_{SDMIN}$ for the lowest gray level, and can be the potential V$_{SDMAX}$ for the highest gray level. Meanwhile, the value of the potential V$_{S2}$ can be the potential V$_{COM}$ for the lowest gray level, which is the same as the case shown in FIG. 3(A), and can be the potential V$_{SDMAX}$ for the highest gray level, which is different from the case shown in FIG. 3(A). In other words, the potential V$_{S2}$[i,j] can be calculated by the following formula, for example.

[Formula 5]

$$V_{S2}[i, j] = \frac{V_{S1}[i, j] + V_{SDMAX}}{2} \qquad (5)$$

The value of the potential V$_{RP}$ can be the potential V$_{SDMIN}$, which is different from the case shown in FIG. 3(A). Furthermore, the value of the potential V$_{DE}$[i,j] can be calculated by the following formula, for example, and can be the potential V$_{COM}$ for the lowest gray level and can be the potential "3V$_{SDMAX}$–2V$_{COM}$" for the highest gray level, as in the case shown in FIG. 3(A). That is, for the highest gray level, the voltage "V$_{DE}$–V$_{COM}$" applied to the display element 106 can be three times the output voltage amplitude "V$_{SDMAX}$–V$_{COM}$" of the source driver circuit 15.

[Formula 6]

$$V_{DE}[i,j]=V_{S1}[i,j]+(V_{S2}[i,j]-V_{RP}) \qquad (6)$$

Figure 5B:
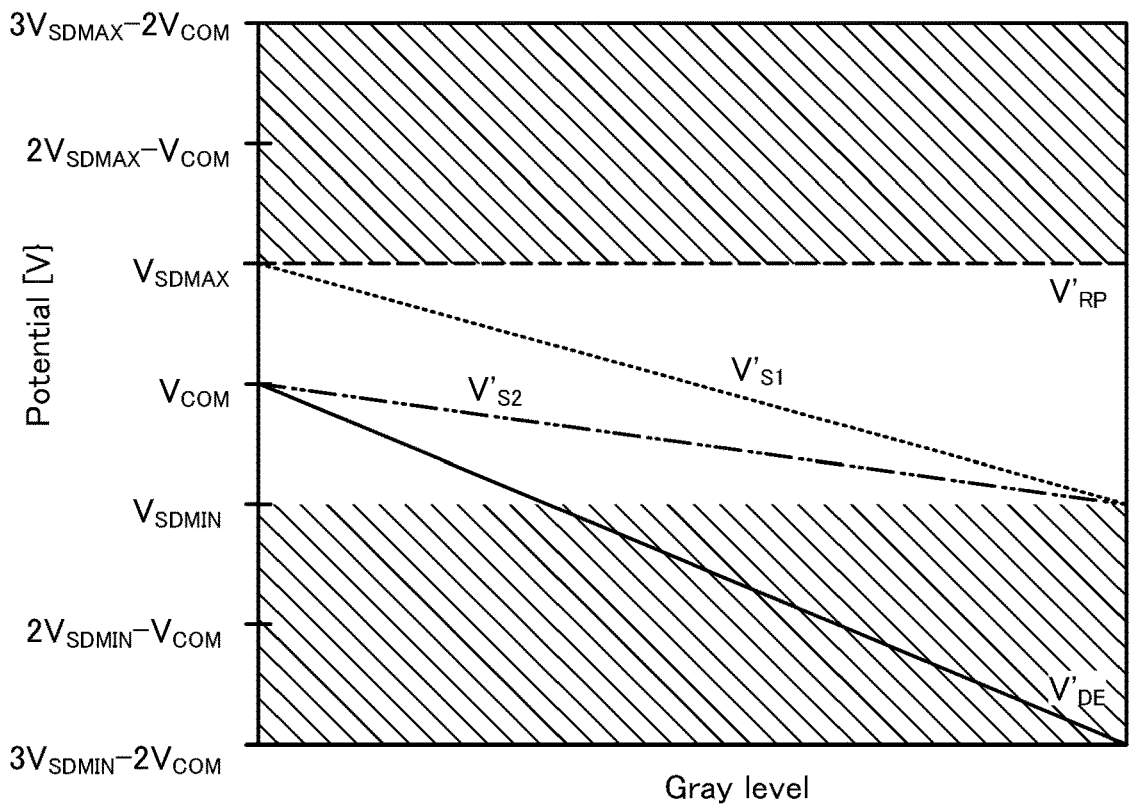

FIG. 5(B) is a graph showing a relation between the values of the potential V'$_{S1}$, the potential V'$_{S2}$, the potential V'$_{RP}$, and the potential V'$_{DE}$ and the gray level that image data expresses, in the case where the pixel 11 operates according to the method illustrated in FIG. 4.

As in the case shown in FIG. 3(A), the value of the potential V'$_{S1}$ can be the potential V$_{SDMAX}$ for the lowest gray level, and can be the potential V$_{SDMIN}$ for the highest gray level. Meanwhile, the value of the potential V'$_{S2}$ can be the potential V$_{COM}$ for the lowest gray level, which is the same as the case shown in FIG. 3(B), and can be the potential V$_{SDMIN}$ for the highest gray level, which is different from the case shown in FIG. 3(B). In other words, the potential V'$_{S2}$[i,j] can be calculated by the following formula, for example.

[Formula 7]

$$V'_{S2}[i, j] = \frac{V'_{S1}[i, j] + V_{SDMIN}}{2} \qquad (7)$$

The value of the potential V'$_{RP}$ can be the potential V$_{SDMAX}$, which is different from the case shown in FIG. 3(B). Furthermore, the value of the potential V'$_{DE}$[i,j] can be calculated by the following formula, for example, and can be the potential V$_{COM}$ for the lowest gray level and can be the potential "3V$_{SDMIN}$–2V$_{COM}$" for the highest gray level, as in the case shown in FIG. 3(B). That is, for the highest gray level, the voltage "V$_{COM}$–V'$_{DE}$" applied to the display element 106 can be three times the output voltage amplitude "V$_{COM}$–V$_{SDMIN}$" of the source driver circuit 15.

[Formula 8]

$$V'_{DE}[i,j]=V'_{S1}[i,j]+(V'_{S2}[i,j]-V'_{RP}) \qquad (8)$$

Figure 6:
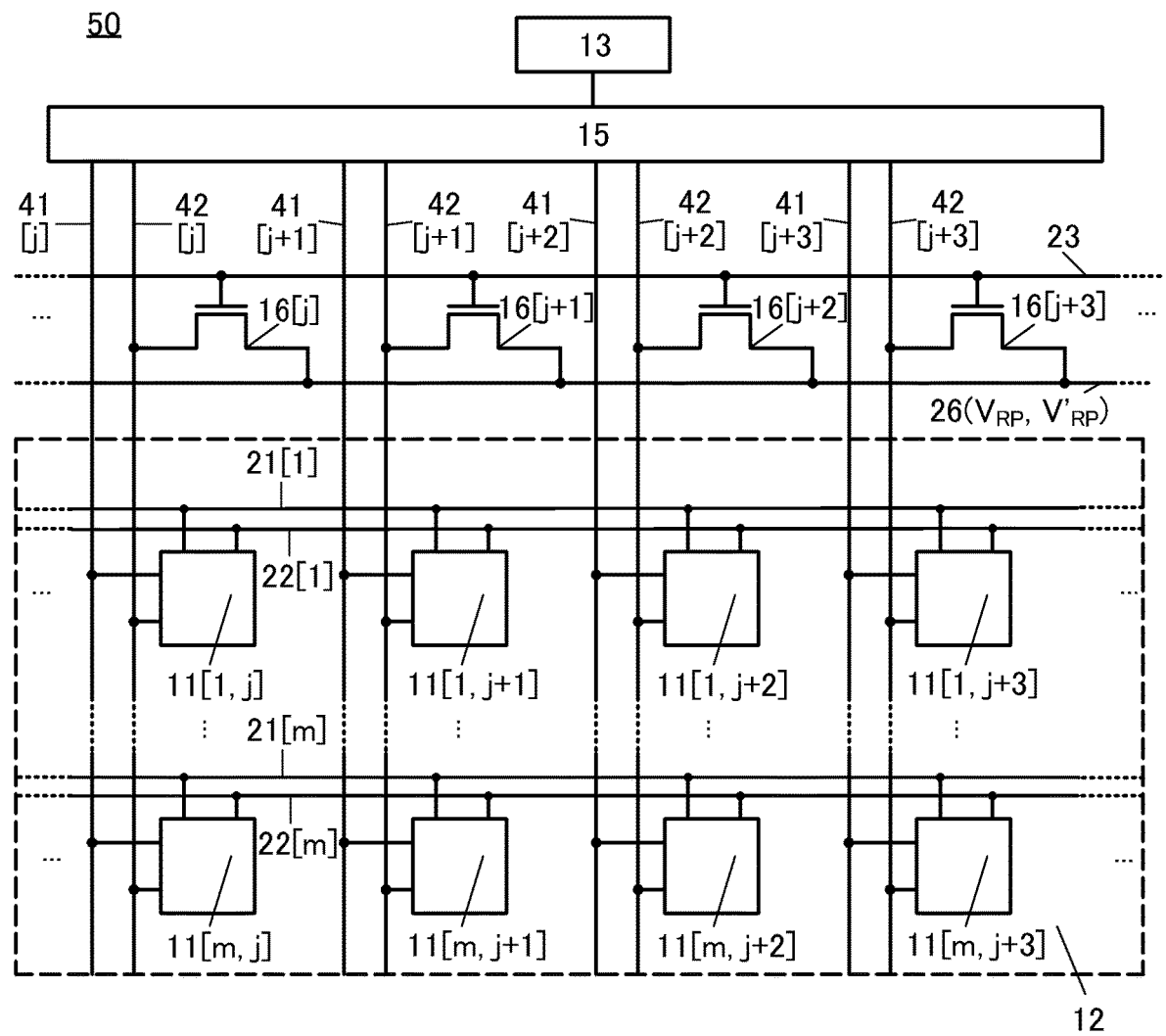
FIG. 6 A diagram illustrating an example of a display device.

FIG. 6 is a block diagram illustrating a structure example of a display device 50 that is a variation example of the display device 10. Like the display device 10, the display device 50 includes the display portion 12 in which the pixels 11 are arranged in a matrix of m rows and n columns, the image data generator circuit 13, the gate driver circuit 14, and the source driver circuit 15. Note that FIG. 6 illustrates the pixel 11[1,j], the pixel 11[1,j+1], the pixel 11[1,j+2], the pixel 11[1,j+3], the pixel 11[m,j], the pixel 11[m,j+1], the pixel 11[m,j+2], and the pixel 11[m,j+3] among the pixels 11. The gate driver circuit 14 is not illustrated in FIG. 6.

The display device 50 is different from the display device 10 in that a transistor 16 is provided. The transistor 16 can be provided for each column of the pixels 11, for example. In the case where the transistor 16 is provided for each column of the pixels 11, n transistors 16 can be provided in the display device 50.

One of a source and a drain of the transistor 16 is electrically connected to the wiring 42. In this specification and the like, for example, the transistor 16 electrically connected to the wiring 42[j] is denoted as a transistor 16[j].

The other of the source and the drain of each of the transistor 16[1] to the transistor 16[n] is electrically connected to one wiring 26, for example. Gates of the transistor 16[1] to the transistor 16[n] are electrically connected to one wiring 23, for example.

The wiring 26 has a function of a power supply line. The potential of the wiring 26 can be the potential $V_{RP}$ or the potential $V'_{RP}$. Note that the wiring 26 is electrically connected to a power supply circuit that is not illustrated in the diagram, and the power supply circuit generates the potential $V_{RP}$ and the potential $V'_{RP}$.

By turning on the transistor 16, the potential of the wiring 26 can be supplied to the wiring 42. That is, the transistor 16 has a function of a switch that controls conduction and non-conduction between the wiring 26 and the wiring 42. Note that the transistor 16 is not necessarily a transistor as long as it has a function of a switch.

In the display device 50, the potential $V_{RP}$ or the potential $V'_{RP}$ can be supplied to the wiring 42 through the wiring 26; hence, the source driver circuit 15 does not necessarily have a function of generating the potential $V_{RP}$ and the potential $V'_{RP}$.

Figure 7:
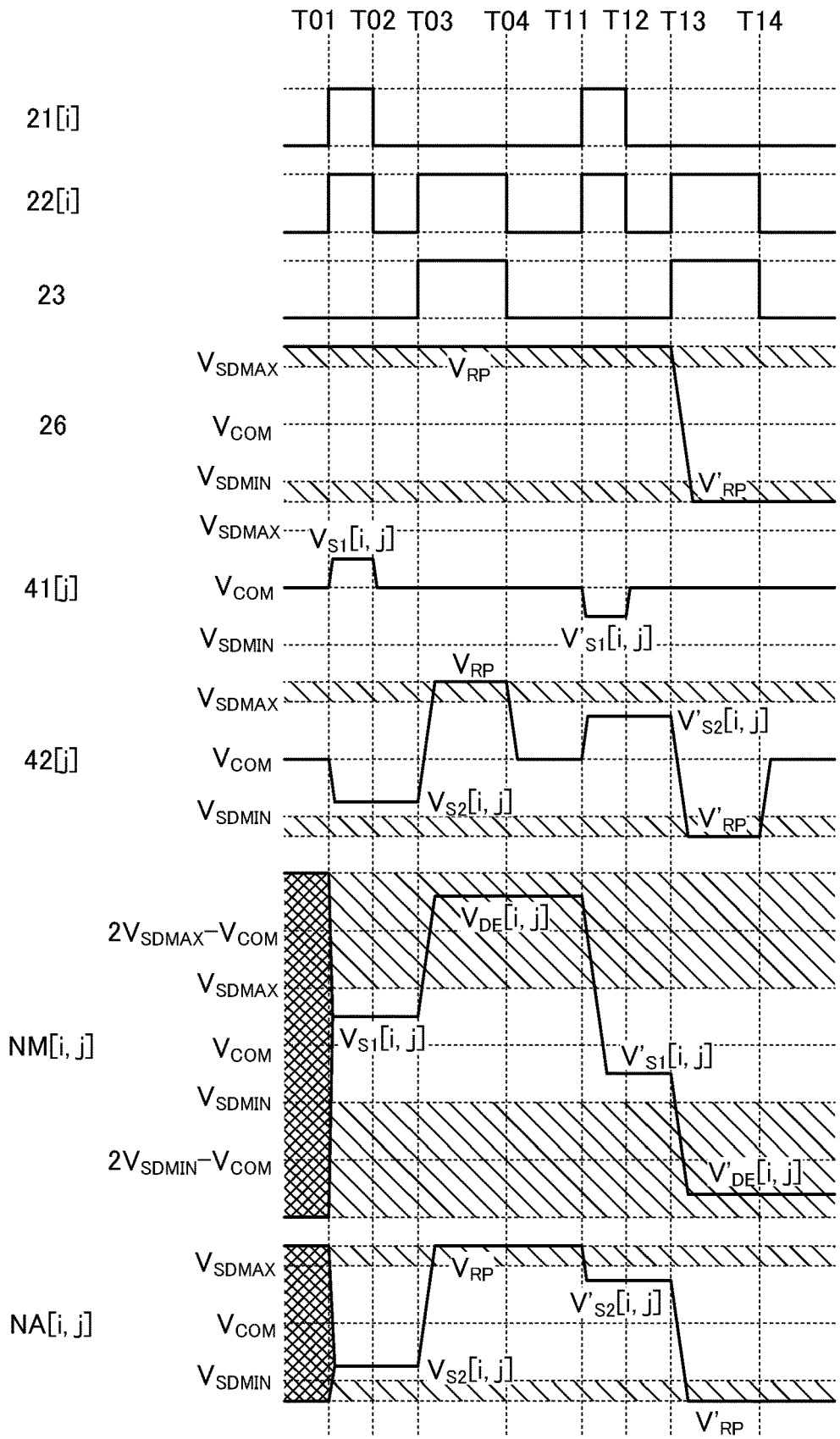
FIG. 7 A diagram illustrating an example of operation of a pixel.

FIG. 7 is a timing chart showing an example of a method for operating the pixel 11[i,j] included in the display device 50 and illustrates a variation example of FIG. 2. Note that the transistor 16 is described as an n-channel transistor; when the magnitude relation between the potentials is inverted as appropriate, for example, the following description can also apply to the case where the transistor 16 is a p-channel transistor or the like.

In the operation method shown in FIG. 7, the potential of the wiring 23 is set to a low potential between Time T01 and Time T03. After that, between Time T03 and Time T04, the potential of the wiring 23 is set to a high potential and the potential of the wiring 26 is set to the potential $V_{RP}$. Thus, the transistor 16[1] to the transistor 16[n] are turned on, and the potentials of the wiring 42[1] to the wiring 42[n] become the potential $V_{RP}$. Between Time T04 and Time T11, the potential of the wiring 23 is set to a low potential. Thus, the transistor 16[1] to the transistor 16[n] are turned off.

Between Time T13 and Time T14, the potential of the wiring 23 is set to a high potential and the potential of the wiring 26 is set to the potential $V'_P$. Thus, the transistor 16[1] to the transistor 16[n] are turned on, and the potentials of the wiring 42[1] to the wiring 42[n] become the potential $V'_{RP}$. After Time T14, the potential of the wiring 23 is set to a low potential. Thus, the transistor 16[1] to the transistor 16[n] are turned off.

The above are the differences from the operation method shown in FIG. 2. Note that in FIG. 7, the potential of the wiring 26 is set to the potential $V_{RP}$ before Time T03 and between Time T04 and Time T13 and the potential of the wiring 26 is set to the potential $V'_{RP}$ after Time T14; however, the potential of the wiring 26 in these periods can be set to a given potential.

In the case where the display device 50 operates according to the method shown in FIG. 7, FIG. 3(A) can be referred to for the values of the potential $V_{S1}[i,j]$, the potential $V_{S2}[i,j]$, the potential $V_{RP}$, and the potential $V_{DE}[i,j]$ when the value of the potential $V_{RP}$ is replaced with a value higher than the potential $V_{SDMAX}$, for example. Moreover, FIG. 3(B) can be referred to for the values of the potential $V'_{S1}[i,j]$, the potential $V'_{S2}[i,j]$, the potential $V'_{RP}$, and the potential $V'_{DE}[i,j]$ when the value of the potential $V'_{RP}$ is replaced with a value lower than the potential $V_{SDMIN}$, for example.

Figure 8:
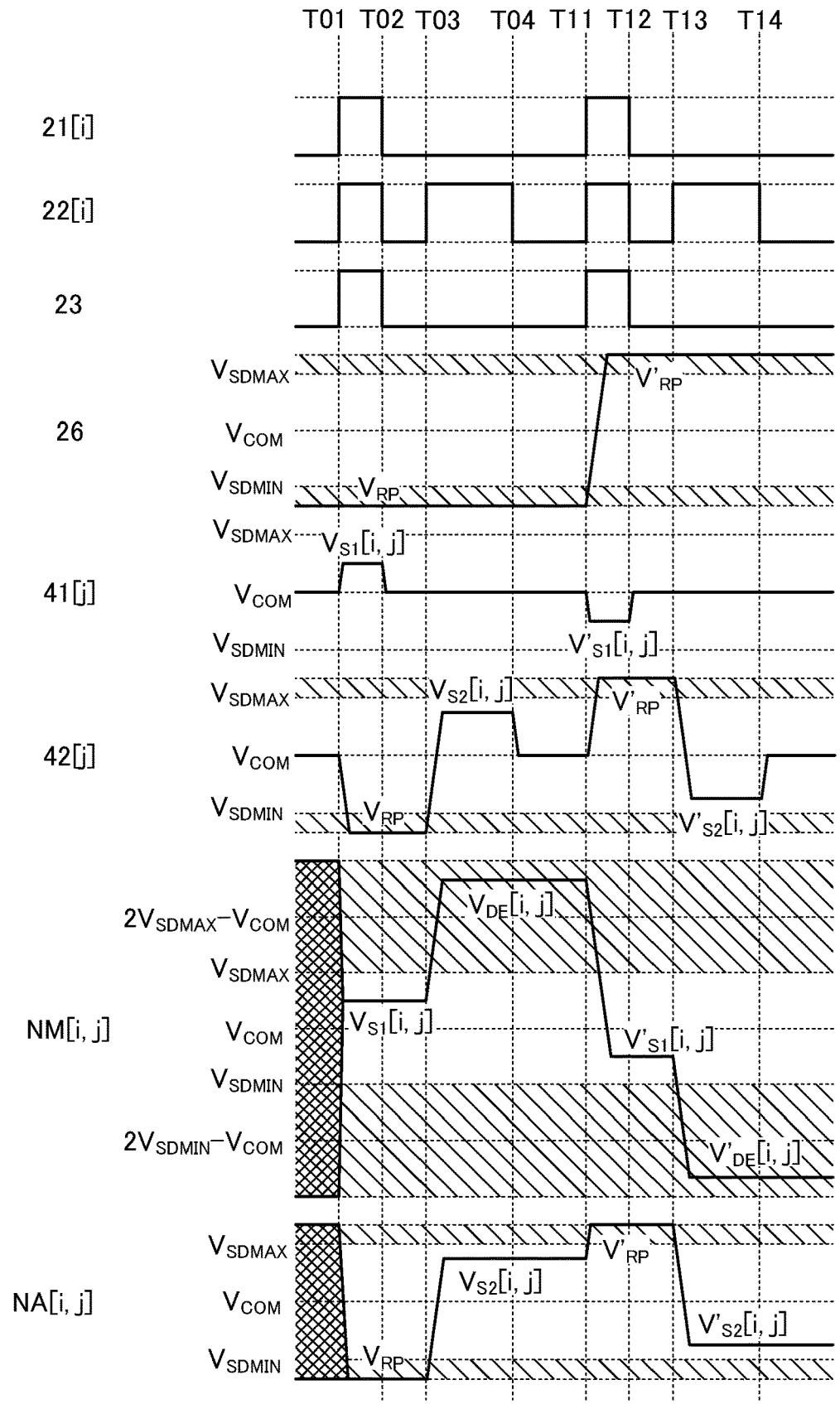
FIG. 8 A diagram illustrating an example of operation of a pixel.

In FIG. 7, as in the case shown in FIG. 2, the potential of the wiring 42[j] was set to the potential $V_{S2}[i,j]$ between Time T01 and Time T02, and the potential of the wiring 42[j] was set to the potential $V_{RP}$ between Time T03 and Time T04. Moreover, the potential of the wiring 42[j] was set to the potential $V'_{S2}[i,j]$ between Time T11 and Time T12, and the potential of the wiring 42[j] was set to the potential $V'_{RP}$ between Time T13 and Time T14. However, one embodiment of the present invention is not limited thereto. For example, as in the case shown in FIG. 4, the potential of the wiring 42[j] may be set to the potential $V_{RP}$ between Time T01 and Time T02, and the potential of the wiring 42[j] may be set to the potential $V_{S2}[i,j]$ between Time T03 and Time T04. Moreover, the potential of the wiring 42[j] may be set to the potential $V'_{RP}$ between Time T11 and Time T12, and the potential of the wiring 42[j] may be set to the potential $V'_{S2}[i,j]$ between Time T13 and Time T14. FIG. 8 illustrates an example of a method for operating the pixel 11[i,j] included in the display device 50 in the above case.

In the operation method shown in FIG. 8, between Time T01 and Time T02, the potential of the wiring 23 is set to a high potential and the potential of the wiring 26 is set to the potential $V_{RP}$. Then, between Time T02 and Time T03, the potential of the wiring 23 is set to a low potential. Between Time T11 and Time T12, the potential of the wiring 23 is set to a high potential and the potential of the wiring 26 is set to the potential $V'_{RP}$. Then, between Time T12 and Time T13, the potential of the wiring 23 is set to a low potential.

The above are the differences from the operation method shown in FIG. 7. Note that in FIG. 8, the potential of the wiring 26 is set to the potential $V_{RP}$ before Time T01 and between Time T02 and Time T11 and the potential of the wiring 26 is set to the potential $V'_{RP}$ after Time T12; however, the potential of the wiring 26 in these periods can be set to a given potential.

In the case where the display device 50 operates according to the method shown in FIG. 8, FIG. 5(A) can be referred to for the values of the potential $V_{S1}[i,j]$, the potential $V_{S2}[i,j]$, the potential $V_{RP}$, and the potential $V_{DE}[i,j]$ when the value of the potential $V_{RP}$ is replaced with a value lower than the potential $V_{SDMIN}$, for example. Moreover, FIG. 5(B) can be referred to for the values of the potential $V'_{S1}[i,j]$, the potential $V'_{S2}[i,j]$, the potential $V'_{RP}$, and the potential $V'_{DE}[i,j]$ when the value of the potential $V'_{RP}$ is replaced with a value higher than the potential $V_{SDMAX}$, for example.

In the display device 50, the potential $V_{RP}$ and the potential $V'_{RP}$ can be a potential higher than the potential $V_{SDMAX}$, which is the maximum potential that can be generated by the source driver circuit 15, or a potential lower than the potential $V_{SDMIN}$, which is the minimum potential that can be generated by the source driver circuit 15. Thus, a voltage higher than the voltage that can applied to the display element 106 included in the display device 10 can be applied to the display element 106 included in the display device 50. Note that the value of the potential $V_{RP}$ and the value of the potential $V'_{RP}$ are preferably set so that, in the case where an image displayed using the pixel 11 is an image with the lowest gray level, the voltage applied to the display element 106 included in this pixel 11 is lower than or equal to the threshold voltage of the display element 106. Here, the threshold voltage of the display element 106 refers to a voltage applied to the display element 106 when the visible light transmittance of the display element 106 becomes a specific value, for example.

In the display device 50, the potential $V_{RP}$ and the potential $V'_{RP}$ can be supplied to the pixels 11 in an area sequential manner, as in the display device 10.

Figure 9:
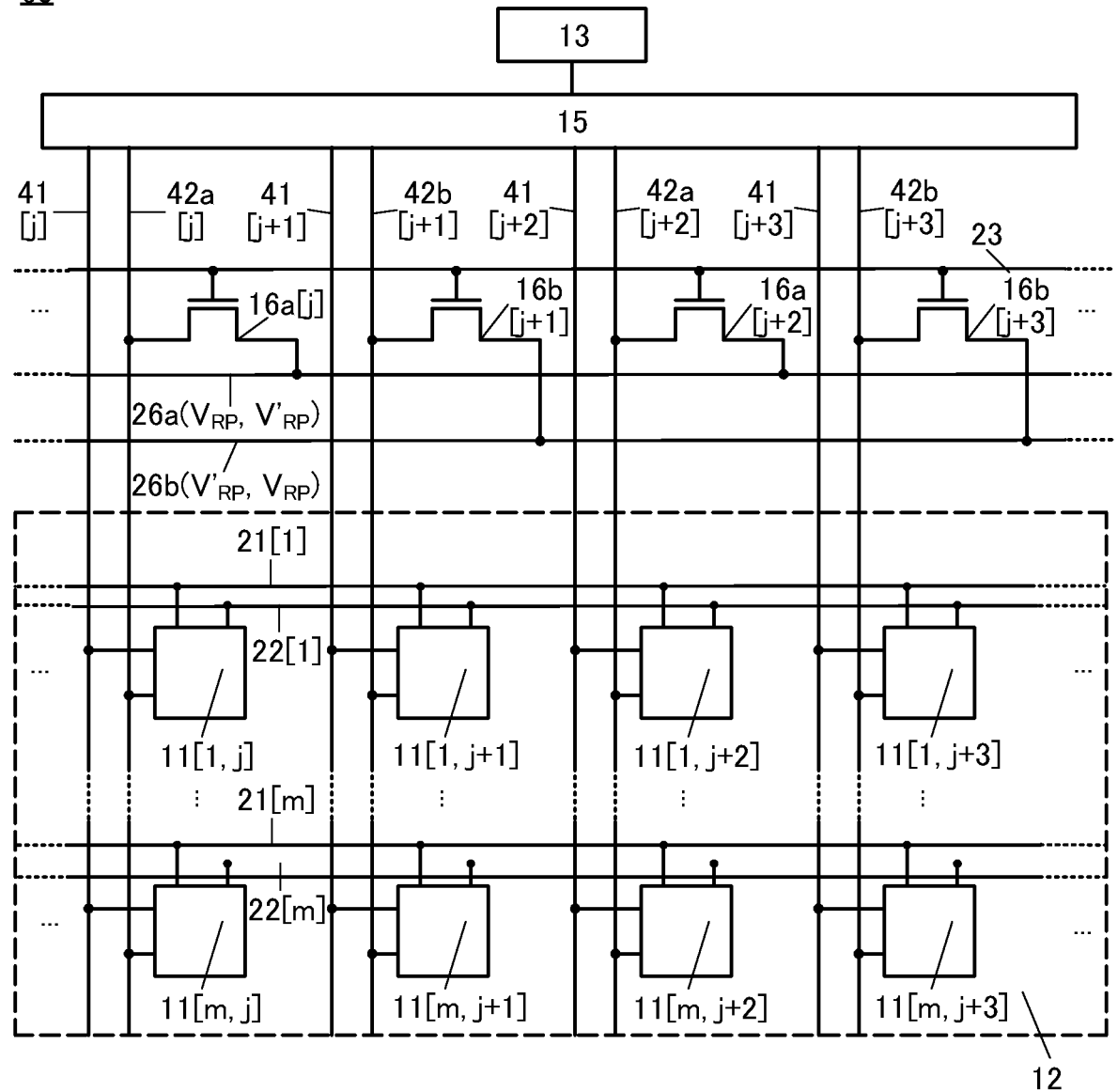
FIG. 9 A diagram illustrating an example of a display device.

FIG. 9 is a block diagram illustrating a structure example of a display device 60 that is a variation example of the display device 50. Like FIG. 6, FIG. 9 illustrates the pixel 11[1,j], the pixel 11[1,j+1], the pixel 11[1,j+2], the pixel 11[1,j+3], the pixel 11[m,j], the pixel 11[m,j+1], the pixel 11[m,j+2], and the pixel 11[m,j+3] among the pixels 11. As in FIG. 6, the gate driver circuit 14 is not illustrated in FIG. 9.

The display device 60 is different from the display device 50 in that the transistors 16 are replaced with transistors 16a and transistors 16b and the wirings 42 are replaced with wirings 42a and wirings 42b. In addition, the display device 60 is different from the display device 50 in that the display device 60 does not include the wiring 26 and includes a wiring 26a and a wiring 26b. The number of transistors 16a provided in the display device 60 and the number of transistors 16b provided in the display device 60 can be equal to each other. That is, the display device 60 can be configured to include n/2 transistors 16a and n/2 transistors 16b, for example. The number of wirings 42a can be equal to the number of transistors 16a, and the number of wirings 42b can be equal to the number of transistors 16b. That is, the display device 60 can be configured to include n/2 wirings 42a and n/2 wirings 42b, for example.

Note that the transistor 16a and the transistor 16b can be transistors similar to the transistor 16, for example, and are not necessarily transistors as long as they have a function of a switch. The wiring 42a and the wiring 42b have a function of a data line like the wiring 42, and the wiring 26a and the wiring 26b have a function of a power supply line like the wiring 26.

FIG. 9 illustrates the case where the pixel 11[1,j] to the pixel 11[m,j] are electrically connected to one wiring 42a, the pixel 11[1,j+1] to the pixel 11[m,j+1] are electrically connected to one wiring 42b, the pixel 11[1,j+2] to the pixel 11[m,j+2] are electrically connected to one wiring 42a, and the pixel 11[1,j+3] to the pixel 11[m,j+3] are electrically connected to one wiring 42b. That is, the wiring 42a is electrically connected to one of the pixel 11 in the odd-numbered column and the pixel 11 in the even-numbered column, for example, and the wiring 42b is electrically connected to the other of the pixel 11 in the odd-numbered column and the pixel 11 in the even-numbered column.

One of a source and a drain of the transistor 16a is electrically connected to the wiring 42a. One of a source and a drain of the transistor 16b is electrically connected to the wiring 42b. The other of the source and the drain of the transistor 16a is electrically connected to the wiring 26a. The other of the source and the drain of the transistor 16b is electrically connected to the wiring 26b. A gate of the transistor 16a and a gate of the transistor 16b are electrically connected to the wiring 23.

In this specification and the like, for example, the wiring 42a electrically connected to the pixel 11[1,j] to the pixel 11[m,j] is denoted as a wiring 42a[j]. As another example, the wiring 42b electrically connected to the pixel 11[1,j+1] to the pixel 11[m,j+1] is denoted as a wiring 42b[j+1]. As another example, the transistor electrically connected to the wiring 42a[j] is denoted as a transistor 16a[j], and the transistor electrically connected to the wiring 42b[j+1] is denoted as a transistor 16b[j+1].

The potential of the wiring 26a and the potential of the wiring 26b can be the potential $V_{RP}$ or the potential $V'_{RP}$. Here, for example, when the potential of the wiring 26a is the potential $V_{RP}$, the potential of the wiring 26b can be the potential $V'_{RP}$; when the potential of the wiring 26a is the potential $V'_{RP}$, the potential of the wiring 26b can be the potential $V_{RP}$. Note that as described above, the potential $V_{RP}$ and the potential $V'_{RP}$ can be generated by a power supply circuit.

Figure 10:
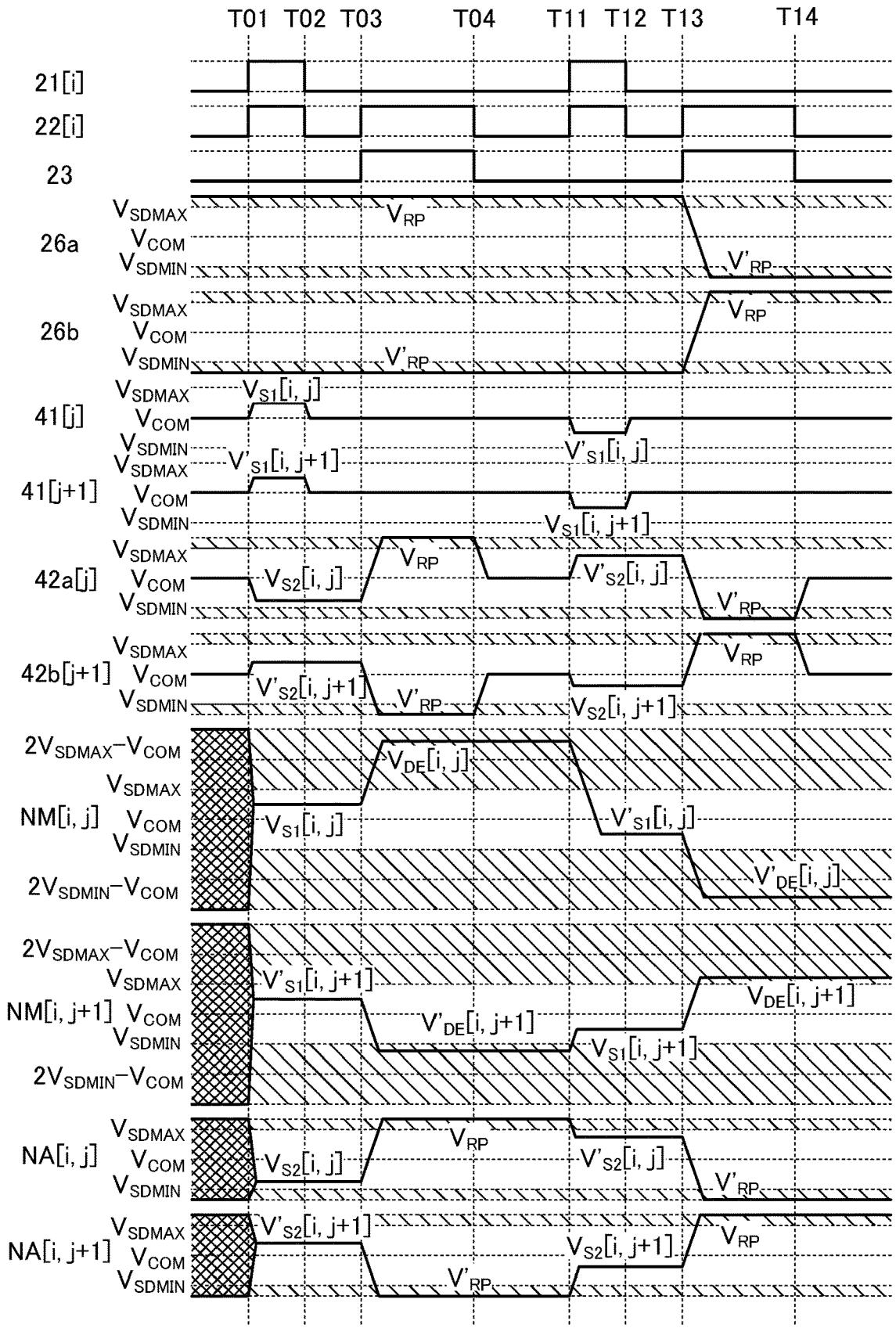
FIG. 10 A diagram illustrating an example of operation of pixels.

FIG. 10 is a timing chart showing an example of a method for operating the pixel 11[i,j] and the pixel 11[i,j+1] included in the display device 60. Note that the transistor 16a and the transistor 16b are described as n-channel transistors; when the magnitude relation between the potentials is inverted as appropriate, for example, the following description can also apply to the case where the transistor 16a and the transistor 16b are p-channel transistors or the like.

In the operation method shown in FIG. 10, the potentials of the wiring 21[i], the wiring 22[i], the wiring 23, the wiring 41[j], the node NM[i,j], and the node NA[i,j] are the same as those in the operation method shown in FIG. 7. Moreover, in the operation method shown in FIG. 10, the potential of the wiring 26a is the same as the potential of the wiring 26 shown in FIG. 7, and the potential of the wiring 42a[j] is the same as the potential of the wiring 42[j] shown in FIG. 7.

In the operation method shown in FIG. 10, the potential of the wiring 26b is different from the potential of the wiring 26a in that the potential $V_{RP}$ is replaced with the potential $V'_{RP}$ and the potential $V'_{RP}$ is replaced with the potential $V_{RP}$. The potential of the wiring 41[j+1] is different from the potential of the wiring 41[j] in that the potential $V_{S1}[i,j]$ is replaced with a potential $V'_{S1}[i,j+1]$ and the potential $V'^{S1}[i,j]$ is replaced with a potential $V_{S1}[i,j+]$. The potential of the wiring 42b[j+1] is different from the potential of the wiring 42a[j] in that the potential $V_{S2}[i,j]$, the potential $V_{RP}$, the potential $V'_{S2}[i,j]$, and the potential $V'_{RP}$ are replaced with a potential $V'_{S2}[i,j+1]$, the potential $V'_{RP}$, a potential $V_{S2}[i,j+1]$, and the potential $V_{RP}$, respectively.

The potential of the node NM[i,j+1] is different from the potential of the node NM[i,j] in that the potential $V_{S1}[i,j]$, the potential $V_{DE}[i,j]$, the potential $V'_{S1}[i,j]$, and the potential $V'_{DE}[i,j]$ are replaced with the potential $V'_{S1}[i,j+1]$, a potential $V'_{DE}[i,j+1]$, the potential $V_{S1}[i,j+1]$, and a potential $V_{DE}[i,j+1]$, respectively. The potential of the node NA[i,j+1] is different from the potential of the node NM[i,j] in that the potential $V_{S2}[i,j]$, the potential VP, the potential $V'_{S2}[i,j]$, and the potential $V'_{RP}$ are replaced with the potential $V'_{S2}[i,j+1]$, the potential $V'_{RP}$, the potential $V_{S2}[i,j+1]$, and the potential $V_{RP}$, respectively.

In the operation method shown in FIG. 10, the value of the potential $V_{DE}[i,j]$, which is the potential of the node NM[i,j] between Time T03 and Time T04, can be greater than or equal to the potential $V_{COM}$, and the value of the potential $V'_{DE}[i,j+1]$, which is the potential of the node NM[i,j+1], can be less than or equal to the potential $V_{COM}$. Meanwhile, the value of the potential $V'_{DE}[i,j]$, which is the potential of the node NM[i,j] between Time T13 and Time T14, can be less than or equal to the potential $V_{COM}$, and the value of the potential $V_{DE}[i,j+1]$, which is the potential of the node NM[i,j+1], can be greater than or equal to the potential $V_{COM}$. Accordingly, in the display device 60, frame inversion driving can be performed by a column line inversion driving method; thus, occurrence of flickers can be suppressed and a high-quality image can be displayed. Note that even in the case where the source driver circuit 15 generates the potential VR and the potential $V'_{RP}$ as in the display device 10, driving can be performed by a column line inversion driving method as in the display device 60.

The above is an example of a method for operating the pixel 11[i,j] and the pixel 11[i,j+1] provided in the display device 60. Note that in the display device 60, the potential $V_{RP}$ and the potential $V'_{RP}$ can be supplied to the pixels 11 in an area sequential manner, as in the display device 50 and the like.

Note that FIG. 3(A) can be referred to for the values of the potential $V_{S1}[i,j]$, the potential $V_{S1}[i,j+1]$, the potential $V_{S2}[i,j]$, the potential $V_{S2}[i,j+1]$, the potential $V_{RP}$, the potential $V_{DE}[i,j]$, and the potential $V_{DE}[i,j+1]$ when the potential $V_{RP}$ is replaced with a value higher than the potential $V_{SDMAX}$. Moreover, FIG. 3(B) can be referred to for the values of the potential $V'_{S1}[i,j]$, the potential $V'_{S1}[i,j+1]$, the potential $V'_{S2}[i,j]$, the potential $V'_{S2}[i,j+1]$, the potential V'RP, the potential $V'_{DE}[i,j]$, and the potential $V'_{DE}[i,j+1]$ when the potential $V'_{RP}$ is replaced with a value higher than the potential $V_{SDMIN}$.

In the operation method shown in FIG. 10, the potentials of the wiring 21[i], the wiring 22[i], the wiring 23, the wiring 41[j], the node NM[i,j], and the node NA[i,j] may be the same as those in the operation method shown in FIG. 8. Moreover, in the operation method shown in FIG. 10, the potential of the wiring 26a may be the same as the potential of the wiring 26 shown in FIG. 8, and the potential of the wiring 42a[j] may be the same as the potential of the wiring 42[j] shown in FIG. 8. In that case, FIGS. 5(A) and 5(B) can be referred to for the potentials supplied to the pixel 11.

Figure 11A:
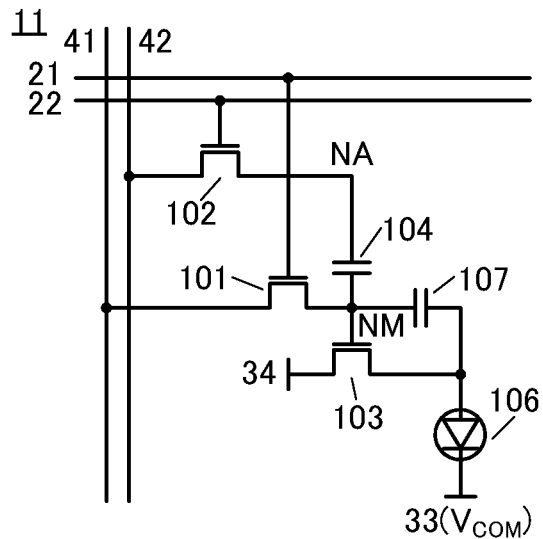
FIGS. 11A to 11C Diagrams illustrating examples of a pixel.

In one embodiment of the present invention, the configuration of the pixel 11 is not limited to the configuration illustrated in FIG. 1(B). FIG. 11(A) is a diagram illustrating a configuration example of the pixel 11 different from that in FIG. 1(B).

In the pixel 11 having the configuration illustrated in FIG. 11(A), the display element 106 can be a light-emitting element. As the light-emitting element, an organic EL element, an inorganic EL element, an LED (Light Emitting Diode) element, or the like can be used.

In addition, a transistor 103 is provided in the pixel 11 having the configuration illustrated in FIG. 11(A). Furthermore, the capacitor 105 is not provided and a capacitor 107 is provided.

One of the source and the drain of the transistor 101 is electrically connected to one electrode of the capacitor 104. The one electrode of the capacitor 104 is electrically connected to a gate of the transistor 103. The gate of the transistor 103 is electrically connected to one electrode of the capacitor 107.

The other electrode of the capacitor 107 is electrically connected to one electrode of the display element 106. The one electrode of the display element 106 is electrically connected to one of a source and a drain of the transistor 103. The other of the source and the drain of the transistor 103 is electrically connected to a common wiring 34. To the common wiring 34, a constant potential, for example, can be supplied. For instance, a potential higher than or equal to the potential $V_{COM}$ can be supplied.

Here, a node where the one of the source and the drain of the transistor 101, the gate of the transistor 103, the one electrode of the capacitor 104, and the one electrode of the capacitor 107 are electrically connected to each other is referred to as the node NM.

The above are the differences between the pixel 11 having the configuration illustrated in FIG. 11(A) and the pixel 11 having the configuration illustrated in FIG. 1(B). The operation at Time T01 to Time T04 shown in FIG. 2, FIG. 4, FIG. 7, or FIG. 8 can be referred to for the operation of the pixel 11 having the configuration illustrated in FIG. 11(A).

As described above, in the display device of one embodiment of the present invention, high voltage can be applied to the display element 106. Accordingly, when the pixel 11 has the configuration illustrated in FIG. 11(A), a large amount of current can be made to flow to the display element 106, which is a light-emitting element. Consequently, a high-luminance image can be displayed on the display device of one embodiment of the present invention.

Figure 11B:
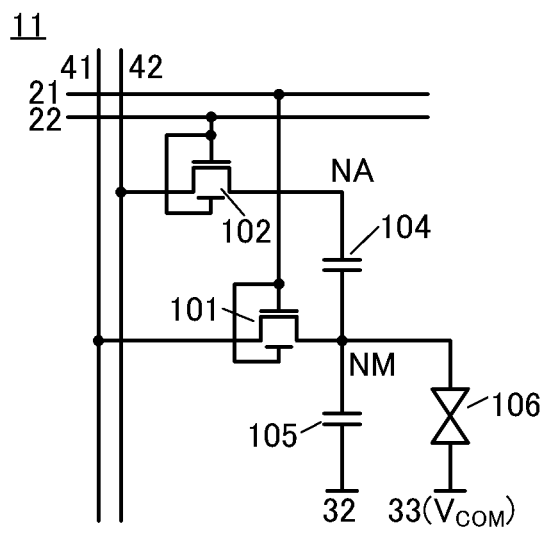
Figure 11C:
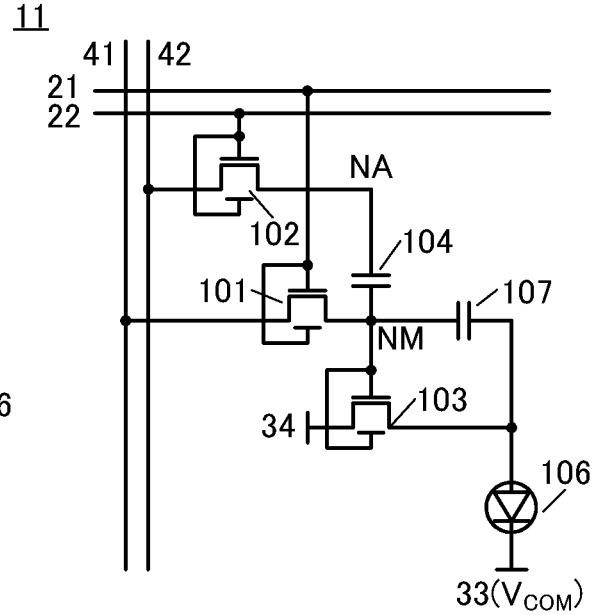

FIGS. 11(B) and 11(C) are diagrams illustrating configuration examples of the pixel 11. In FIG. 11(B), the transistor 101 and the transistor 102 included in the pixel 11 having the configuration illustrated in FIG. 1(B) are provided with a back gate; in FIG. 11(C), the transistor 101, the transistor 102, and the transistor 103 included in the pixel 11 having the configuration illustrated in FIG. 11(A) are provided with a back gate. Each of the back gates is electrically connected to a corresponding front gate and has an effect of increasing the on-state current. Different constant potentials may be supplied to the back gate and the front gate. With such a configuration, the threshold voltage of the transistor can be controlled. Note that although all of the transistors have a back gate in FIGS. 11(B) and 11(C), a transistor without a back gate may be included.

This embodiment can be implemented in an appropriate combination with the structures described in the other embodiments and the like.

Embodiment 2

<Structure Example of Display Device>

In this embodiment, a structure example of the display device of one embodiment of the present invention will be described with reference to drawings.

Figure 12A:
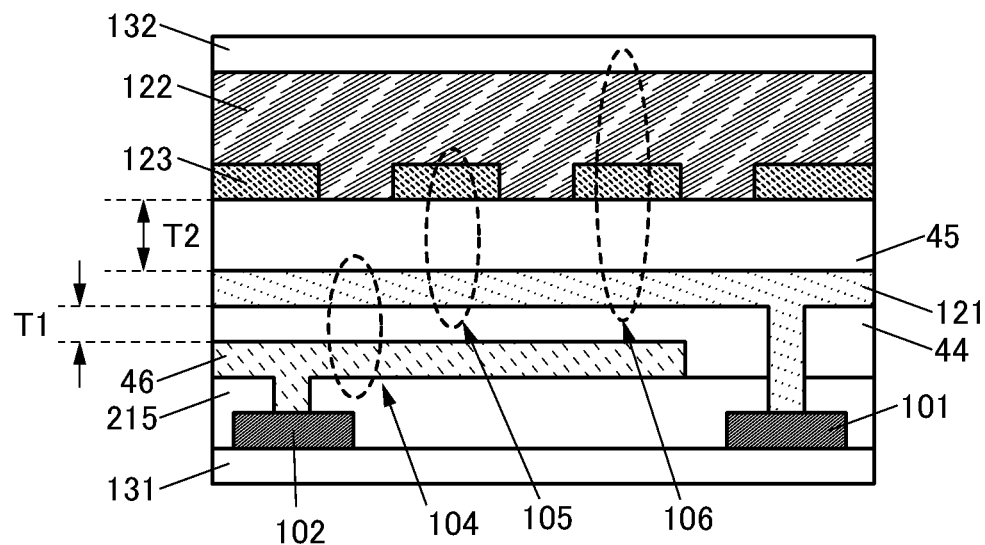
FIGS. 12A and 12B Cross-sectional views illustrating structure examples of a display device.

FIG. 12(A) is a cross-sectional view of a transmissive liquid crystal display device that is an example of the display device of one embodiment of the present invention. The liquid crystal display device illustrated in FIG. 12(A) includes a substrate 131, the transistor 101, the transistor 102, an insulating layer 215, a conductive layer 46, an insulating layer 44, a pixel electrode 121, an insulating layer 45, a common electrode 123, a liquid crystal layer 122, and a substrate 132.

The transistor 101 and the transistor 102 are positioned over the substrate 131. The insulating layer 215 is positioned over the transistor 101 and over the transistor 102. The conductive layer 46 is positioned over the insulating layer 215. The insulating layer 44 is positioned over the transistor 101, over the transistor 102, over the insulating layer 215, and over the conductive layer 46. The pixel electrode 121 is positioned over the insulating layer 44. The insulating layer 45 is positioned over the pixel electrode 121. The common electrode 123 is positioned over the insulating layer 45. The liquid crystal layer 122 is positioned over the common electrode 123. The common electrode 123 includes a region overlapping with the conductive layer 46 with the pixel electrode 121 positioned therebetween. The pixel electrode 121 is electrically connected to the source or the drain of the transistor 101. The conductive layer 46 is electrically connected to the source or the drain of the transistor 102. The conductive layer 46, the pixel electrode 121, and the common electrode 123 each have a function of transmitting visible light.

In the liquid crystal display device of this embodiment, the pixel electrode 121 and the common electrode 123 are stacked with the insulating layer 45 positioned therebetween, and operates in an FFS (Fringe Field Switching) mode. The pixel electrode 121, the liquid crystal layer 122, and the common electrode 123 can function as the display element 106.

The pixel electrode 121, the insulating layer 45, and the common electrode 123 can function as one capacitor 105. The conductive layer 46, the insulating layer 44, and the pixel electrode 121 can function as one capacitor 104. The liquid crystal display device of this embodiment thus includes two capacitors in a pixel.

The two capacitors are formed using a material transmitting visible light and include a region where they overlap with each other. Accordingly, the pixel has a high aperture ratio and can include a plurality of storage capacitors.

When the aperture ratio of the transmissive liquid crystal display device (also referred to as the aperture ratio of a pixel) is increased, the liquid crystal display device can have higher resolution. Furthermore, a higher aperture ratio can increase the light extraction efficiency. Thus, the power consumption of the liquid crystal display device can be reduced.

The capacitance of the capacitor 104 is preferably larger than the capacitance of the capacitor 105. For example, the area of a region where the pixel electrode 121 and the conductive layer 46 overlap with each other is preferably larger than the area of a region where the pixel electrode 121 and the common electrode 123 overlap with each other. The thickness T1 of the insulating layer 44 positioned between the conductive layer 46 and the pixel electrode 121 is preferably thinner than the thickness T2 of the insulating layer 45 positioned between the pixel electrode 121 and the common electrode 123.

Figure 12B:
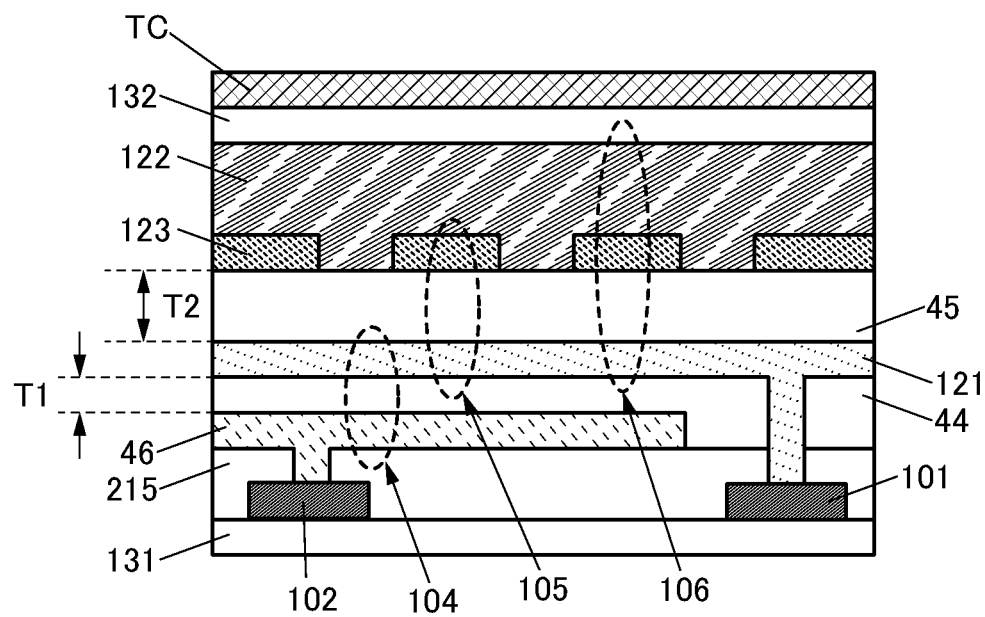

The structure of the display device of this embodiment can be used also for a touch panel. FIG. 12(B) illustrates an example in which a touch sensor TC is mounted on the display device in FIG. 12(A). The sensitivity of the touch sensor TC can be increased by providing the touch sensor TC on a position close to the display surface of the display device.

There is no particular limitation on a detection element (also referred to as a sensor element) included in the touch panel of one embodiment of the present invention. A variety of sensors that can sense proximity or touch of a sensing target such as a finger or a stylus can be used as the sensor element.

For example, a variety of types such as a capacitive type, a resistive type, a surface acoustic wave type, an infrared type, an optical type, and a pressure-sensitive type can be used as the sensor type.

Examples of the capacitive type include a surface-capacitive type and a projected-capacitive type. Examples of the projected-capacitive type include a self-capacitive type and a mutual-capacitive type. The use of the mutual-capacitive type is preferable because multiple points can be sensed simultaneously.

The touch panel of one embodiment of the present invention can have any of a variety of structures, including a structure in which a display device and a sensor element that are separately formed are attached to each other and a structure in which an electrode and the like included in a sensor element are provided on one or both of a substrate supporting a display element and a counter substrate.

<<Top Surface Layout of Pixel>>

Figure 13A:
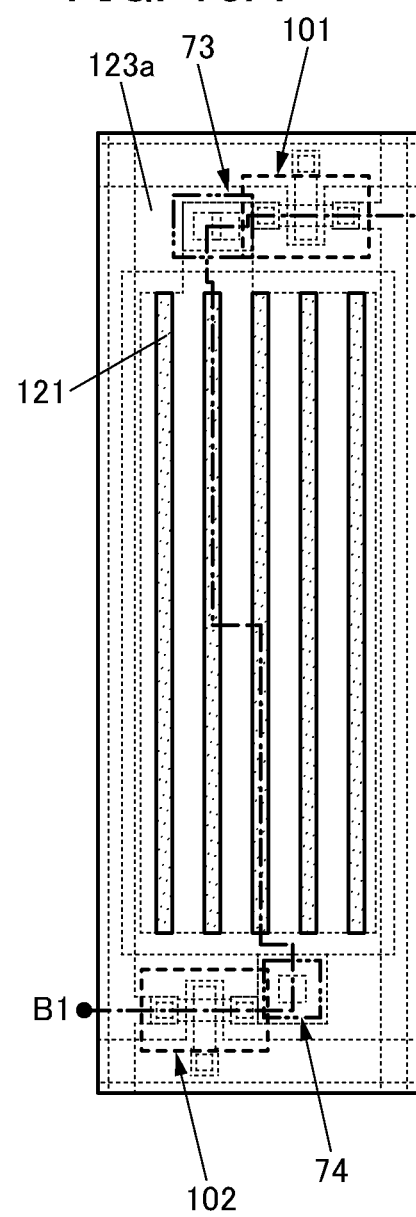
FIGS. 13A to 13C Top views illustrating a structure example of a pixel.
Figure 13B:
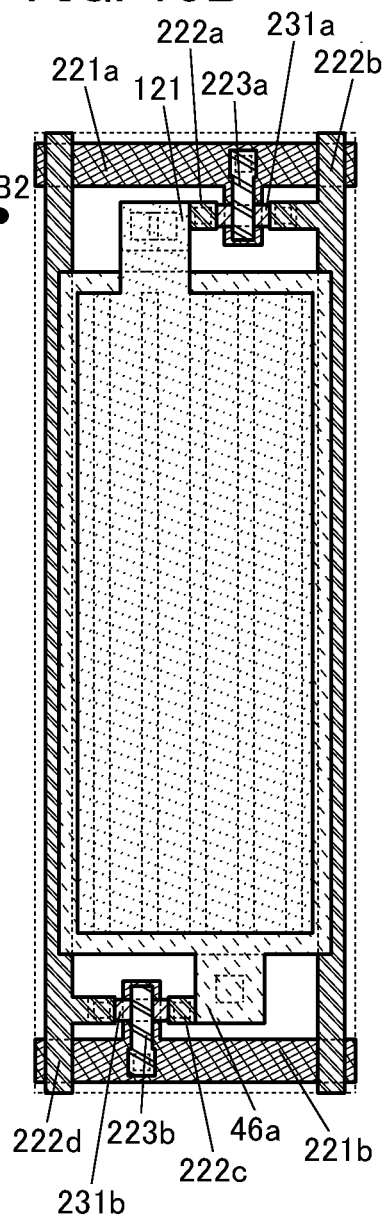
Figure 13C:
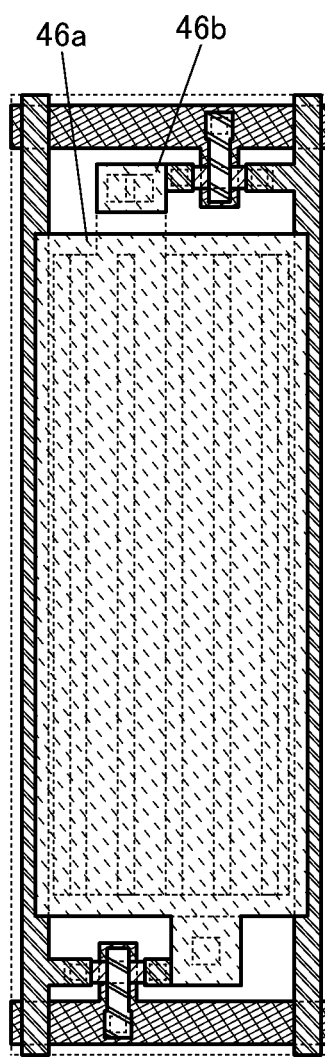

FIGS. 13(A) to 13(C) are top views of a pixel. FIG. 13(A) is a top view of a stacked-layer structure from a gate 221a and a gate 221b to a common electrode 123a, which is seen from the common electrode 123a side. FIG. 13(B) is a top view of the stacked-layer structure of FIG. 13(A) except the common electrode 123a, and FIG. 13(C) is a top view of the stacked-layer structure of FIG. 13(A) except the common electrode 123a and the pixel electrode 121.

The pixel includes a connection portion 73 and a connection portion 74. In the connection portion 73, the pixel electrode 121 is electrically connected to the transistor 101. Specifically, a conductive layer 222a functioning as the source or the drain of the transistor 101 is in contact with a conductive layer 46b, and the conductive layer 46b is in contact with the pixel electrode 121. In the connection portion 74, a conductive layer 46a is electrically connected to the transistor 102. Specifically, the conductive layer 46a is in contact with a conductive layer 222c functioning as the source or the drain of the transistor 102.

<<Cross-Sectional Structure of Display Device>>

Figure 14:
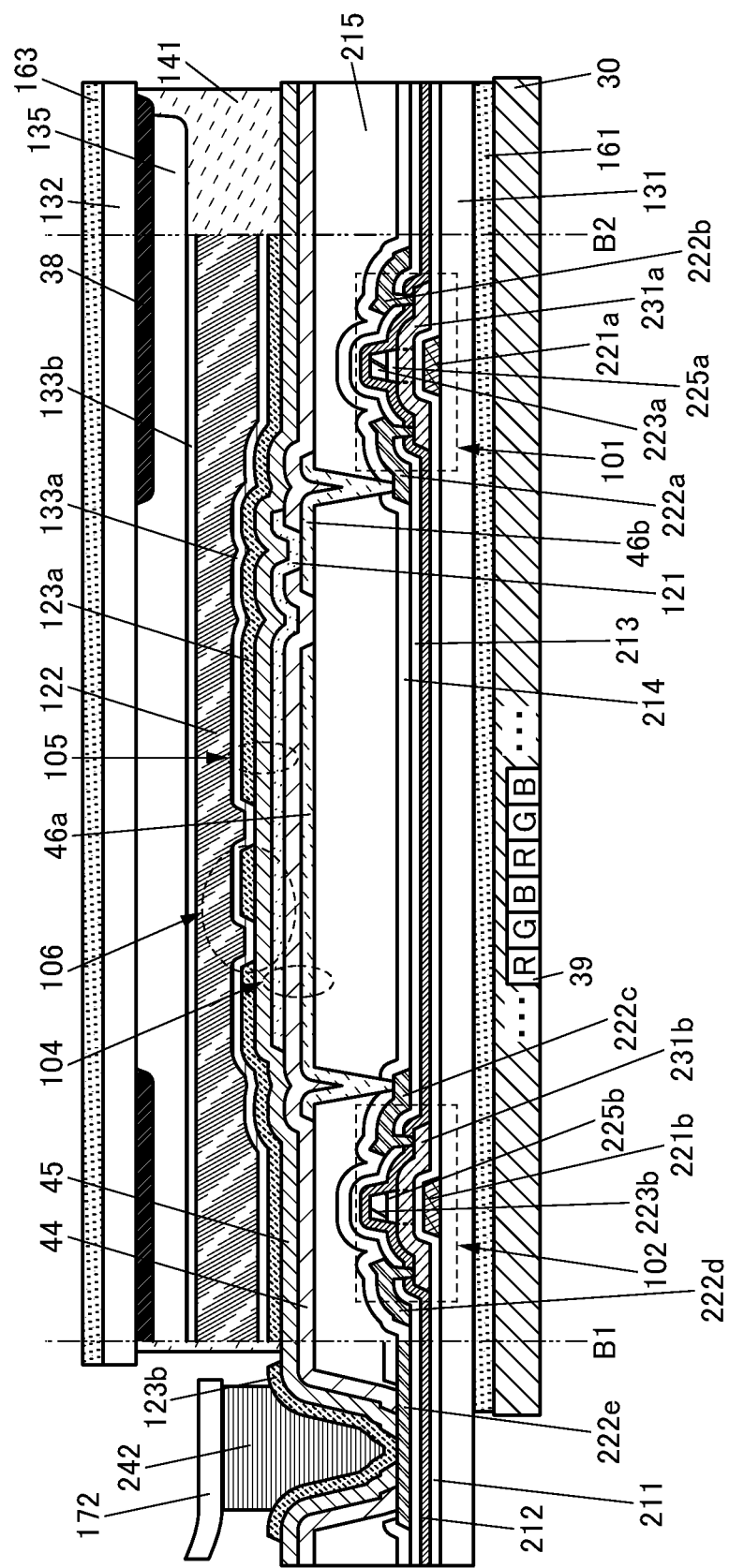
FIG. 14 A cross-sectional view illustrating a structure example of a display device.

FIG. 14 is a cross-sectional view of a display device. Note that the cross-sectional structure of the pixel corresponds to the cross-sectional view taken along the dashed-dotted line B1-B2 in FIG. 13(A).

The display device illustrated in FIG. 14 includes the substrate 131, the substrate 132, the transistor 101, the conductive layer 46a, the conductive layer 46b, the insulating layer 44, the insulating layer 45, the pixel electrode 121, the liquid crystal layer 122, the common electrode 123a, a conductive layer 123b, a conductive layer 222e, an alignment film 133a, an alignment film 133b, an adhesive layer 141, an overcoat 135, a light-blocking layer 38, a polarizing plate 161, a polarizing plate 163, a backlight unit 30, an FPC 172, and the like.

Here, the backlight unit 30 is provided with light sources 39 and can be configured to include light sources 39 emitting red light, light sources 39 emitting green light, and light sources 39 emitting blue light, for example. In this case, for example, when the light source 39 emitting red light, the light source 39 emitting green light, and the light source 39 emitting blue light are made to emit light sequentially, the display device of one embodiment of the present invention can be operated by a field sequential method. In the case where the display device of one embodiment of the present invention is operated by a field sequential method, it is not necessary to provide a coloring layer (a color filter), as illustrated in FIG. 14. In other words, light loss caused by light absorption in a coloring layer does not occur. Thus, the light transmittance in the display device of one embodiment of the present invention can be increased. Moreover, even when the illuminance of light emitted from the light source 39 is lowered, a high-luminance image can be displayed on the display device of one embodiment of the present invention; hence, the power consumption of the display device of one embodiment of the present invention can be reduced. Note that when the red light source 39, the green light source 39, and the blue light source 39 are made to emit light at the same time, the display device of one embodiment of the present invention can perform white display.

The transistor 101 and the transistor 102 are positioned over the substrate 131. The transistor 101 includes the gate 221a, a gate insulating layer 211, a semiconductor layer 231a, the conductive layer 222a, a conductive layer 222b, an insulating layer 212, an insulating layer 213, a gate insulating layer 225a, and a gate 223a. The transistor 102 includes the gate 221b, the gate insulating layer 211, a semiconductor layer 231b, the conductive layer 222c, a conductive layer 222d, the insulating layer 212, the insulating layer 213, a gate insulating layer 225b, and a gate 223b.

The transistor 101 and the transistor 102 illustrated in FIG. 14 include the gates above and below the channel. It is preferable that the two gates be electrically connected to each other. A transistor with two gates that are electrically connected to each other can have higher field-effect mobility and thus have a higher on-state current than other transistors. Consequently, a circuit capable of high-speed operation can be fabricated. Furthermore, the area occupied by a circuit portion can be reduced. The use of the transistor having a high on-state current can reduce signal delay in each wiring and can suppress display unevenness even in a display device in which the number of wirings is increased because of an increase in size or an increase in resolution. In addition, the area occupied by a circuit portion can be reduced, whereby the bezel of the display device can be narrowed. Moreover, with such a structure, a highly reliable transistor can be fabricated.

A semiconductor layer 231 includes a pair of low-resistance regions 231n and a channel formation region 231i between the pair of low-resistance regions 231n.

The channel formation region 231i overlaps with a gate 221 with the gate insulating layer 211 therebetween and overlaps with the gate 223 with a gate insulating layer 225 therebetween.

In this specification and the like, the semiconductor layer 231 refers to one or both of the semiconductor layer 231a and the semiconductor layer 231b. The gate 221 refers to one or both of the gate 221a and the gate 221b, and the gate 223 refers to one or both of the gate 223a and the gate 223b. The gate insulating layer 225 refers to one or both of the gate insulating layer 225a and the gate insulating layer 225b.

Here, an example in which a metal oxide is used for the semiconductor layer 231 is described.

The gate insulating layer 211 and the gate insulating layer 225 that are in contact with the channel formation region 231i are preferably oxide insulating layers. In the case where the gate insulating layer 211 or the gate insulating layer 225 has a stacked-layer structure, it is preferable that at least a layer in contact with the channel formation region 231i be an oxide insulating layer. Accordingly, generation of oxygen vacancies in the channel formation region 231i can be suppressed, and the reliability of the transistor can be improved.

Either one or both of the insulating layer 213 and the insulating layer 214 are preferably a nitride insulating layer. Thus, entry of impurities into the semiconductor layer 231 can be suppressed, and the reliability of the transistor can be improved.

The insulating layer 215 preferably has a planarization function, and is preferably an organic insulating layer, for example. Note that one or both of the insulating layer 214 and the insulating layer 215 are not necessarily formed.

The resistivity of the low-resistance regions 231n is lower than that of the channel formation region 231i. The low-resistance regions 231n are regions of the semiconductor layer 231 that are in contact with the insulating layer 212. Here, the insulating layer 212 preferably contains nitrogen or hydrogen. Accordingly, nitrogen or hydrogen in the insulating layer 212 enters the low-resistance regions 231n, whereby the carrier concentration of the low-resistance regions 231n can be increased. Alternatively, the low-resistance regions 231n may be formed by the addition of an impurity with the gate 223 used as a mask. Examples of the impurity include hydrogen, helium, neon, argon, fluorine, nitrogen, phosphorus, arsenic, antimony, boron, and aluminum, and the impurity can be added by an ion implantation method or an ion doping method. Other than the above impurities, for example, indium, which is a constituent element of the semiconductor layer 231, may be added to form the low-resistance regions 231n. When indium is added, the concentration of indium in the low-resistance regions 231n is sometimes higher than that in the channel formation region 231i.

Alternatively, the low-resistance regions 231n can be formed in such a manner that, after the gate insulating layer 225 and the gate 223 are formed, a first layer is formed to be in contact with regions of the semiconductor layer 231 and heat treatment is performed to lower the resistance of the regions.

As the first layer, a film containing at least one of metal elements such as aluminum, titanium, tantalum, tungsten, chromium, and ruthenium can be used. The first layer preferably contains at least one of aluminum, titanium, tantalum, and tungsten. Alternatively, it is preferable to use a nitride containing at least one of these metal elements or an oxide containing at least one of these metal elements. In particular, it is preferable to use a metal film such as a tungsten film or a titanium film, a nitride film such as an aluminum titanium nitride film, a titanium nitride film, or an aluminum nitride film, or an oxide film such as an aluminum titanium oxide film, for example.

The thickness of the first layer can range, for example, from 0.5 nm to 20 nm, preferably from 0.5 nm to 15 nm, further preferably from 0.5 nm to 10 nm, still further preferably 1 nm to 6 nm. Typically, the thickness can be approximately 5 nm or approximately 2 nm. With such a thin first layer, the resistance of the semiconductor layer 231 can be sufficiently lowered.

It is important that the low-resistance regions 231n are made to have a higher carrier density than the channel formation region 231i. For example, the low-resistance regions 231n can be a region having a higher hydrogen content than the channel formation region 231i, or a region containing more oxygen vacancies than the channel formation region 231i. When bonded to a hydrogen atom, an oxygen vacancy in the oxide semiconductor functions as a carrier generation source.

The heat treatment is performed while the first layer is provided in contact with regions of the semiconductor layer 231, whereby oxygen in the regions is absorbed into the first layer, and thus, a large amount of oxygen vacancy can be generated in the regions. Thus, the low-resistance regions 231n can have an extremely low resistance.

The low-resistance regions 231n formed in the above manner have a feature in that its resistance is not likely to be increased by subsequent process. There is no possibility that the conductivity of low-resistance regions 231n is impaired by heat treatment in an atmosphere containing oxygen or by deposition process in an atmosphere containing oxygen, for example; thus, a transistor with favorable electrical characteristics and high reliability can be fabricated.

When the first layer that has undergone the heat treatment has conductivity, the first layer is preferably removed after the heat treatment. In contrast, when the first layer has insulating properties, the first layer can function as a protective insulating film when remaining.

The conductive layer 46b is positioned over the insulating layer 215, the insulating layer 44 is positioned over the conductive layer 46b, and the pixel electrode 121 is positioned over the insulating layer 44. The pixel electrode 121 is electrically connected to the conductive layer 222a. Specifically, the conductive layer 222a is connected to the conductive layer 46b, and the conductive layer 46b is connected to the pixel electrode 121.

The conductive layer 46a is positioned over the insulating layer 215. The conductive layer 46a is electrically connected to the conductive layer 222c. Specifically, the conductive layer 46a is in contact with the conductive layer 222c through an opening provided in the insulating layer 214 and the insulating layer 215.

The substrate 131 and the substrate 132 are attached to each other with the adhesive layer 141.

The FPC 172 is electrically connected to the conductive layer 222e. Specifically, the FPC 172 is in contact with a connector 242, the connector 242 is in contact with the conductive layer 123b, and the conductive layer 123b is in contact with the conductive layer 222e. The conductive layer 123b is formed over the insulating layer 45, and the conductive layer 222e is formed over the insulating layer 214. The conductive layer 123b can be formed using the same step and the same material as those for the common electrode 123a. The conductive layer 222e can be formed using the same step and the same material as those for the conductive layer 222a to the conductive layer 222d.

The pixel electrode 121, the insulating layer 45, and the common electrode 123a can function as one capacitor 105. The conductive layer 46a, the insulating layer 44, and the pixel electrode 121 can function as one capacitor 104. The display device of one embodiment of the present invention thus includes two capacitors, for example, in one pixel. As a result, the storage capacity of the pixel can be increased.

The two capacitors are formed using a material transmitting visible light and include a region where they overlap with each other. Accordingly, the pixel can achieve a high aperture ratio and high storage capacity.

The capacitance of the capacitor 104 is preferably larger than the capacitance of the capacitor 105. Therefore, the area of a region where the pixel electrode 121 and the conductive layer 46a overlap with each other is preferably larger than the area of a region where the pixel electrode 121 and the common electrode 123a overlap with each other. The insulating layer 44 positioned between the conductive layer 46a and the pixel electrode 121 is preferably thinner than the insulating layer 45 positioned between the pixel electrode 121 and the common electrode 123a.

Although FIG. 14 illustrates an example in which both the transistor 101 and the transistor 102 have the back gate (the gate 223), one or both of the transistor 101 and the transistor 102 do not necessarily have a back gate.

Figure 15:
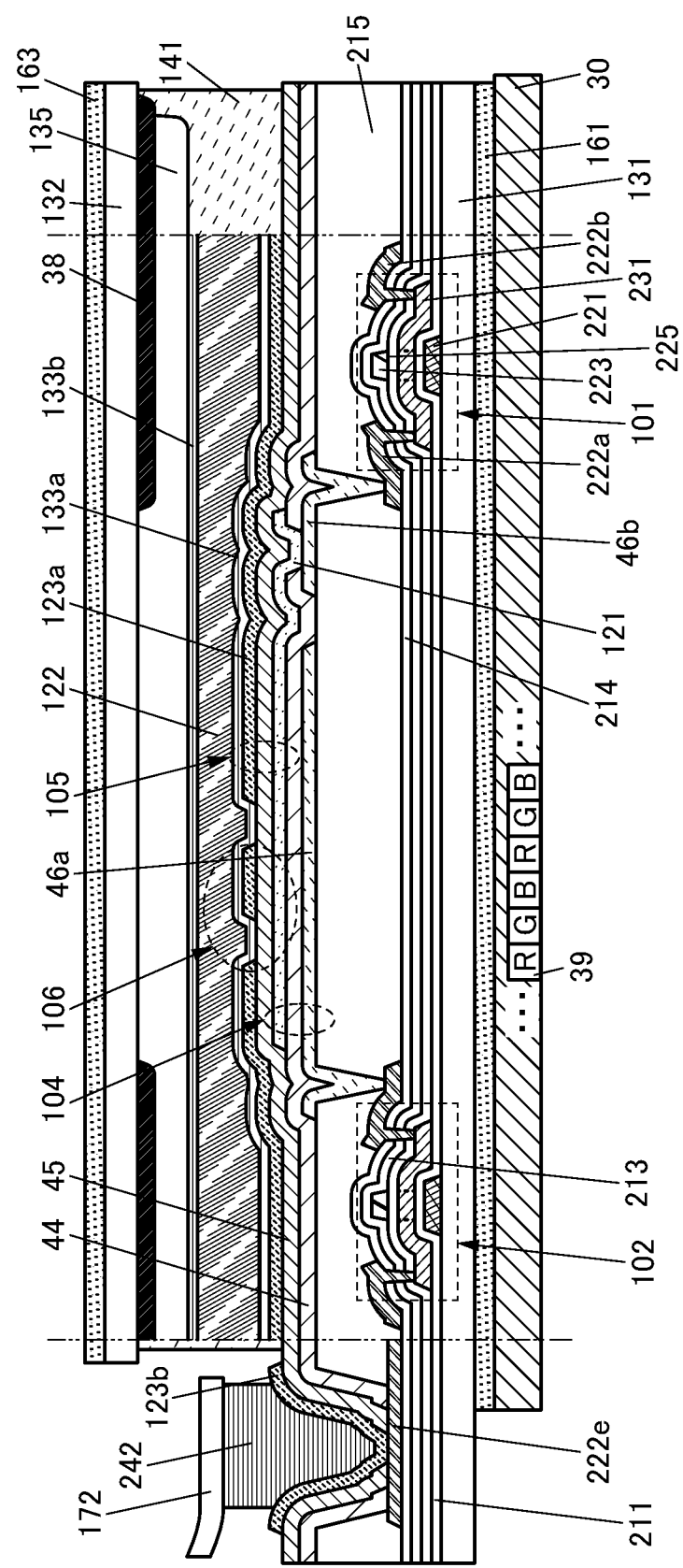
FIG. 15 A cross-sectional view illustrating a structure example of a display device.

Although FIG. 14 illustrates an example in which the gate insulating layer 225 is formed only over the channel formation region 231i and does not overlap with the low-resistance region 231n, the gate insulating layer 225 may overlap with at least part of the low-resistance region 231n. FIG. 15 illustrates an example in which the gate insulating layer 225 is formed in contact with the low-resistance regions 231n and the gate insulating layer 211. The gate insulating layer 225 illustrated in FIG. 15 has an advantage in that the step of processing the gate insulating layer 225 with the gate 223 used as a mask is not necessary, the step height of a surface on which the insulating layer 214 is formed can be lowered, and the like.

Figure 16:
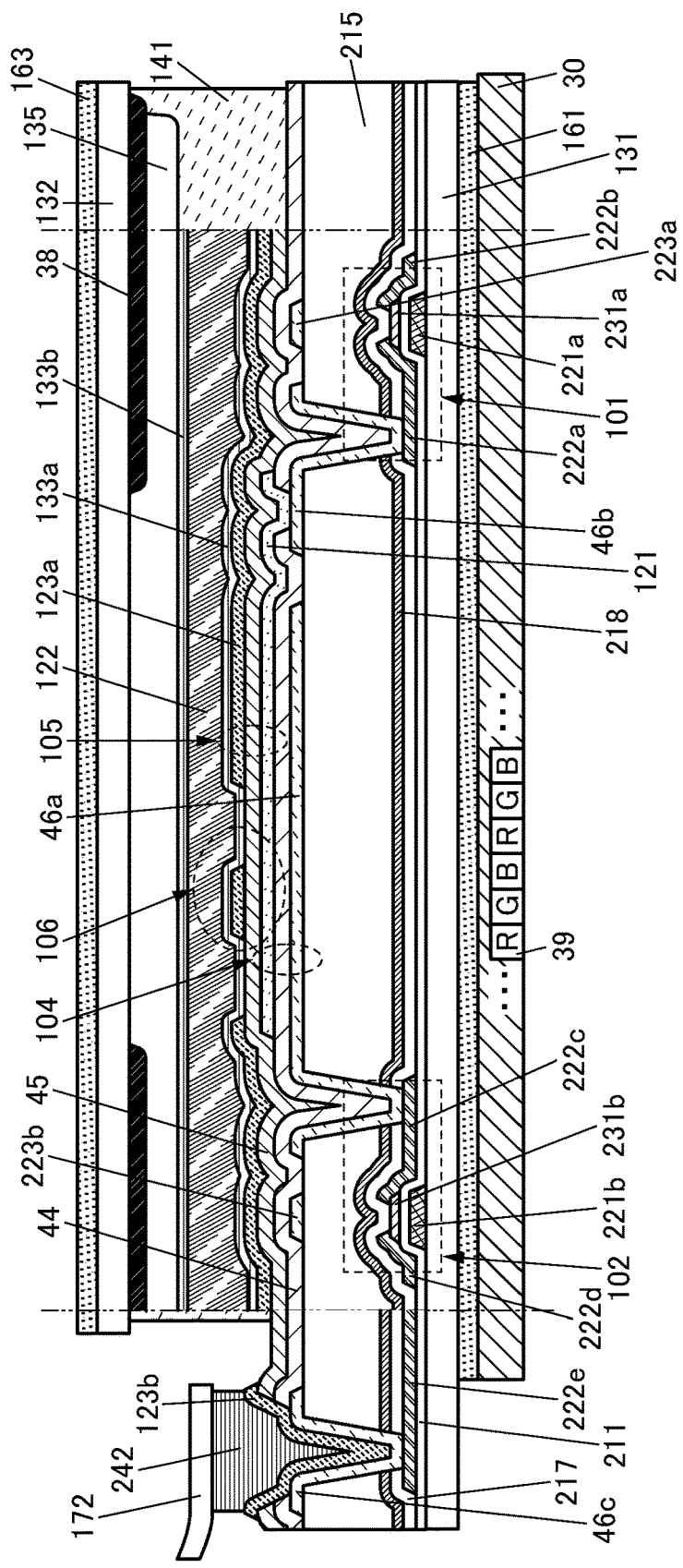
FIG. 16 A cross-sectional view illustrating a structure example of a display device.

In a display device illustrated in FIG. 16, the structures of the transistor 101 and the transistor 102 are different from those in FIG. 14 and FIG. 15.

The transistor 101 illustrated in FIG. 16 includes the gate 221a, the gate insulating layer 211, the semiconductor layer 231a, the conductive layer 222a, the conductive layer 222b, an insulating layer 217, an insulating layer 218, the insulating layer 215, and the gate 223a. The transistor 102 includes the gate 221b, the gate insulating layer 211, the semiconductor layer 231b, the conductive layer 222c, the conductive layer 222d, the insulating layer 217, the insulating layer 218, the insulating layer 215, and the gate 223b. One of the conductive layer 222a and the conductive layer 222b functions as a source, and the other functions as a drain. The insulating layer 217, the insulating layer 218, and the insulating layer 215 function as gate insulating layers.

Here, an example in which a metal oxide is used for the semiconductor layer 231 is described.

The gate insulating layer 211 and the insulating layer 217 that are in contact with the semiconductor layer 231 are preferably oxide insulating layers. In the case where the gate insulating layer 211 or the insulating layer 217 has a stacked-layer structure, at least a layer in contact with the semiconductor layer 231 is preferably an oxide insulating layer. Accordingly, generation of oxygen vacancies in the semiconductor layer 231 can be suppressed, and the reliability of the transistor can be improved.

The insulating layer 218 is preferably a nitride insulating layer. Thus, entry of impurities into the semiconductor layer 231 can be suppressed, and the reliability of the transistor can be improved.

The insulating layer 215 preferably has a planarization function, and is preferably an organic insulating layer, for example. Note that the insulating layer 215 is not necessarily formed, and the conductive layer 46a may be formed on and in contact with the insulating layer 218.

The conductive layer 46b is positioned over the insulating layer 215, the insulating layer 44 is positioned over the conductive layer 46b, and the pixel electrode 121 is positioned over the insulating layer 44. The pixel electrode 121 is electrically connected to the conductive layer 222a. Specifically, the conductive layer 222a is connected to the conductive layer 46b, and the conductive layer 46b is connected to the pixel electrode 121.

The conductive layer 46a is positioned over the insulating layer 215. The insulating layer 44 and the insulating layer 45 are positioned over the conductive layer 46a. The common electrode 123a is positioned over the insulating layer 45.

Figure 17:
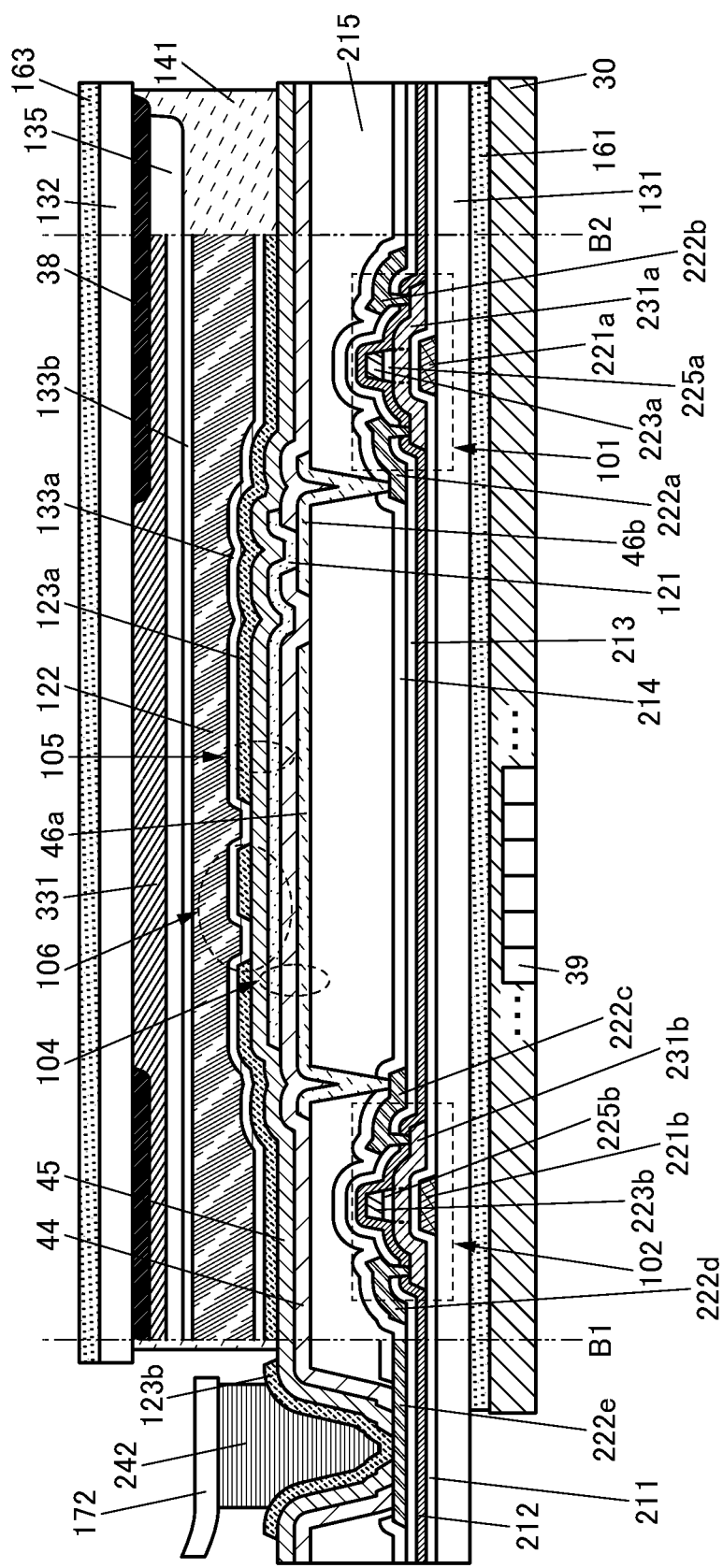
FIG. 17 A cross-sectional view illustrating a structure example of a display device.

A display device illustrated in FIG. 17 is different from those in FIG. 14 to FIG. 16 in that a coloring layer 331 is provided. The coloring layer 331 is a colored layer that transmits light in a specific wavelength range, such as red light, green light, or blue light, for example. Examples of a material that can be used for the coloring layer 331 include a metal material, a resin material, and a resin material containing pigment or dye. In the display device illustrated in FIG. 17, the light source 39 can be a light source that emits white light.

The display device in FIG. 17 can display a color image without displaying a red image, a green image, and a blue image in a time-division manner, for example. Accordingly, a color breakup or the like does not occur even when the operating frequency of the display device of one embodiment of the present invention is low; hence, a high-quality image can be displayed. Moreover, it is not necessary to switch the light sources 39 to emit light, so that the operation of the display device of one embodiment of the present invention can be simple.

<<Materials of Components>>

Next, the details of materials and the like that can be used for the components of the display device of this embodiment will be described.

There is no strict limitation on the material and the like for the substrate included in the display device; a variety of substrates can be used. For example, a glass substrate, a quartz substrate, a sapphire substrate, a semiconductor substrate, a ceramic substrate, a metal substrate, a plastic substrate, or the like can be used.

The use of a thin substrate can reduce the weight and thickness of the display device. Furthermore, the use of a substrate that is thin enough to have flexibility allows a flexible display device to be obtained.

Liquid crystal materials include a positive liquid crystal material with a positive dielectric anisotropy ($\Delta\varepsilon$) and a negative liquid crystal material with a negative dielectric anisotropy. Either of the materials can be used in one embodiment of the present invention, and an optimal liquid crystal material can be used according to the employed mode and design.

The display device of this embodiment can employ a liquid crystal element using a variety of modes. It is possible to employ a liquid crystal element using, other than the above-described FFS mode, an IPS mode, a TN mode, an ASM (Axially Symmetric aligned Micro-cell) mode, an OCB (Optically Compensated Birefringence) mode, an FLC (Ferroelectric Liquid Crystal) mode, an AFLC (AntiFerroelectric Liquid Crystal) mode, an ECB (Electrically Controlled Birefringence) mode, a VA-IPS mode, or a guest-host mode, for example.

Note that a liquid crystal element is an element that controls the transmission or non-transmission of light utilizing an optical modulation action of a liquid crystal. The optical modulation action of the liquid crystal is controlled by an electric field applied to the liquid crystal (including a horizontal electric field, a vertical electric field, and an oblique electric field). As the liquid crystal used for the liquid crystal element, thermotropic liquid crystal, low-molecular liquid crystal, high-molecular liquid crystal, polymer-dispersed liquid crystal, ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

As described above, in the display device of this embodiment, a liquid crystal element can be driven with application of high voltage; therefore, a liquid crystal exhibiting a blue phase may be used. The blue phase is one of liquid crystal phases, which is generated just before a cholesteric phase changes into an isotropic phase while the temperature of a cholesteric liquid crystal is increased. Since the blue phase appears only in a narrow temperature range, a liquid crystal composition in which a chiral material is mixed to account for 5 weight % or more is used for the liquid crystal layer in order to improve the temperature range. The liquid crystal composition that contains a liquid crystal exhibiting a blue phase and a chiral material has a short response speed and exhibits optical isotropy. In addition, the liquid crystal composition containing a liquid crystal exhibiting a blue phase and a chiral material does not need alignment treatment and has small viewing angle dependence. Since an alignment film does not need to be provided and rubbing treatment is unnecessary, electrostatic discharge damage caused by the rubbing treatment can be prevented and defects or damage of the display panel in the manufacturing process can be reduced.

Since the display device of this embodiment is a transmissive liquid crystal display device, a conductive material that transmits visible light is used for both of the pair of electrodes (the pixel electrode 121 and the common electrode 123a). When the conductive layer 46b is also formed using a conductive material that transmits visible light, a decrease in aperture ratio of the pixel can be suppressed even though the capacitor 104 is provided. Note that a silicon nitride film is preferable as the insulating layer 44 and the insulating layer 45 that function as a dielectric of the capacitor.

For example, a material containing one or more kinds selected from indium (In), zinc (Zn), and tin (Sn) is preferably used as the conductive material transmitting visible light. Specific examples include indium oxide, indium tin oxide (ITO), indium zinc oxide, indium oxide containing tungsten oxide, indium zinc oxide containing tungsten oxide, indium oxide containing titanium oxide, indium tin oxide containing titanium oxide, indium tin oxide containing silicon oxide (ITSO), zinc oxide, and zinc oxide containing gallium. Note that a film containing graphene can be used as well. The film containing graphene can be formed, for example, by reducing a film containing graphene oxide.

A conductive film that transmits visible light can be formed using an oxide semiconductor (hereinafter also referred to as an oxide conductive layer). The oxide conductive layer preferably contains indium, for example, and further preferably contains an In-M-Zn oxide (M is Al, Ti, Ga, Y, Zr, La, Ce, Nd, Sn, or Hf).

An oxide semiconductor is a semiconductor material whose resistance can be controlled by oxygen vacancies in the film and/or the concentration of impurities such as hydrogen and water in the film. Thus, the resistivity of the oxide conductive layer can be controlled by selecting treatment for increasing oxygen vacancies and/or impurity concentration or treatment for reducing oxygen vacancies and/or impurity concentration, for the oxide semiconductor layer.

Note that such an oxide conductive layer formed using an oxide semiconductor can also be referred to as an oxide semiconductor layer having a high carrier density and a low resistance, an oxide semiconductor layer having conductivity, or an oxide semiconductor layer having high conductivity.

A transistor included in the display device of this embodiment may have either a top-gate structure or a bottom-gate structure. Gate electrodes may be provided above and below a channel. A semiconductor material used in the transistor is not particularly limited, and examples of the semiconductor material include an oxide semiconductor, silicon, and germanium.

There is no particular limitation on the crystallinity of a semiconductor material used for the transistor, and an amorphous semiconductor or a semiconductor having crystallinity (a microcrystalline semiconductor, a polycrystalline semiconductor, a single crystal semiconductor, or a semiconductor partly including crystal regions) can be used. It is preferable that a semiconductor having crystallinity be used, in which case deterioration of the transistor characteristics can be suppressed.

For example, a Group 14 element, a compound semiconductor, or an oxide semiconductor can be used for the semiconductor layer. Typically, a semiconductor containing silicon, a semiconductor containing gallium arsenide, an oxide semiconductor containing indium, or the like can be used for the semiconductor layer.

An oxide semiconductor is preferably used as a semiconductor in which a channel of the transistor is formed. In particular, an oxide semiconductor having a wider band gap than silicon is preferably used. Using a semiconductor material having a wider band gap and a lower carrier density than silicon is preferable because the off-state current of the transistor can be reduced.

The use of an oxide semiconductor makes it possible to provide a highly reliable transistor in which a change in electrical characteristics is reduced.

Charge accumulated in the capacitor through the transistor can be retained for a long time because of the low off-state current. The use of such a transistor in a pixel allows a driver circuit to stop with the gray level of a displayed image maintained. As a result, a display device with significantly reduced power consumption can be obtained.

The transistor preferably includes an oxide semiconductor layer that is highly purified to inhibit the formation of oxygen vacancies. This can reduce the current in an off state (off-state current) of the transistor. Accordingly, the retention time of an electrical signal such as an image signal can be made longer, and a writing interval can also be set longer in a power-on state. Thus, the frequency of refresh operation can be reduced, which leads to an effect of reducing power consumption.

The transistor using an oxide semiconductor can have relatively high field-effect mobility and thus can operate at high speed. With the use of such transistors that are capable of high-speed operation in the display device, transistors in the display portion and transistors in the driver circuit portion can be formed over the same substrate. That is, a semiconductor device separately formed with a silicon wafer or the like does not need to be used as the driver circuit, which enables a reduction in the number of components of the display device. In addition, with the use of transistors capable of high-speed operation also in the display portion, a high-quality image can be provided.

An organic insulating material or an inorganic insulating material can be used as an insulating material that can be used for the insulating layers, the overcoat, and the like included in the display device. Examples of the organic insulating material include an acrylic resin, an epoxy resin, a polyimide resin, a polyamide resin, a polyimide-amide resin, a siloxane resin, a benzocyclobutene-based resin, and a phenol resin. As inorganic insulating layers, a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, a neodymium oxide film, and the like can be given.

For the conductive layer for the gate, the source, and the drain of the transistor, various wirings and electrodes of the display device, and the like, a single-layer structure or a stacked-layer structure using any of metals such as aluminum, titanium, chromium, nickel, copper, yttrium, zirconium, molybdenum, silver, tantalum, and tungsten, or an alloy containing any of these metals as its main component can be used. For example, it is possible to employ a two-layer structure in which a titanium film is stacked over an aluminum film; a two-layer structure in which a titanium film is stacked over a tungsten film; a two-layer structure in which a copper film is stacked over a molybdenum film; a two-layer structure in which a copper film is stacked over an alloy film containing molybdenum and tungsten; a two-layer structure in which a copper film is stacked over a copper-magnesium-aluminum alloy film; a three-layer structure in which a titanium film or a titanium nitride film, an aluminum film or a copper film, and a titanium film or a titanium nitride film are stacked in this order; or a three-layer structure in which a molybdenum film or a molybdenum nitride film, an aluminum film or a copper film, and a molybdenum film or a molybdenum nitride film are stacked in this order. For example, in the case where the conductive layer has a three-layer structure, it is preferable that each of the first layer and the third layer be a film formed of titanium, titanium nitride, molybdenum, tungsten, an alloy containing molybdenum and tungsten, an alloy containing molybdenum and zirconium, or molybdenum nitride, and that the second layer be a film formed of a low-resistance material such as copper, aluminum, gold, silver, or an alloy containing copper and manganese. Note that light-transmitting conductive materials such as ITO, indium oxide containing tungsten oxide, indium zinc oxide containing tungsten oxide, indium oxide containing titanium oxide, indium tin oxide containing titanium oxide, indium zinc oxide, or ITSO may be used. Note that an oxide conductive layer may be formed by controlling the resistivity of an oxide semiconductor.

A curable resin such as a heat-curable resin, a photocurable resin, or a two-component-mixture-type curable resin can be used as the adhesive layer 141. For example, an acrylic resin, a urethane resin, an epoxy resin, or a siloxane resin can be used.

As the connector 242, for example, an anisotropic conductive film (ACF) or an anisotropic conductive paste (ACP) can be used.

As the backlight unit 30, a direct-type backlight, an edge-lit backlight, or the like can be used. As a light source, an LED (Light Emitting Diode), an organic EL (Electroluminescence) element, or the like can be used.

The thin films included in the display device (the insulating film, the semiconductor film, the conductive film, and the like) can each be formed by a sputtering method, a chemical vapor deposition (CVD) method, a vacuum evaporation method, a pulsed laser deposition (PLD) method, an atomic layer deposition (ALD) method, or the like. As examples of the CVD method, a plasma-enhanced chemical vapor deposition (PECVD) method, a thermal CVD method, and the like can be given. As an example of the thermal CVD method, a metal organic chemical vapor deposition (MOCVD: Metal Organic CVD) method can be given.

The thin films included in the display device (the insulating film, the semiconductor film, the conductive film, and the like) can each be formed by a method such as spin coating, dipping, spray coating, inkjet printing, dispensing, screen printing, offset printing, a doctor knife, slit coating, roll coating, curtain coating, or knife coating.

The thin films included in the display device can be processed using a photolithography method or the like. Alternatively, island-shaped thin films may be formed by a film formation method using a blocking mask. Alternatively, the thin films may be processed by a nano-imprinting method, a sandblasting method, a lift-off method, or the like. Examples of the photolithography method include a method in which a resist mask is formed over a thin film to be processed, the thin film is processed by etching or the like, and the resist mask is removed; and a method in which a photosensitive thin film is formed and then exposed to light and developed to be processed into a desired shape.

As light used for light exposure in a photolithography method, for example, an i-line (a wavelength of 365 nm), a g-line (a wavelength of 436 nm), an h-line (a wavelength of 405 nm), and light in which the i-line, the g-line, and the h-line are mixed can be given. Besides, ultraviolet light, KrF laser light, ArF laser light, or the like can be used. Light exposure may be performed by immersion lithography technique. Examples of light used for light exposure include extreme ultraviolet light (EUV) and X-rays. Furthermore, instead of the light used for the exposure, an electron beam can also be used. It is preferable to use extreme ultraviolet light, X-rays, or an electron beam because extremely minute processing can be performed. Note that when light exposure is performed by scanning of a beam such as an electron beam, a photomask is unnecessary.

For etching of the thin films, a dry etching method, a wet etching method, a sandblast method, or the like can be used.

[Metal Oxide]

For a semiconductor layer of the transistor included in the display device of this embodiment, a metal oxide functioning as an oxide semiconductor is preferably used. A metal oxide that can be used for the semiconductor layer will be described below.

The metal oxide preferably contains at least indium or zinc. It is particularly preferable that the metal oxide contain indium and zinc. Moreover, aluminum, gallium, yttrium, tin, or the like is preferably contained in addition to them. Furthermore, one kind or a plurality of kinds selected from boron, titanium, iron, nickel, germanium, zirconium, molybdenum, lanthanum, cerium, neodymium, hafnium, tantalum, tungsten, magnesium, and the like may be contained.

Here, the case where the metal oxide is an In-M-Zn oxide containing indium, an element M, and zinc is considered. Note that the element M is aluminum, gallium, yttrium, tin, or the like. Other elements that can be used as the element M include boron, titanium, iron, nickel, germanium, zirconium, molybdenum, lanthanum, cerium, neodymium, hafnium, tantalum, tungsten, and magnesium. Note that it is sometimes acceptable to use a plurality of the above-described elements in combination as the element M.

Note that in this specification and the like, a metal oxide containing nitrogen is also collectively referred to as a metal oxide in some cases. A metal oxide containing nitrogen may be referred to as a metal oxynitride. For example, a metal oxide containing nitrogen, such as zinc oxynitride (ZnON), may be used for the semiconductor layer.

Oxide semiconductors (metal oxides) can be classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

The CAAC-OS has c-axis alignment, a plurality of nanocrystals are connected in the a-b plane direction, and its crystal structure has distortion. Note that the distortion refers to a portion where the direction of a lattice arrangement changes between a region with a regular lattice arrangement and another region with a regular lattice arrangement in a region where the plurality of nanocrystals are connected.

The nanocrystal is basically a hexagon but is not always a regular hexagon and is a non-regular hexagon in some cases. Furthermore, a pentagonal or heptagonal lattice arrangement, for example, is included in the distortion in some cases. Note that it is difficult to observe a clear crystal grain boundary (also referred to as grain boundary) even in the vicinity of distortion in the CAAC-OS. That is, formation of a crystal grain boundary is inhibited by the distortion of a lattice arrangement his is because the CAAC-OS can tolerate distortion owing to a low density of arrangement of oxygen atoms in the a-b plane direction, an interatomic bond length changed by substitution of a metal element, and the like.

The CAAC-OS tends to have a layered crystal structure (also referred to as a layered structure) in which a layer containing indium and oxygen (hereinafter, In layer) and a layer containing the element M, zinc, and oxygen (hereinafter, (M,Zn) layer) are stacked. Note that indium and the element M can be replaced with each other, and when the element M in the (M,Zn) layer is replaced with indium, the layer can also be referred to as an (In,M,Zn) layer. Furthermore, when indium in the In layer is replaced with the element M, the layer can also be referred to as an (In,M) layer.

The CAAC-OS is a metal oxide with high crystallinity. By contrast, in the CAAC-OS, a reduction in electron mobility due to the crystal grain boundary is less likely to occur because it is difficult to observe a clear crystal grain boundary. Entry of impurities, formation of defects, or the like might decrease the crystallinity of a metal oxide; thus, it can be said that the CAAC-OS is a metal oxide that has small amounts of impurities and defects (e.g., oxygen vacancies (also referred to as Vo)). Thus, a metal oxide including a CAAC-OS is physically stable. Therefore, the metal oxide including a CAAC-OS is resistant to heat and has high reliability.

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor depending on the analysis method.

Note that indium-gallium-zinc oxide (hereinafter referred to as IGZO) that is a kind of metal oxide containing indium, gallium, and zinc has a stable structure in some cases by being formed of the above-described nanocrystals. In particular, crystals of IGZO tend not to grow in the air and thus, a stable structure is obtained when IGZO is formed of smaller crystals (e.g., the above-described nanocrystals) rather than larger crystals (here, crystals with a size of several millimeters or several centimeters).

An a-like OS is a metal oxide having a structure between those of the nc-OS and an amorphous oxide semiconductor. The a-like OS includes a void or a low-density region. That is, the a-like OS has low crystallinity as compared with the nc-OS and the CAAC-OS.

An oxide semiconductor (a metal oxide) can have various structures that show different properties. Two or more of the amorphous oxide semiconductor, the polycrystalline oxide semiconductor, the a-like OS, the nc-OS, and the CAAC-OS may be included in an oxide semiconductor of one embodiment of the present invention.

A metal oxide film that functions as a semiconductor layer can be formed using either or both of an inert gas and an oxygen gas. Note that there is no particular limitation on the flow rate ratio of oxygen (the partial pressure of oxygen) at the time of forming the metal oxide film. However, to obtain a transistor having high field-effect mobility, the flow rate ratio of oxygen (the partial pressure of oxygen) at the time of forming the metal oxide film is preferably higher than or equal to 0% and lower than or equal to 30%, further preferably higher than or equal to 5% and lower than or equal to 30%, still further preferably higher than or equal to 7% and lower than or equal to 15%.

The energy gap of the metal oxide is preferably 2 eV or more, further preferably 2.5 eV or more, still further preferably 3 eV or more. With the use of a metal oxide having such a wide energy gap, the off-state current of the transistor can be reduced.

The metal oxide film can be formed by a sputtering method. Alternatively, a PLD method, a PECVD method, a thermal CVD method, an ALD method, a vacuum evaporation method, or the like may be used.

As described above, the display device of one embodiment of the present invention includes, in the pixel, two capacitors that transmit visible light and overlap with each other; therefore, the pixel can achieve both a high aperture ratio and high storage capacity.

This embodiment can be implemented in an appropriate combination with the structures described in the other embodiments and the like.

Embodiment 3

In this embodiment, the composition of a CAC (Cloud-Aligned Composite)-OS that can be used for a transistor disclosed in one embodiment of the present invention will be described.

The CAC-OS is, for example, a composition of a material in which elements that constitute an oxide semiconductor are unevenly distributed to have a size of greater than or equal to 0.5 nm and less than or equal to 10 nm, preferably greater than or equal to 1 nm and less than or equal to 2 nm, or a similar size. Note that in the following description, a state in which one or more metal elements are unevenly distributed and regions including the metal element(s) are mixed to have a size of greater than or equal to 0.5 nm and less than or equal to 10 nm, preferably greater than or equal to 1 nm and less than or equal to 2 nm, or a similar size in an oxide semiconductor is referred to as a mosaic pattern or a patch-like pattern.

Note that an oxide semiconductor preferably contains at least indium. It is particularly preferable that the metal oxide contain indium and zinc. Moreover, in addition to these, one kind or a plurality of kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, a CAC-OS in an In—Ga—Zn oxide (an In—Ga—Zn oxide in the CAC-OS may be particularly referred to as CAC-IGZO) has a composition in which materials are separated into indium oxide (hereinafter referred to as $InO_{X1}$ (X1 is a real number greater than 0)), indium zinc oxide (hereinafter referred to as $In_{X2}Zn_{Y2}O_{Z2}$ (each of X2, Y2, and Z2 is a real number greater than 0)), or the like and gallium oxide (hereinafter referred to as $GaO_{X3}$ (X3 is a real number greater than 0)), gallium zinc oxide (hereinafter referred to as $Ga_{X4}Zn_{Y4}O_{Z4}$ (each of X4, Y4, and Z4 is a real number greater than 0)), or the like so that a mosaic pattern is formed, and mosaic-like $InO_{X1}$ or $In_{X2}Zn_{Y2}O_{Z2}$ is evenly distributed in the film (this composition is hereinafter also referred to as a cloud-like composition).

That is, the CAC-OS is a composite oxide semiconductor having a composition in which a region where $GaO_{X3}$ is a main component and a region where $In_{X2}Zn_{Y2}O_{Z2}$ or $InO_{X1}$ is a main component are mixed. Note that in this specification, for example, when the atomic ratio of In to the element M in a first region is greater than the atomic ratio of In to the element M in a second region, the first region is regarded as having a higher In concentration than the second region.

Note that IGZO is a commonly known name and sometimes refers to one compound formed of In, Ga, Zn, and O. A typical example is a crystalline compound represented by $InGaO_3(ZnO)_{m1}$ (m1 is a natural number) or $In_{(1+x0)}Ga_{(1-x0)}O_3(ZnO)_{m0}$ ($-1 \leq x0 \leq 1$; m0 is a given number).

The crystalline compound has a single crystal structure, a polycrystalline structure, or a CAAC structure. Note that the CAAC structure is a crystal structure in which a plurality of IGZO nanocrystals have c-axis alignment and are connected in the a-b plane direction without alignment.

The CAC-OS relates to the material composition of an oxide semiconductor. The CAC-OS refers to a composition in which, in the material composition containing In, Ga, Zn, and O, some regions that contain Ga as a main component and are observed as nanoparticles and some regions that contain In as a main component and are observed as nanoparticles are randomly dispersed in a mosaic pattern. Therefore, the crystal structure is a secondary element for the CAC-OS.

Note that in the CAC-OS, a layered structure including two or more films with different compositions is not included. For example, a two-layer structure of a film containing In as a main component and a film containing Ga as a main component is not included.

Note that a clear boundary between the region where $GaO_{X3}$ is a main component and the region where $In_{X2}Zn_{Y2}O_{Z2}$ or $InO_{X1}$ is a main component cannot be observed in some cases.

Note that in the case where one kind or a plurality of kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium, the CAC-OS refers to a composition in which some regions that contain the metal element(s) as a main component and are observed as nanoparticles and some regions that contain In as a main component and are observed as nanoparticles are each randomly dispersed in a mosaic pattern.

The CAC-OS can be formed by a sputtering method under a condition where a substrate is intentionally not heated, for example. In addition, in the case of forming the CAC-OS by a sputtering method, one or more selected from an inert gas (typically, argon), an oxygen gas, and a nitrogen gas can be used as a deposition gas. The flow rate of the oxygen gas to the total flow rate of the deposition gas in deposition is preferably as low as possible; for example, the flow rate of the oxygen gas is higher than or equal to 0% and lower than 30%, preferably higher than or equal to 0% and lower than or equal to 10%.

The CAC-OS is characterized in that a clear peak is not observed when measurement is conducted using a θ/2θ scan by an Out-of-plane method, which is an X-ray diffraction (XRD) measurement method. That is, it is found from X-ray diffraction measurement that no alignment in the a-b plane direction and the c-axis direction is observed in a measured region.

In an electron diffraction pattern of the CAC-OS which is obtained by irradiation with an electron beam with a probe diameter of 1 nm (also referred to as a nanobeam electron beam), a ring-like high-luminance region (ring region) and a plurality of bright spots in the ring region are observed. It is therefore found from the electron diffraction pattern that the crystal structure of the CAC-OS includes an nc (nanocrystal) structure with no alignment in the plan-view direction and the cross-sectional direction.

Moreover, for example, it can be confirmed by EDX mapping obtained using energy dispersive X-ray spectroscopy (EDX) that the CAC-OS in the In—Ga—Zn oxide has a composition in which regions including $GaO_{X3}$ as a main component and regions including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has properties different from those of the IGZO compound. That is, the CAC-OS has a composition in which regions where $GaO_{X3}$ or the like is a main component and regions where $In_{X2}Zn_{Y2}O_{Z2}$ or $InO_{X1}$ is a main component are phase-separated from each other, and the regions including the respective elements as the main components form a mosaic pattern.

Here, a region where $In_{X2}Zn_{Y2}O_{Z2}$ or $InO_{X1}$ is a main component is a region whose conductivity is higher than that of a region where $GaO_{X3}$ or the like is a main component. In other words, when carriers flow through regions where $In_{X2}Zn_{Y2}O_{Z2}$ or $InO_{X1}$ is a main component, the conductivity of an oxide semiconductor is exhibited. Accordingly, when the regions including $In_{X2}Zn_{Y2}O_{Z2}$ or $InO_{X1}$ as a main component are distributed in an oxide semiconductor like a cloud, high field-effect mobility ($\mu$) can be achieved.

By contrast, a region where $GaO_{X3}$ or the like is a main component is a region whose insulating property is higher than that of a region where $In_{X2}Zn_{Y2}O_{Z2}$ or $InO_{X1}$ is a main component In other words, when regions where $GaO_{X3}$ or the like is a main component are distributed in an oxide semiconductor, leakage current can be suppressed and favorable switching operation can be achieved.

Accordingly, when the CAC-OS is used in a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility ($\mu$) can be achieved.

A semiconductor element using the CAC-OS has high reliability. Thus, the CAC-OS is suitably used in a variety of semiconductor devices typified by displays.

This embodiment can be implemented in an appropriate combination with the structures described in the other embodiments and the like.

Embodiment 4

In this embodiment, electronic devices of one embodiment of the present invention will be described with reference to drawings.

In an electronic device of this embodiment, a display portion includes the display device of one embodiment of the present invention. Thus, the electronic device can be inexpensive, and the power consumption of the electronic device can be reduced.

The display portion of the electronic device in this embodiment can display video with a resolution of, for example, full high definition, 2K, 4K, 8K, 16K, or higher. As the screen size of the display portion, the diagonal size can be greater than or equal to 20 inches, greater than or equal to 30 inches, greater than or equal to 50 inches, greater than or equal to 60 inches, or greater than or equal to 70 inches.

Examples of electronic devices in which the display device of one embodiment of the present invention can be used include a digital camera, a digital video camera, a digital photo frame, a mobile phone, a portable game console, a portable information terminal, and an audio reproducing device, in addition to electronic devices with a relatively large screen, such as a television device, a desktop or notebook personal computer, a monitor for a computer or the like, digital signage, and a large game machine such as a pachinko machine. Furthermore, the display device of one embodiment of the present invention can be suitably used in portable electronic devices, wearable electronic devices (wearable devices), VR (Virtual Reality) devices, AR (Augmented Reality) devices, and the like.

The electronic device of one embodiment of the present invention may include a secondary battery, and it is preferable that the secondary battery be capable of being charged by contactless power transmission.

Examples of the secondary battery include a lithium ion secondary battery such as a lithium polymer battery using a gel electrolyte (lithium ion polymer battery), a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. When a signal is received by the antenna, the electronic device can display video, data, and the like on the display portion. When the electronic device includes an antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, a chemical substance, sound, time, hardness, an electric field, current, voltage, power, radioactive rays, flow rate, humidity, a gradient, oscillation, odor, or infrared rays).

The electronic device of one embodiment of the present invention can have a variety of functions. For example, the electronic device can have a function of displaying a variety of data (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Furthermore, an electronic device including a plurality of display portions can have a function of displaying image data mainly on one display portion while displaying text data mainly on another display portion, a function of displaying a three-dimensional image by displaying images on a plurality of display portions with a parallax taken into account, or the like. An electronic device including an image receiving portion can have a function of taking a still image or a moving image, a function of automatically or manually correcting a taken image, a function of storing a taken image in a recording medium (an external recording medium or a recording medium incorporated in the electronic device), a function of displaying a taken image on a display portion, or the like. Note that functions of the electronic device of one embodiment of the present invention are not limited thereto, and the electronic devices can have a variety of functions.

Figure 18A:
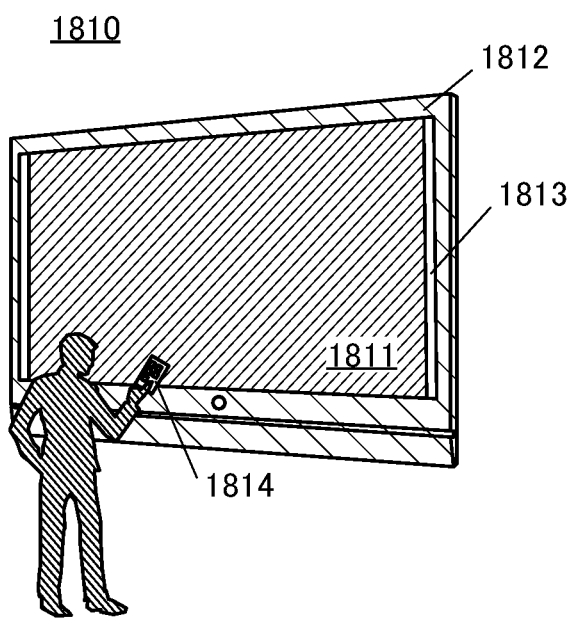
FIGS. 18A to 18C Diagrams illustrating examples of electronic devices.

FIG. 18(A) illustrates a television device 1810. The television device 1810 includes a display portion 1811, a housing 1812, a speaker 1813, and the like. Furthermore, the television device 1810 can include an LED lamp, operation keys (including a power switch or an operation switch), a connection terminal, a variety of sensors, a microphone, and the like.

The television device 1810 can be controlled with a remote controller 1814.

Examples of airwaves the television device 1810 can receive include ground waves and waves transmitted from a satellite. Other examples of the airwaves include analog broadcasting, digital broadcasting, image-sound-only broadcasting, and sound-only broadcasting. For example, the television device 1810 can receive airwaves transmitted in a certain frequency band in the UHF band (about 300 MHz to 3 GHz) or the VHF band (30 MHz to 300 MHz). When a plurality of pieces of data received in a plurality of frequency bands are used, the transfer rate can be increased and more information can be obtained. Accordingly, the display portion 1811 can display an image with a resolution higher than the full high definition. For example, an image with a resolution of 4K, 8K, 16K, or higher can be displayed.

A structure may be employed in which an image to be displayed on the display portion 1811 is generated using broadcasting data transmitted with a technology for transmitting data via a computer network such as the Internet, a LAN (Local Area Network), or Wi-Fi (registered trademark). In that case, the television device 1810 does not necessarily include a tuner.

Figure 18B:
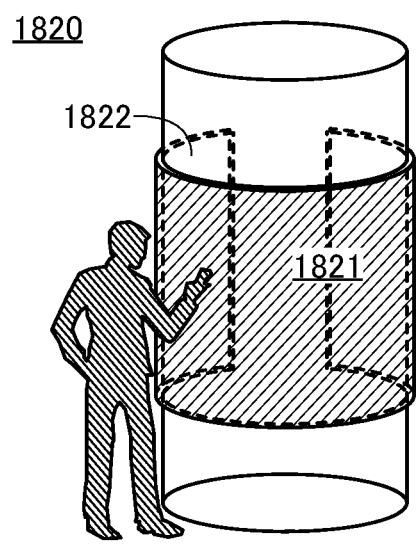

FIG. 18(B) illustrates digital signage 1820 mounted on a cylindrical pillar 1822. The digital signage 1820 includes a display portion 1821.

The larger the display portion 1821 is, the more information the display portion 1821 can provide at a time. In addition, the larger the display portion 1821 is, the more the display portion 1821 attracts attention; hence, the effectiveness of the advertisement can be increased, for example.

It is preferable to use a touch panel in the display portion 1821 because not only a still image or a moving image is displayed on the display portion 1821 but also users can operate intuitively. Moreover, for an application for providing information such as route information or traffic information, usability can be enhanced by intuitive operation.

Figure 18C:
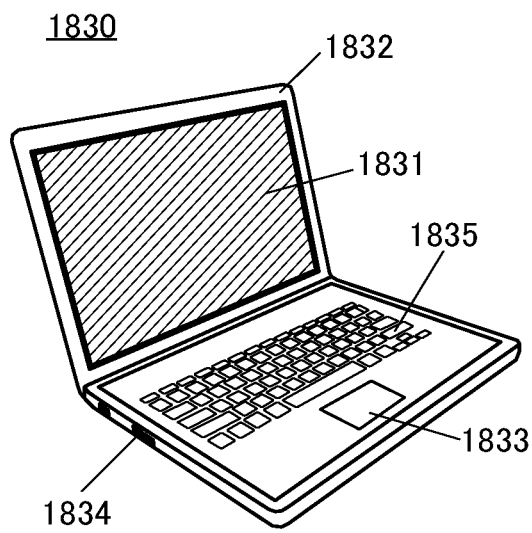

FIG. 18(C) illustrates a notebook personal computer 1830. The personal computer 1830 includes a display portion 1831, a housing 1832, a touch pad 1833, a connection port 1834, and the like.

The touch pad 1833 functions as an input means such as a pointing device or a pen tablet and can be controlled with a finger, a stylus, or the like.

A display element is incorporated in the touch pad 1833. As illustrated in FIG. 18(C), when input keys 1835 are displayed on a surface of the touch pad 1833, the touch pad 1833 can be used as a keyboard. In that case, a vibration module may be incorporated in the touch pad 1833 so that sense of touch is achieved by vibration when the input keys 1835 are touched.

Figure 19A:
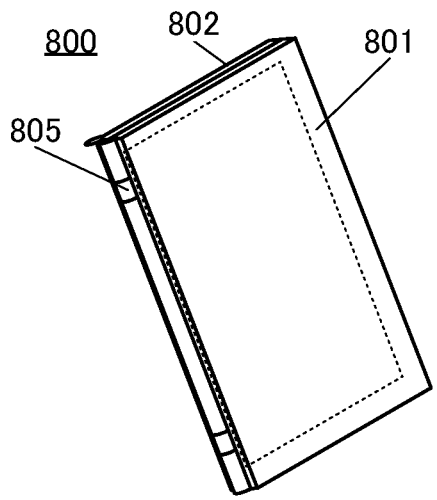
FIGS. 19A to 19E Diagrams illustrating examples of electronic devices.
Figure 19B:
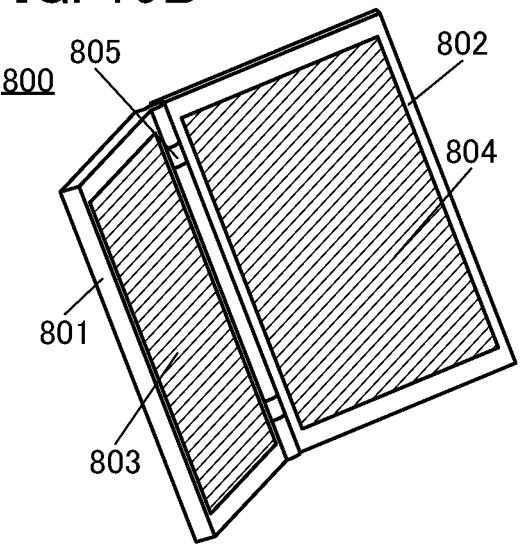

FIGS. 19(A) and 19(B) illustrate an example of a portable information terminal 800. The portable information terminal 800 includes a housing 801, a housing 802, a display portion 803, a display portion 804, a hinge portion 805, and the like.

The housing 801 and the housing 802 are joined together with the hinge portion 805. As for the portable information terminal 800, the housing 801 and the housing 802 can be opened as illustrated in FIG. 19(B) from a folded state illustrated in FIG. 19(A).

For example, text data can be displayed on the display portion 803 and the display portion 804; thus, the portable information terminal can be used as an e-book reader. Furthermore, still images and moving images can be displayed on the display portion 803 and the display portion 804.

The portable information terminal 800 can be folded when being carried, and thus is highly versatile.

Note that the housing 801 and the housing 802 may have a power button, an operation button, an external connection port, a speaker, a microphone, and the like.

Figure 19C:
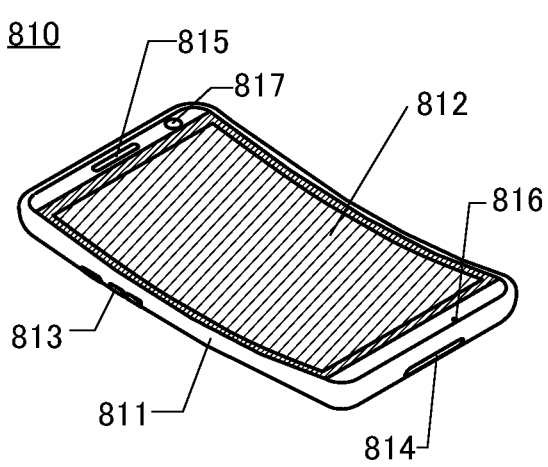

FIG. 19(C) illustrates an example of a portable information terminal. A portable information terminal 810 illustrated in FIG. 19(C) includes a housing 811, a display portion 812, an operation button 813, an external connection port 814, a speaker 815, a microphone 816, a camera 817, and the like.

The portable information terminal 810 includes a touch sensor in the display portion 812. All operations including making a call and inputting text can be performed by touching the display portion 812 with a finger, a stylus, or the like.

By an operation with the operation button 813, power on/off operations and types of images displayed on the display portion 812 can be switched. For example, switching from a mail creation screen to a main menu screen can be performed.

When a detection device such as a gyroscope sensor or an acceleration sensor is provided inside the portable information terminal 810, the direction of display on the screen of the display portion 812 can be automatically changed by determining the orientation of the portable information terminal 810 (whether it is placed vertically or horizontally). Furthermore, the direction of display on the screen can be changed by touch on the display portion 812, operation with the operation button 813, sound input using the microphone 816, or the like.

The portable information terminal 810 has one or more functions selected from a telephone set, a notebook, an information browsing device, and the like, for example. Specifically, the portable information terminal can be used as a smartphone. The portable information terminal 810 is capable of executing a variety of applications such as mobile phone calls, e-mailing, text viewing and writing, music replay, video replay, Internet communication, and games, for example.

Figure 19D:
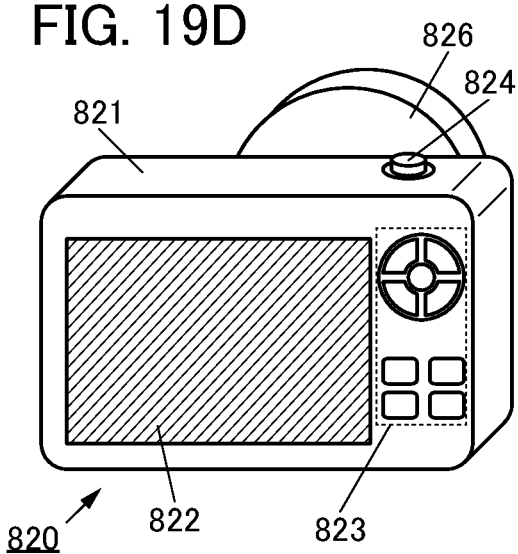

FIG. 19(D) illustrates an example of a camera. A camera 820 includes a housing 821, a display portion 822, operation buttons 823, a shutter button 824, and the like. A detachable lens 826 is attached to the camera 820.

Although the lens 826 of the camera 820 here is detachable from the housing 821 for replacement, the lens 826 may be integrated with the housing.

A still image or a moving image can be taken with the camera 820 at the press of the shutter button 824. In addition, the display portion 822 has a function of a touch panel, and images can also be taken by the touch on the display portion 822.

Note that a stroboscope, a viewfinder, or the like can be additionally attached to the camera 820. Alternatively, these may be incorporated into the housing 821.

Figure 19E:
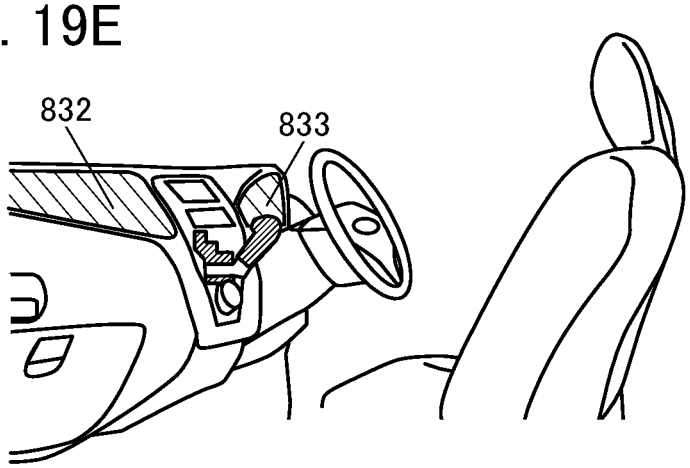

FIG. 19(E) illustrates an example in which the display device of one embodiment of the present invention is used as an in-vehicle display. A display portion 832 and a display portion 833 can provide various kinds of information by displaying navigation information, a speedometer, a tachometer, a mileage, a fuel meter, a gearshift indicator, air-conditioning settings, and the like. The content and layout of the display can be changed freely in accordance with the preference of a user.

As described above, electronic devices can be obtained by application of the display device of one embodiment of the present invention. The display device has a remarkably wide application range and can be used in electronic devices in a variety of fields.

This embodiment can be implemented in an appropriate combination with the structures described in the other embodiments and the like.

EXAMPLE

In this example, potentials applied to a display element provided in a pixel included in the display device of one embodiment of the present invention were measured.

In this example, the display device 50 was operated under Condition 1 and Condition 2 described below. In Condition 1, the pixel 11 was operated by the method shown at Time T01 to Time T04 in FIG. 8. In Condition 2, the pixel 11 was operated by the method shown at Time T01 to Time T04 in FIG. 7.

Figure 20A:
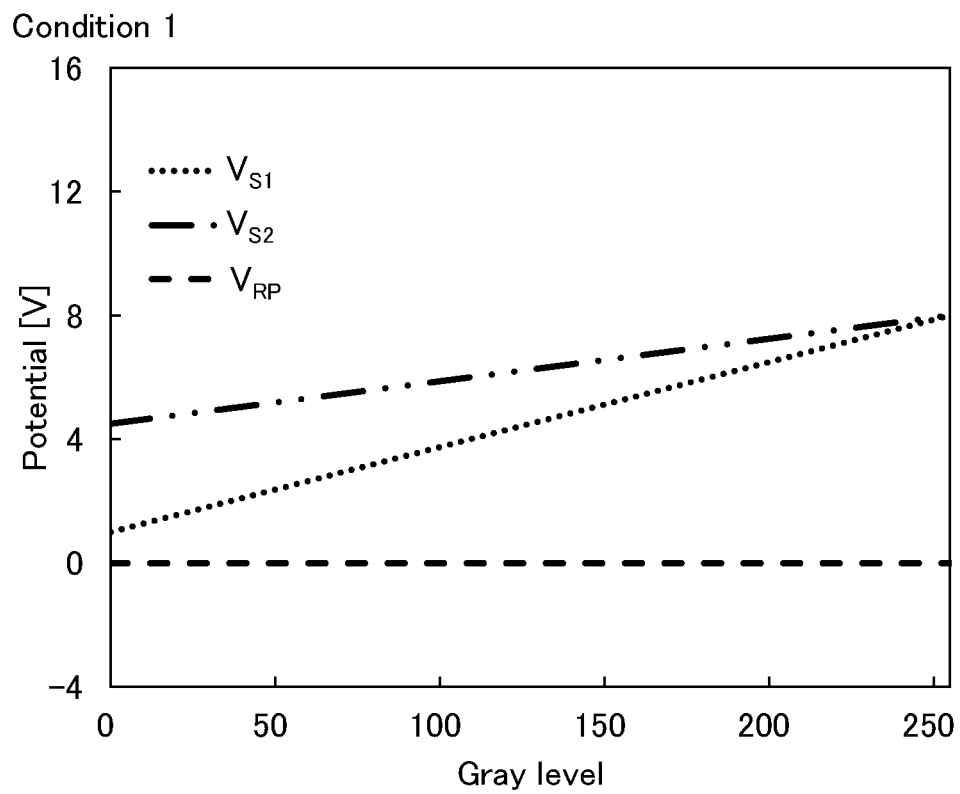
FIGS. 20A and 20B Diagrams each illustrating a relation between potentials supplied to a pixel and gray level of an image displayed by the pixel in Example.
Figure 20B:
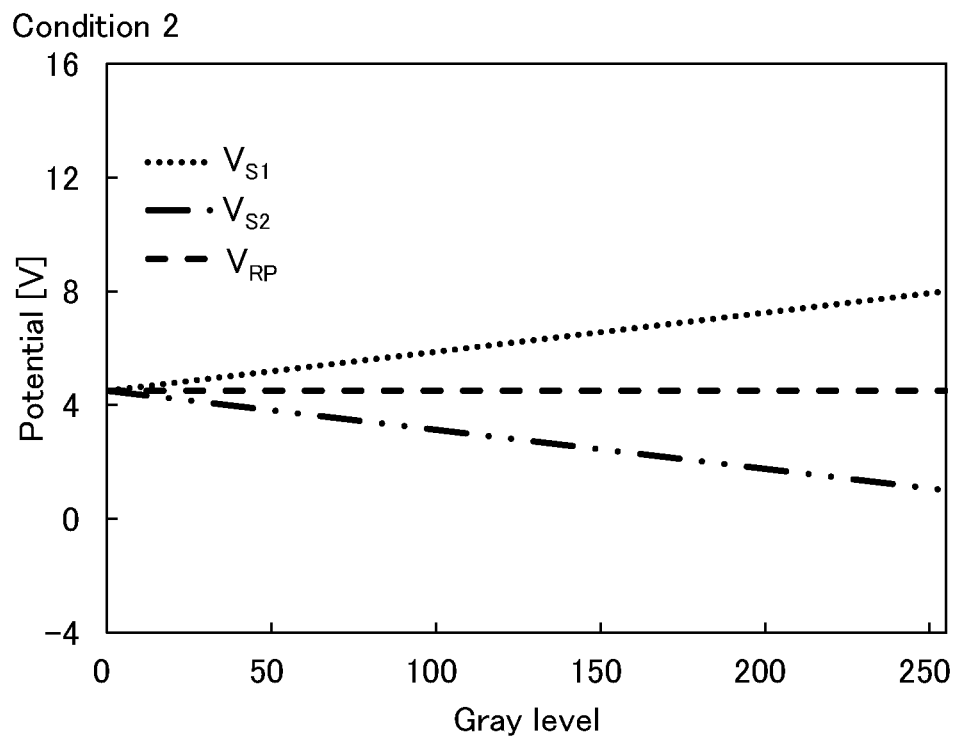

FIG. 20(A) shows the potential $V_{S1}$, the potential $V_{S2}$, and the potential $V_{RP}$ supplied to the pixel 11 in Condition 1, and FIG. 20(B) shows the potential $V_{S1}$, the potential $V_{S2}$, and the potential $V_{RP}$ supplied to the pixel 11 in Condition 2. In both Conditions 1 and 2, the pixel 11 was operated with a lowest gray level of 0 and a highest gray level of 255.

Note that in the pixel 11, the display element 106 was a transmissive liquid crystal element, and the rubbing angle was 20°. The potential $V_{COM}$ of the common wiring 32 and the common wiring 33 was 4.5 V; a capacitance $C_1$ of the capacitor 104 was 30 pF; a capacitance $C_2$ of the capacitor 105 was 3 pF, and a capacitance $C_{LC}$ of the display element 106 was 3 pF.

The potential $V_{SDMIN}$, which is the minimum potential that can be generated by the source driver circuit 15, was 1 V, and the potential $V_{SDMAX}$, which is the maximum potential that can be generated by the source driver circuit 15, was 8 V. Since the potential $V_{COM}$ is 4.5 V as described above, when the potential $V_{SDMAX}$ is applied to one electrode of the display element 106, the voltage applied to the display element 106 becomes 3.5 V.

In Condition 1, the value of the potential $V_{S1}$ was 1 V, which is the potential $V_{SDMIN}$, for the gray level 0 and was 8 V, which is the potential $V_{SDMAX}$, for the gray level 255. The potential $V_{S2}$ was the value calculated by Formula 5 shown in Embodiment 1, and was 4.5 V, which is the potential $V_{COM}$, for the gray level 0 and was 8 V, which is the potential $V_{SDMAX}$, for the gray level 255. The potential $V_{RP}$ was 0 V regardless of the gray level, i.e., a potential lower than the potential $V_{COM}$ by 4.5 V.

In Condition 2, the value of the potential $V_{S1}$ was 4.5 V, which is the potential $V_{COM}$, for the gray level 0 and was 8 V, which is the potential $V_{SDMAX}$, for the gray level 255. The potential $V_{S2}$ was the value calculated by the following formula, and was 4.5 V, which is the potential $V_{COM}$, for the gray level 0 and was 1 V, which is the potential $V_{SDMIN}$, for the gray level 255. The potential $V_{RP}$ was 4.5 V regardless of the gray level, i.e., a potential equal to the potential $V_{COM}$.

[Formula 9]

$$V_{S2}=V_{COM}-(V_{S1}-V_{COM})=2V_{COM}-V_{S1} \quad (9)$$

In this example, the voltage "$V_{DE}-V_{COM}$" applied to the display element 106 was measured in each of Conditions 1 and 2. Specifically, the backlight was turned on, the luminance of light transmitted through the display element 106 was measured, and the voltage "$V_{DE}-V_{COM}$" was calculated based on the measurement results.

Figure 21:
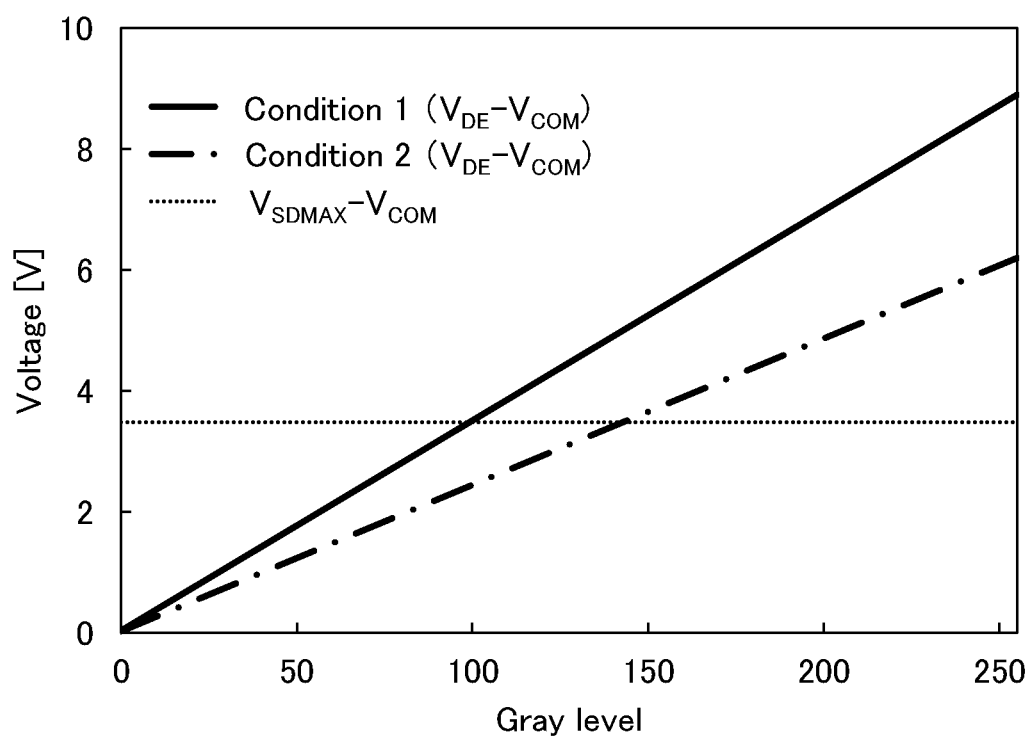
FIG. 21 A diagram illustrating a relation between a voltage applied to a display element and gray level of an image displayed by a pixel in Example.

FIG. 21 shows the measurement results of the voltage "$V_{DE}-V_{COM}$" in Condition 1 and Condition 2, and also shows the voltage "$V_{SDMAX}-V_{COM}$".

It was confirmed that a higher voltage can be applied to the display element 106 in Condition 1 than in Condition 2. It was also confirmed that the voltage "$V_{DE}-V_{COM}$" in Condition 1 becomes 8.90 V for the gray level 255, and a voltage more than twice the voltage "$V_{SDMAX}-V_{COM}$" can be applied to the display element 106 in Condition 1.

REFERENCE NUMERALS

10: display device, 11: pixel, 12: display portion, 13: image data generator circuit, 14: gate driver circuit, 15: source driver circuit, 16: transistor, 16a: transistor, 16b: transistor, 21: wiring, 22: wiring, 23: wiring, 26: wiring, 26a: wiring, 26b: wiring, 30: backlight unit, 32: common wiring, 33: common wiring, 34: common wiring, 38: light-blocking layer, 39: light source, 41: wiring, 42: wiring, 42a wiring, 42b: wiring, 44: insulating layer, 45: insulating layer, 46: conductive layer, 46a: conductive layer, 46b: conductive layer, 50: display device, 60: display device, 73: connection portion, 74: connection portion, 101: transistor, 102: transistor, 103: transistor, 104: capacitor, 105: capacitor, 106: display element, 107: capacitor, 121: pixel electrode, 122: liquid crystal layer, 123: common electrode, 123a: common electrode, 123b: conductive layer, 131: substrate, 132: substrate, 133a: alignment film, 133b: alignment film, 135: overcoat, 141: adhesive layer, 161: polarizing plate, 163: polarizing plate, 172: FPC, 211: gate insulating layer, 212: insulating layer, 213: insulating layer, 214: insulating layer, 215: insulating layer, 217: insulating layer, 218: insulating layer, 221: gate, 221a: gate, 221b: gate, 222a: conductive layer, 222b: conductive layer, 222c: conductive layer, 222d: conductive layer, 222e: conductive layer, 223: gate, 223a: gate, 223b: gate, 225: gate insulating layer, 225a: gate insulating layer, 225b: gate insulating layer, 231: semiconductor layer, 231a: semiconductor layer, 231b: semiconductor layer, 231i: channel formation region, 231n: low-resistance region, 242: connector, 331: coloring layer, 800: portable information terminal, 801: housing, 802: housing, 803: display portion, 804: display portion, 805: hinge portion, 810: portable information terminal, 811: housing, 812: display portion, 813: operation button, 814: external connection port, 815: speaker, 816: microphone, 817: camera, 820: camera, 821: housing, 822: display portion, 823: operation button, 824: shutter button, 826: lens, 832: display portion, 833: display portion, 1810: television device, 1811: display portion, 1812: housing, 1813: speaker, 1814: remote controller, 1820: digital signage, 1821: display portion, 1822: pillar, 1830: personal computer, 1831: display portion, 1832: housing, 1833: touch pad, 1834: connection port, 1835: input key

The invention claimed is:

1. A method for operating a display device comprising a pixel provided with a display element comprising a pixel electrode and a common electrode, the pixel being electrically connected to a first data line and a second data line,
   wherein the display device operates according to a first operation and a second operation,
   wherein in the first operation, supply of a first potential to the pixel through the first data line and supply of a second potential to the pixel through the second data line are performed concurrently, and then a third potential is supplied to the pixel through the second data line, whereby the first potential held in the pixel is changed to a fourth potential, and the fourth potential is applied to the pixel electrode, wherein the second potential is a potential that is calculated based on the first potential and has a value less than or equal to a potential applied to the common electrode, wherein the third potential is a potential having a value greater than the potential applied to the common electrode, wherein the fourth potential is a potential having a value greater than or equal to the potential applied to the common electrode, wherein in the second operation, supply of a fifth potential to the pixel through the first data line and supply of a sixth potential to the pixel through the second data line are performed concurrently, and then a seventh potential is supplied to the pixel through the second data line, whereby the fifth potential held in the pixel is changed to an eighth potential, and the eighth potential is applied to the pixel electrode, wherein the sixth potential is a potential that is calculated based on the fifth potential and has a value greater than or equal to the potential applied to the common electrode, wherein the seventh potential is a potential having a value less than the potential applied to the common electrode, and wherein the eighth potential is a potential having a value less than or equal to the potential applied to the common electrode.

2. The method for operating the display device, according to claim 1, wherein the third potential is a potential greater than or equal to a maximum value possible for the first potential, and wherein the seventh potential is a potential greater than or equal to a minimum value possible for the fifth potential.

3. The method for operating the display device, according to claim 1, wherein a range of values possible for the first potential and a range of values possible for the fifth potential are equal to each other.

4. The method for operating the display device, according to claim 1, wherein an operation according to the first operation and an operation according to the second operation are alternately performed every frame period.

5. The method for operating the display device, according to claim 1, wherein the display device comprises a source driver circuit, wherein the source driver circuit is electrically connected to the first data line, wherein the source driver circuit is electrically connected to the second data line, and wherein the source driver circuit is configured to generate the first potential, the second potential, the fifth potential, and the sixth potential.

6. The method for operating the display device, according to claim 1, wherein the pixel comprises a first transistor, a second transistor, and a capacitor, wherein one of a source and a drain of the first transistor is electrically connected to one electrode of the capacitor, wherein another of the source and the drain of the first transistor is electrically connected to the first data line, wherein one of a source and a drain of the second transistor is electrically connected to another electrode of the capacitor, and wherein another of the source and the drain of the second transistor is electrically connected to the second data line.

7. The method for operating the display device, according to claim 6, wherein the first transistor and the second transistor each comprise a metal oxide in a channel formation region, and wherein the metal oxide comprises In, Zn, and M, wherein M is Al, Ti, Ga, Sn, Y, Zr, La, Ce, Nd, or Hf.

8. The method for operating the display device, according to claim 7, wherein the display element is a liquid crystal element.

* * * * *